(12) United States Patent
Yano et al.

(10) Patent No.: US 11,240,409 B2
(45) Date of Patent: Feb. 1, 2022

(54) IMAGE CAPTURING APPARATUS PROVIDED WITH CONNECTION TERMINAL SECTION ON REAR SIDE

(71) Applicant: CANON KABUSHIKI KAISHA, Tokyo (JP)

(72) Inventors: Hiroshi Yano, Kanagawa (JP); Kenji Yamagata, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/101,447

(22) Filed: Nov. 23, 2020

(65) Prior Publication Data
US 2021/0160405 A1 May 27, 2021

(30) Foreign Application Priority Data
Nov. 26, 2019 (JP) .............................. JP2019-213304

(51) Int. Cl.
*H04N 5/225* (2006.01)
*H01R 13/518* (2006.01)

(52) U.S. Cl.
CPC ......... *H04N 5/2252* (2013.01); *H01R 13/518* (2013.01); *H01R 2201/18* (2013.01)

(58) Field of Classification Search
CPC .............. G03B 17/55; G03B 2217/002; H01R 13/518; H01R 2201/18; H04N 5/2252
See application file for complete search history.

(56) References Cited

U.S. PATENT DOCUMENTS

| 7,489,849 | B2 * | 2/2009 | Reagan | G02B 6/4442 |
| | | | | 385/135 |
| 10,091,401 | B2 * | 10/2018 | Yamamoto | G03B 17/02 |
| 2005/0175307 | A1 * | 8/2005 | Battey | G02B 6/3897 |
| | | | | 385/135 |
| 2017/0187931 | A1 * | 6/2017 | Onishi | H04N 5/2257 |
| 2020/0335898 | A1 * | 10/2020 | Arai | H01R 13/518 |

FOREIGN PATENT DOCUMENTS

JP          2017076859 A      4/2017

* cited by examiner

*Primary Examiner* — Amy R Hsu
(74) *Attorney, Agent, or Firm* — Rossi, Kimms & McDowell LLP

(57) ABSTRACT

An image capturing apparatus capable of suppressing an increase in the handling size thereof in a state in which cables are connected thereto. The image capturing apparatus is provided with a connection terminal section on a rear side of an image capturing apparatus body. The connection terminal section includes a plurality of first connector arrangement surfaces and first external connection terminals provided on the first connector arrangement surfaces, respectively. The first connector arrangement surfaces are arranged at respective locations not overlapping each other as viewed from a front-rear direction of the image capturing apparatus body and overlapping each other as viewed from a vertical direction of the image capturing apparatus body and are arranged such that the first connector arrangement surfaces face obliquely downward toward the rear of the image capturing apparatus body.

12 Claims, 36 Drawing Sheets

IMAGE CAPTURING APPARATUS PROVIDED WITH CONNECTION TERMINAL SECTION ON REAR SIDE

BACKGROUND OF THE INVENTION

Field of the Invention

The present invention relates to an image capturing apparatus, such as a digital video camera for business use.

Description of the Related Art

When image capturing is performed using an image capturing apparatus, such as a digital video camera for business use, a photographer often performs image capturing while moving with a camera body, to which cables attached to an external apparatus are connected, carried on his/her shoulder. For this reason, to prevent damage to external connection terminals (hereinafter referred to as the "connectors") to which cables are connected, the connectors are often arranged on a rear side of the camera body.

Further, recent digital video cameras for business use have been more and more multi-functionalized, and a connector for performing high-speed communication, a connector for performing IP communication, etc., are provided on the camera body, resulting in an increase in the number of connectors. This brings about a problem of increasing the size of the camera body. As a countermeasure against this problem, in Japanese Laid-Open Patent Publication (Kokai) No. 2017-76859, there has been proposed an image capturing apparatus that is provided with a plurality of inclined surfaces on a side of a camera body and has connectors arranged on these inclined surfaces.

However, the technique described in Japanese Laid-Open Patent Publication (Kokai) No. 2017-76859 has a problem that when the camera body with hard cables for business use connected thereto is placed on a shoulder of a photographer or fixed on a tripod, the cables largely protrude from the camera body, which increases the handling size of the camera.

SUMMARY OF THE INVENTION

The present invention provides an image capturing apparatus capable of suppressing an increase in the handling size thereof in a state in which cables are connected thereto.

The present invention provides an image capturing apparatus that is provided with a connection terminal section on a rear side of an image capturing apparatus body, wherein the connection terminal section comprises a plurality of first connector arrangement surfaces, and first external connection terminals provided on the plurality of first connector arrangement surfaces, respectively, and wherein the plurality of first connector arrangement surfaces are arranged at respective locations not overlapping each other as viewed from a front-rear direction of the image capturing apparatus body and overlapping each other as viewed from a vertical direction of the image capturing apparatus body, and are arranged such that the plurality of first connector arrangement surfaces face obliquely downward toward the rear of the image capturing apparatus body.

According to the present invention, it is possible to provide an image capturing apparatus capable of suppressing an increase in the handling size thereof in a state in which cables are connected thereto.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
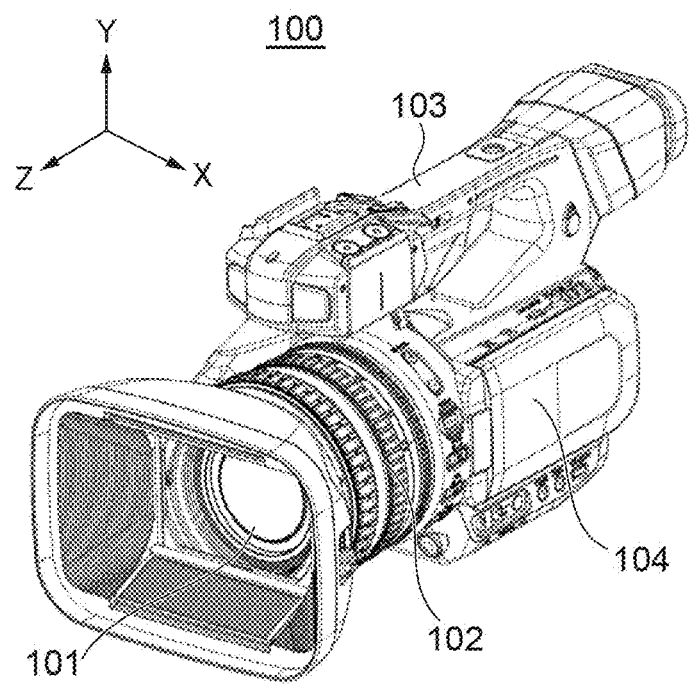
FIG. 1 is a first perspective view showing the appearance of an image capturing apparatus according to an embodiment of the present invention.
Figure 2:
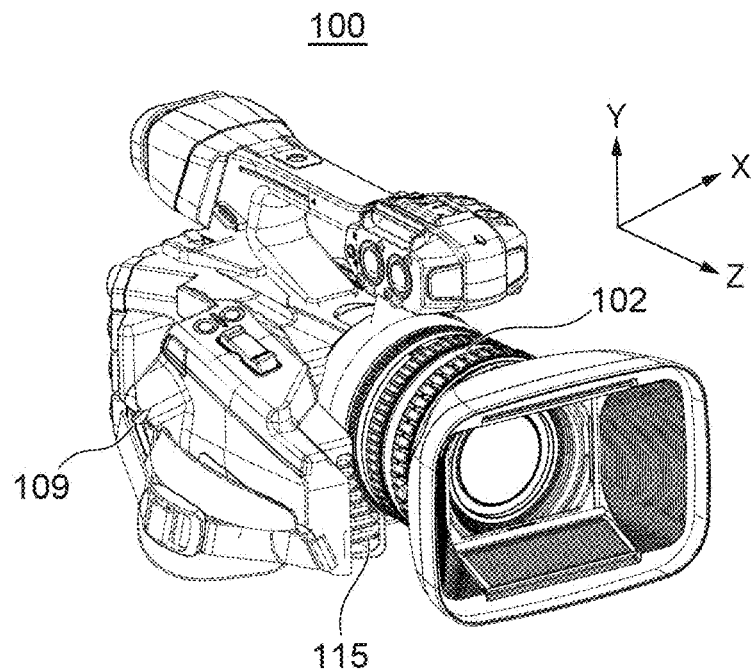
FIG. 2 is a second perspective view showing the appearance of the image capturing apparatus.
Figure 3:
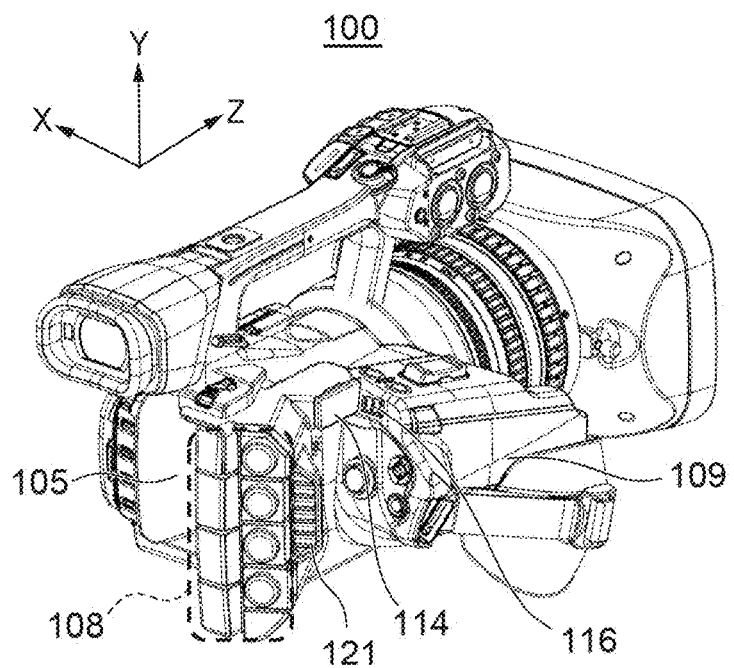
FIG. 3 is a third perspective view showing the appearance of the image capturing apparatus.
Figure 4:
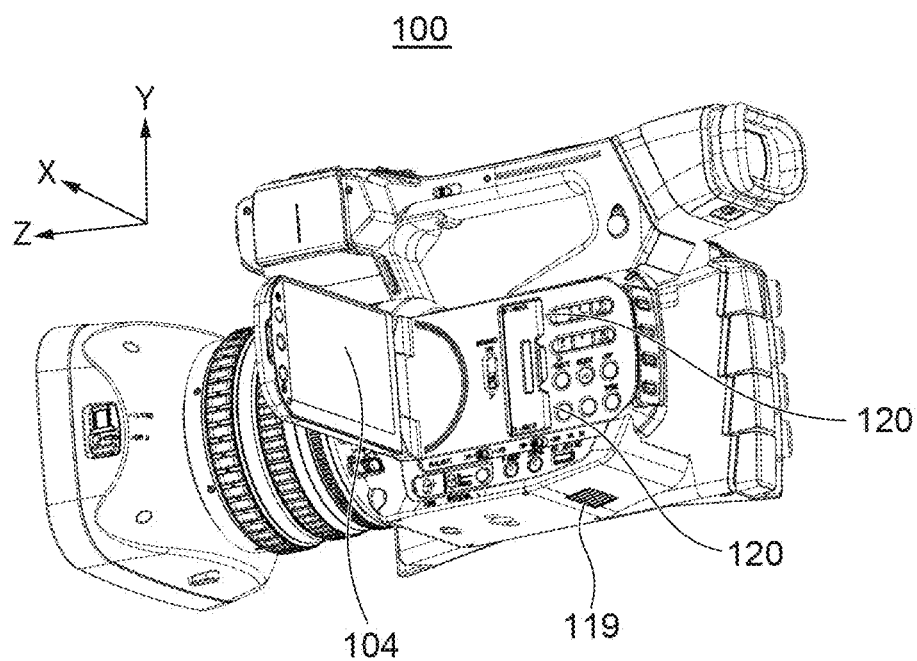
FIG. 4 is a fourth perspective view showing the appearance of the image capturing apparatus.

FIG. 1 is a perspective view showing the appearance of an image capturing apparatus 100 according to an embodiment of the present invention, as viewed from the front right side. FIG. 2 is a perspective view showing the appearance of the image capturing apparatus 100, as viewed from the front left side. FIG. 3 is a perspective view showing the appearance of the image capturing apparatus 100, as viewed from the rear left side. FIG. 4 is a perspective view showing the appearance of the image capturing apparatus 100, as viewed from the rear lower right.

Note that, for convenience of explanation, an X-axis, a Y-axis, and a Z-axis, which are orthogonal to each other, are defined with respect to the image capturing apparatus 100, as shown in FIGS. 1 to 4. The Z-axis is parallel to an image capturing optical axis of the image capturing apparatus 100, and a direction from a rear side toward a front side of the image capturing apparatus 100 (direction from the image capturing apparatus 100 toward an object (not shown)) is defined as a positive direction. The X-axis is orthogonal to the Z-axis within a horizontal plane defined when the Z-axis is parallel to a horizontal direction. In the present embodiment, the X direction is defined as a width direction of the image capturing apparatus 100, and a right side and a left side of the image capturing apparatus 100 are defined in association with respective positions as viewed from the front side of the image capturing apparatus 100. Further, a direction from the left side toward the right side, as viewed from the front side of the image capturing apparatus 100, is defined as a positive direction of the X direction. The Y-axis is orthogonal to the X-axis and the Z-axis. The Y-axis is defined as a vertical direction of the image capturing apparatus 100, and a direction from the bottom (which is placed on a photographer's shoulder or fixed to a tripod) toward the top of the image capturing apparatus 100 is defined as a positive direction thereof.

The front side of the image capturing apparatus 100 is provided with an image capturing lens 101 which is removably attached to an image capturing apparatus body in a state in which an objective surface thereof is exposed toward an object. The image capturing lens 101 has a plurality of lens groups, a plurality of movable optical elements, such as a diaphragm, and actuators that drive the optical elements. By driving the actuators, it is possible to perform zooming for changing a shooting angle by moving a predetermined lens group in a direction of the image capturing optical axis, focusing for adjusting the focus on an object, adjustment of the amount of light received by an image capturing device using a diaphragm mechanism, and so forth.

An operation ring section 102 is arranged around an outer periphery of the image capturing lens 101. The operation ring section 102 is a hollow cylindrical operation member configured to be rotatable about the image capturing optical axis extending through the image capturing lens 101 and is formed by three operation rings in the present example. The three operation rings are associated with zoom adjustment, focus adjustment, and aperture adjustment of the image capturing lens 101, respectively, and can be each adjusted to a desired state by rotating an associated one of the operation rings.

The top of the image capturing apparatus 100 is provided with a handle portion 103 having an annular shape and formed integrally with an upper portion of the image capturing apparatus body. The handle portion 103 is gripped by a photographer when low-angle shooting is performed by positioning the image capturing apparatus 100 at a height lower than the photographer's line of sight, more specifically, e.g. at a position of the photographer's belly portion or at a position close to a floor (the photographer's feet), or is gripped by the photographer (user) when he/she carries the image capturing apparatus 100.

The right side of the image capturing apparatus 100 is provided with a display section 104 such that the display section 104 is rotatable with respect to the image capturing apparatus body. The display section 104 is a flat monitor, such as a liquid crystal display device, and a shot image, an object image being captured, a menu for confirming various settings of the image capturing apparatus 100, etc. are displayed on the display section 104. Note that FIG. 4 shows the display section 104 in a state in which it is opened to face toward the rear side of the image capturing apparatus 100. Details of the display section 104 will be described hereinafter.

Figure 5:
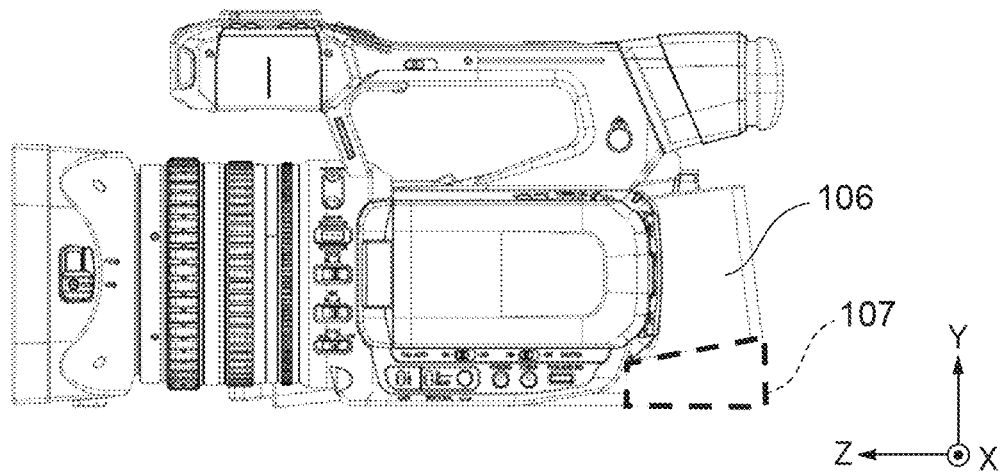
FIG. 5 is a side view of the image capturing apparatus in a state in which a battery is attached thereto.

The rear side of the image capturing apparatus 100 is provided with a battery chamber 105 in the form of a recess having an opening facing rearward of the image capturing apparatus 100. FIG. 5 is a side view of the image capturing apparatus 100 in a state in which a battery 106 is attached to the battery chamber 105. The battery chamber 105 is configured to have the battery 106 removably attached thereto which supplies electric power to the image capturing apparatus 100.

The battery chamber 105 is formed such that the upper side thereof is inclined toward the front side through a predetermined angle with respect to the image capturing optical axis of the image capturing lens 101. Therefore, as shown in FIG. 5, the battery 106 attached to the battery chamber 105 progressively becomes higher in position in the +Y direction as it extends further away from the rear surface of the image capturing apparatus 100. As a result, under the battery 106, an under-battery space 107 is generated which progressively becomes wider as it extends further away from the rear surface of the image capturing apparatus 100.

With this, when the image capturing apparatus 100 is used e.g. in a state placed on a tripod or a floor, a photographer can easily remove the battery 106 by inserting his/her fingers into the under-battery space 107 to hold the battery 106 and sliding the battery 106. In other words, the battery 106 can be easily replaced by another even in a situation where there is an obstacle under the image capturing apparatus 100, providing excellent usability.

On the left side of the battery chamber 105, a projecting portion is provided which projects rearward and leftward. A rear side of the projecting portion is provided with an external connection terminal section 108 (hereinafter referred to as the "connection terminal section 108") having a plurality of external connection terminals (connectors) for connection to an external device, which face rearward, and rearward and leftward. Note that details of the connection terminal section 108 will be described hereinafter.

A gripping portion 109 is provided approximately in the center of the left side of the image capturing apparatus 100. A photographer can hold the image capturing apparatus 100 at the height of the photographer's line of sight with a single hand by gripping the gripping portion 109. Note that when using the image capturing apparatus 100 by holding it with a single hand, the photographer can hold the image capturing apparatus 100, with higher stability and more excellent usability, by using his/her dominant hand. In general, most of people are right-handed, and hence, in the image capturing apparatus 100, the gripping portion 109 is integrally formed with the left side of the image capturing apparatus 100 so as to enable the photographer to easily hold the image capturing apparatus 100 with his/her right hand.

Figure 6:
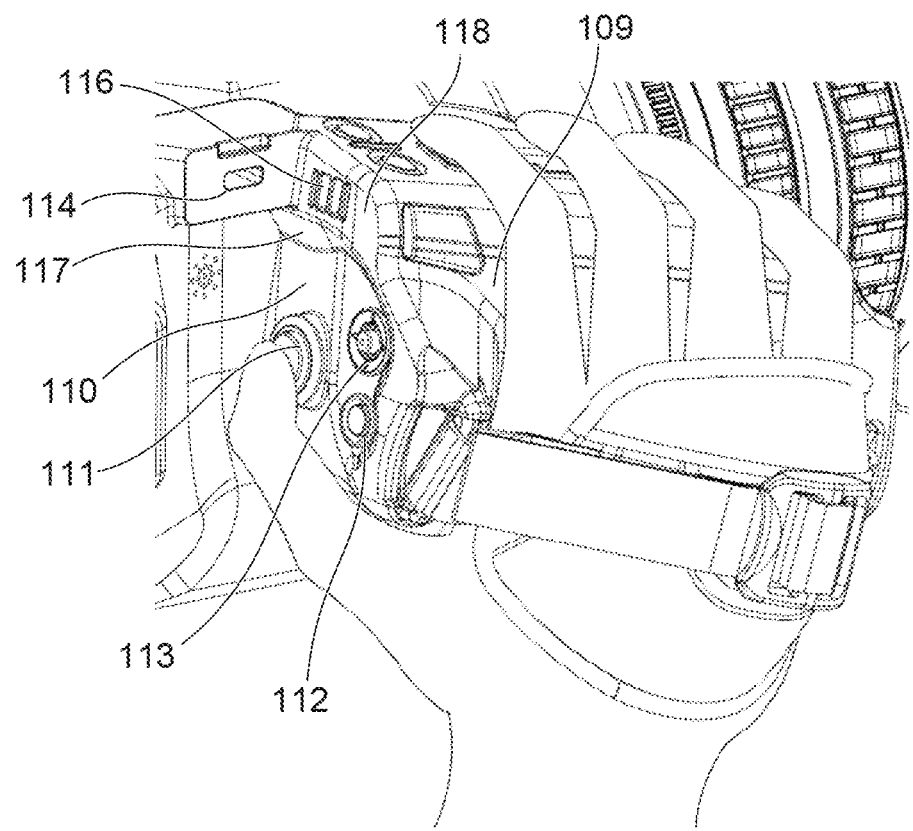
FIG. 6 is a view showing how a photographer holds a gripping portion of the image capturing apparatus.

FIG. 6 is a view showing how a photographer holds the image capturing apparatus 100. A rear side of the gripping portion 109 has an operation section arrangement surface 110 formed thereon. The operation section arrangement surface 110 is provided with a shooting start button 111, an enlarged display button 112 for displaying a shot image in an enlarged state, and a menu operation cross key 113. The operation section arrangement surface 110 is arranged in a lower portion of the rear surface of the gripping portion 109 so as to enable a photographer to operate each button arranged on the operation section arrangement surface 110 with his/her thumb while gripping the gripping portion 109 with his/her right hand.

The photographer can start shooting by pressing the shooting start button 111 when desiring to start shooting and terminate the shooting by pressing the shooting start button 111 again when desiring to terminate the shooting. The photographer can display a video displayed on the display section 104 in an enlarged state by pressing the enlarged display button 112. By displaying a video displayed on the display section 104 in an enlarged state before or during shooting, the photographer can closely check a focus state of the video. Further, the photographer can select one of items displayed on the display section 104 by moving a cursor displayed thereon in a desired one of the upward, downward, leftward, and rightward directions by pressing an associated portion of the menu operation cross key 113 and then pressing a center button. This enables the photographer to change the settings of the image capturing apparatus 100, including those of an exposure state and a photosensitivity, as desired.

The left side of the image capturing apparatus 100 has a USB connector 114 provided in a recessed area thereof between the gripping portion 109 and the connection terminal section 108. The USB connector 114 is one of external interface connectors of the image capturing apparatus 100, and is, in this embodiment, a USB Type-C connector conforming to the USB standard. The USB connector 114 is mounted on a USB circuit board 257, referred to hereinafter, and is configured to be electrically connectable to an external device capable of performing USB communication conforming to the USB standard. Therefore, when connected e.g. to a mobile communication device capable of operating at a communication speed not lower than a speed defined by LTE (Long Term Evolution) via the USB connector 114, the image capturing apparatus 100 is enabled to transmit data to a remote location using a public communication network.

The image capturing apparatus 100 has a forced cooling structure using a fan and a duct for suppressing increase in the temperature within the apparatus by efficiently discharging heat generated in the apparatus to the outside. As shown in FIG. 2, the image capturing apparatus 100 is provided with a first air inlet port 115 at a location forward of the gripping portion 109 and rearward of the operation ring section 102. The location where the first air inlet port 115 is provided is where the first air inlet port 115 is prevented from being covered with a photographer's left hand even when the photographer operates the operation ring section 102 with the hand while gripping the gripping portion 109 with his/her right hand, and hence, air can be stably drawn in.

As shown in FIG. 6, the rear side of the gripping portion 109 has an air inlet port arrangement surface 118 provided at a location above the operation section arrangement surface 110. The air inlet port arrangement surface 118 is arranged such that it is spaced from the operation section arrangement surface 110 by a wall surface 117 and projects rearward of the image capturing apparatus 100 more than the operation section arrangement surface 110.

The air inlet port arrangement surface 118 is formed with a second air inlet port 116. In this embodiment, as described hereinabove, the air inlet port arrangement surface 118 is formed, on the rear side of the gripping portion 109, as a step portion projecting rearward of the image capturing apparatus 100 to a predetermined distance from the operation section arrangement surface 110. Therefore, the second air inlet port 116 faces rearward. For this reason, even when a photographer holds the gripping portion 109 with his/her right hand, and operates each operation portion with his/her right-hand thumb, the range within which the right-hand thumb can move can be limited to the operation section arrangement surface 110 by the wall surface 117. In other words, it is difficult for the right-hand thumb to climb onto the air inlet port arrangement surface 118, and hence it is possible to prevent the second air inlet port 116 from being covered by the photographer's hand.

A central portion of an inclined surface of the bottom of the image capturing apparatus 100 along the slope of the battery chamber 105 in the X direction is provided with a third air inlet port 119, as shown in FIG. 4. The third air inlet port 119 is formed at a location higher than a main bottom surface (surface which is brought into contact with a floor when the image capturing apparatus 100 is placed on the floor (surface provided with a tripod mount)). Therefore, even in a case where the image capturing apparatus 100 is placed on a floor, a space is secured between the third air inlet port 119 and the floor to prevent the third air inlet port 119 from being blocked, and hence it is possible to stably draw in air.

As shown in FIG. 4, a surface of the image capturing apparatus 100 inside the display section 104, which is exposed to the appearance when the display section 104 is opened, is provided with fourth air inlet ports 120 which are arranged at respective two locations in the Y direction. Further, a left side wall of the connection terminal section 108 is provided with an air outlet port 121 which is open obliquely rearward and leftward. The air outlet port 121 is arranged in the image capturing apparatus 100 at a location rearward of the gripping portion 109 and opens substantially in an intermediate direction between the rearward direction (−Z direction) and the leftward direction (−X direction). Therefore, exhaust wind is prevented from blowing against a photographer's right hand or face when the image capturing apparatus 100 is in use, which provides excellent usability.

Figure 7:
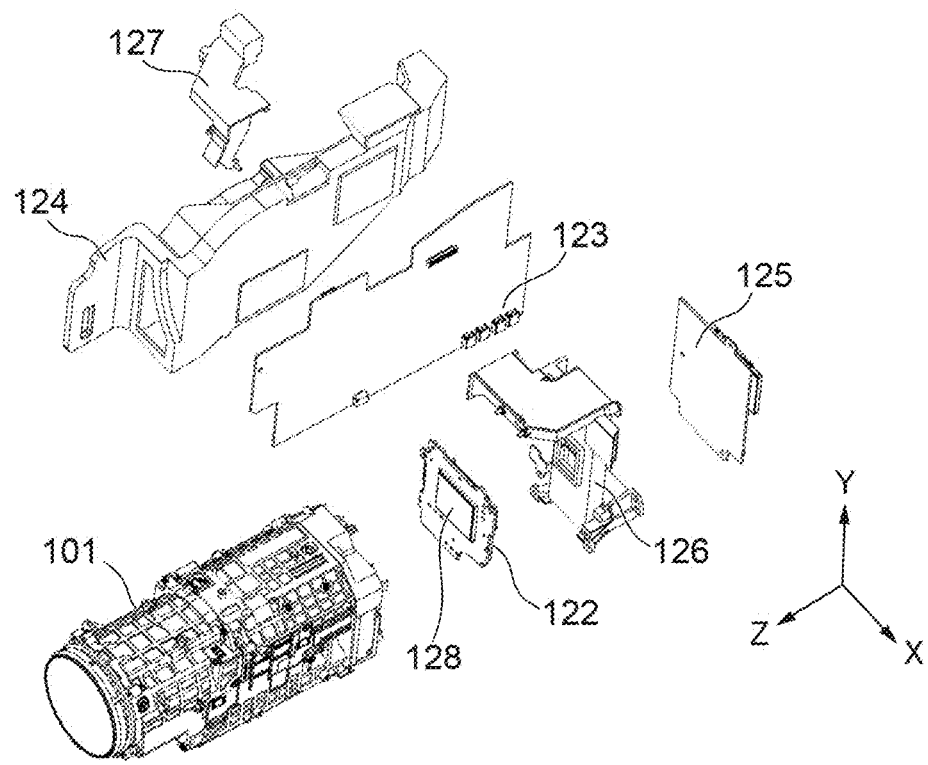
FIG. 7 is an exploded perspective view of a forced cooling structure of the image capturing apparatus.

Next, the forced cooling structure of the image capturing apparatus 100 will be described. FIG. 7 is an exploded perspective view of the forced cooling structure of the image capturing apparatus 100. The image capturing apparatus 100 includes the image capturing lens 101, a sensor circuit board 122, a main control circuit board 123, a main duct 124, a card circuit board 125, a sensor duct 126, and a gripping portion intake duct 127. The optical system of the image capturing lens 101 is configured to form an optical image of an object on an image capturing surface of the image capturing device, denoted by reference numeral 128, mounted on the sensor circuit board 122. The sensor circuit board 122, the main control circuit board 123, and the card circuit board 125 each have various electrical components and electronic components (hereinafter referred to as the "heat generating elements") mounted thereon, which require to be cooled because they generate heat by operation.

Figure 8A:
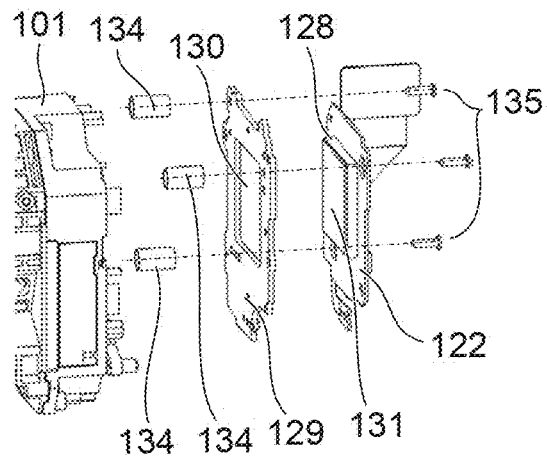
FIGS. 8A and 8B are exploded perspective views of a sensor circuit board and components therearound, included in the image capturing apparatus.
Figure 8B:
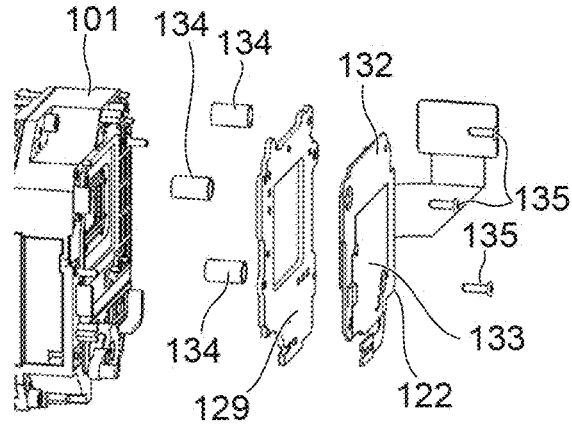

FIGS. 8A and 8B are exploded perspective views of the sensor circuit board 122 and components therearound. FIG. 8A is an exploded perspective view, as viewed from the front right side, while FIG. 8B is an exploded perspective view, as viewed from the rear right side.

The image capturing device 128 is mounted on the front side of the sensor circuit board 122. The image capturing device 128 generates heat when generating digital video signals by photoelectric conversion, which increases the temperature of the sensor circuit board 122.

A sensor fixing sheet metal 129 is arranged in front of the sensor circuit board 122, and an image capturing surface-protecting member 131 of the image capturing device 128 is exposed from a rectangular opening 130 formed in the sensor fixing sheet metal 129. The sensor fixing sheet metal 129 is fixed to the sensor circuit board 122 with an adhesive, not shown, after adjusting its relative position to the image capturing device 128 with high accuracy. Here, in an area of a shadow of the image capturing device 128, projected in the Z direction, on an image capturing device non-mounting surface 132, no other electronic components and the like are mounted, but a sensor heat dissipation surface 133 is provided on which conductors of the sensor circuit board 122 are exposed by removing an insulating protective film from the surface of the sensor circuit board 122.

Note that the focus position of the image capturing lens 101 and the inclination of the image capturing optical axis include individual product-dependent variations (individuality variations), and hence it is necessary to arrange the image capturing device 128 at a proper position and a proper inclination according to the individuality variation of the image capturing lens 101. The sensor fixing sheet metal 129 is floatingly supported by coil springs 134 which generate an urging force for separating the sensor fixing sheet metal 129 from the image capturing lens 101 and position adjustment screws 135. By properly fastening the position adjustment screws 135, it is possible to adjust the position of the image capturing device 128 in a front-rear direction (position in the Z direction) and the inclination with respect to the image capturing optical axis, and thereby arrange the image capturing device 128 at a desired position. The sensor circuit board 122 on which the image capturing device 128 is mounted is thus adjusted and fixed on an individual product basis, and hence the position and the inclination of the sensor circuit board 122 with respect to the image capturing lens 101 are different for each individual product of the image capturing apparatus 100.

Figure 9:
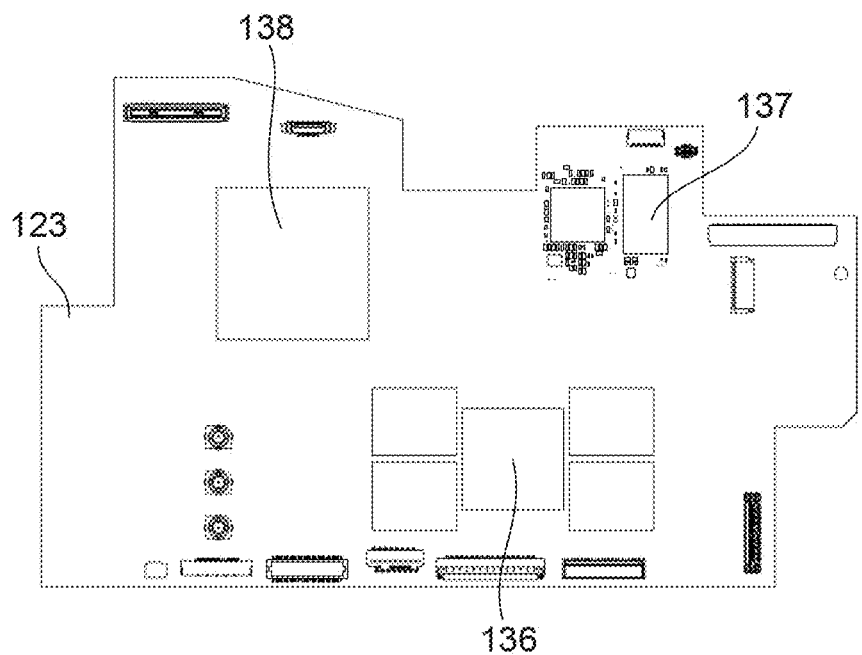
FIG. 9 is a view showing a surface of a main control circuit board, on which heat generating elements are mounted, included in the image capturing apparatus.

FIG. 9 is a view showing a mounting surface of the main control circuit board 123, on which heat generating elements are mounted. The main control circuit board 123 controls the overall operation of the image capturing apparatus 100. On the mounting surface of the main control circuit board 123, there are mounted a lot of ICs that consume large power and generate heat, including a video signal processor 146, referred to hereinafter, for processing signals output from the image capturing device 128. In the image capturing apparatus 100 according to the present embodiment, the heat generating elements include a front lower heat generating element 136 mounted on a front lower portion of the circuit board, a front upper heat generating element 137 mounted on a front upper portion of the circuit board, and a rear heat generating element 138 mounted on a rear upper portion of the circuit board, and these elements are mounted on the same surface which is the mounting surface.

The main duct 124 is a member having a cavity therein and incorporates a rotary fan 148 (see FIG. 13), described hereinafter. Air cooling is forcedly performed by driving the rotary fan 148 to generate a flow of air within the main duct 124, whereby it is possible to dissipate heat generated within the image capturing apparatus 100 to the outside and thereby cool the inside of the image capturing apparatus 100. Details of the forced cooling will be described hereinafter.

Figure 10A:
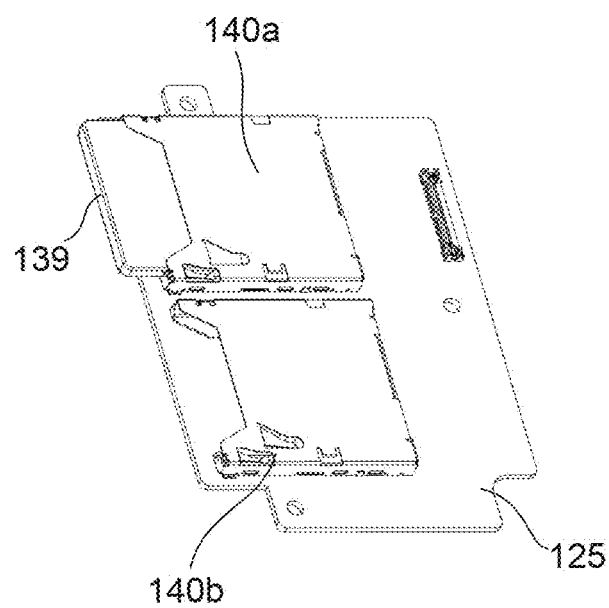
FIGS. 10A and 10B are perspective views of a card circuit board included in the image capturing apparatus.
Figure 10B:
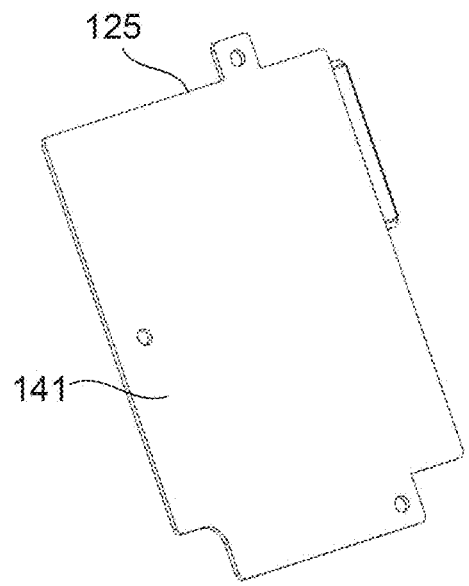

FIGS. 10A and 10B are perspective views of the card circuit board 125. FIG. 10A is a perspective view, as viewed from the rear side (−Z side), and FIG. 10B is a perspective view, as viewed from the front side (+Z side).

The card circuit board 125 has two card holders 140*a* and 140*b* mounted thereon, to each of which card a recording medium 139 as a removable flash memory for saving (storing) image data and audio data, such as an SD card, can be removably attached. On a card holder non-mounting surface 141, which is a surface opposite to the surface on which the card holders 140*a* and 140*b* are mounted, signal trances, not shown, are exposed to the outside so as to improve heat diffusion efficiency.

Figure 11A:
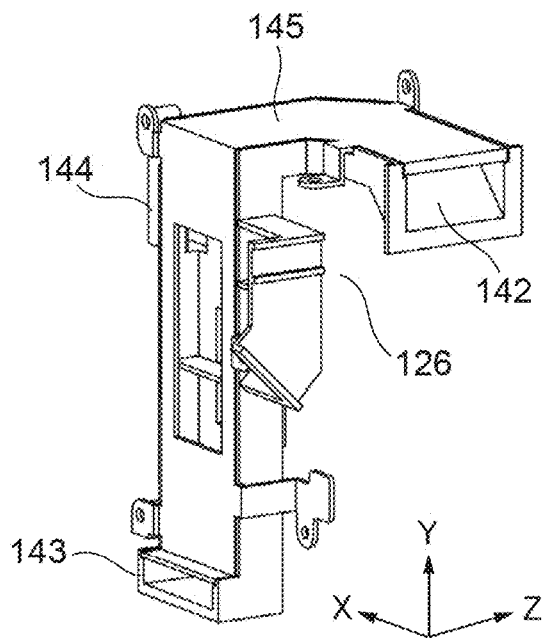
FIGS. 11A and 11B are perspective views of a sensor duct included in the image capturing apparatus.
Figure 11B:
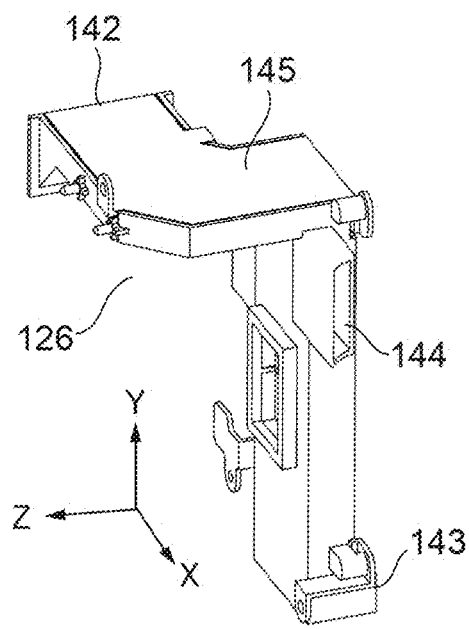

FIGS. 11A and 11B are perspective views of the sensor duct 126. The sensor duct 126 is a component having a cavity formed therein, and has a first opening 142 in an upper side (+Y side), a second opening 143 in a lower side (−Y side), and a third opening 144 in a right side (+X side) thereof. The first opening 142 communicates with the main duct 124 without any gap. The second opening 143 communicates with the third air inlet port 119 formed in the bottom surface of the image capturing apparatus 100 without any gap. The third opening 144 communicates with the fourth air inlet ports 120 formed in the right side surface of the image capturing apparatus 100 without any gap.

When the forced cooling in which the rotary fan 148 (see FIG. 13) provided in the main duct 124 is operated is performed, air flows are generated from the third air inlet port 119 and the fourth air inlet ports 120 to the first opening 142 by the air-drawing action of the rotary fan 148. The sensor duct 126 is arranged between the sensor circuit board 122 and the card circuit board 125 to cool the sensor circuit board 122 and the card circuit board 125. Further, the sensor duct 126 has a sensor duct flat portion 145 which is exposed to the upper side (+Y side) in the vicinity of the first opening 142. Although described in detail hereinafter, the sensor duct flat portion 145 is thermally connected to the handle portion 103 such that heat is exchangeable therebetween.

The gripping portion intake duct 127 is a tubular component having a cavity, which is disposed inside the gripping portion 109, and has one end communicating with the main duct 124 without any gap, and the other end communicating with the second air inlet port 116 without any gap. Although described in detail hereinafter, when the forced cooling in which the rotary fan 148 is driven is performed, an air flow is generated from the second air inlet port 116 to the main duct 124 by the air-drawing action of the rotary fan 148.

Figure 12:
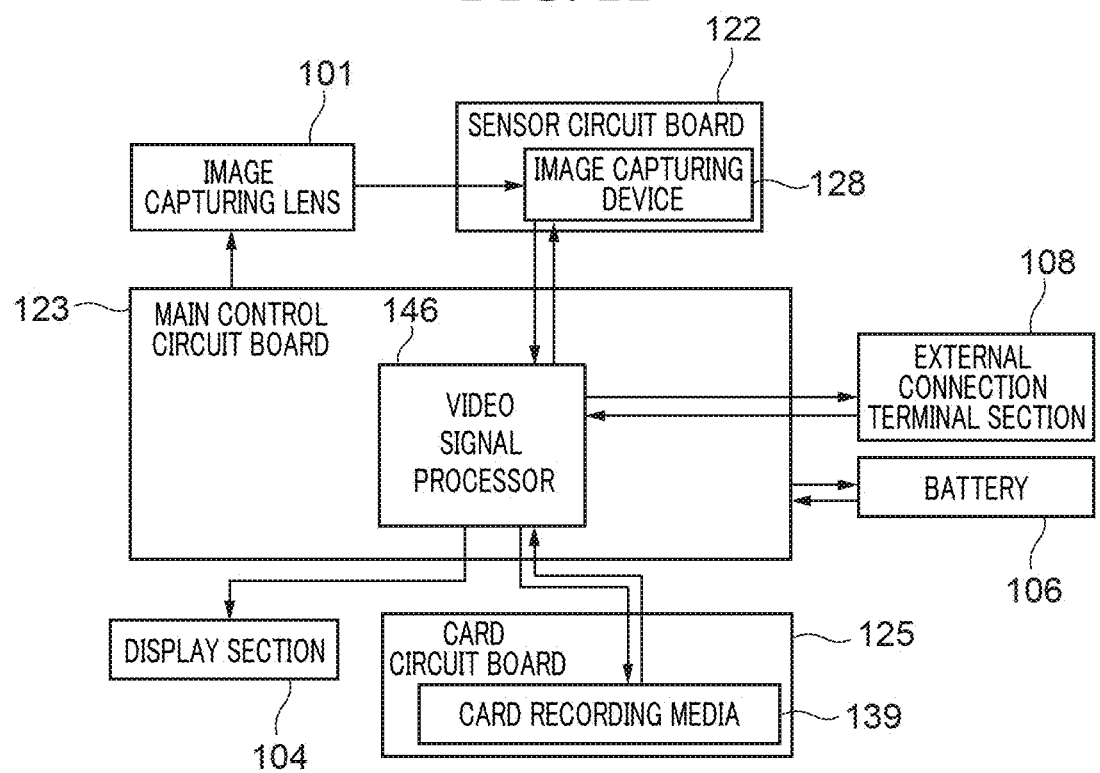
FIG. 12 is a block diagram of components of the image capturing apparatus, which are related to video processing performed by the image capturing apparatus.

Here, a flow of an image capturing process (video processing) performed by the image capturing apparatus 100 will be described. FIG. 12 is a block diagram of components of the image capturing apparatus 100, which are related to the video processing performed by the image capturing apparatus 100.

The image capturing apparatus 100 is operated by electric power supplied from the battery 106. When image capturing is started, incident light through the image capturing lens 101 forms an optical image on the image capturing surface of the image capturing device 128 mounted on the sensor circuit board 122. In the sensor circuit board 122, digital video signals corresponding to signals photoelectrically converted from the optical image and output by the image capture device 128 are generated. The generated digital video signals are output to the video signal processor 146 on the main circuit board 123. The video signal processor 146 performs predetermined processing on the input digital video signals, and generates video data by combining audio signals, which have been separately input, and various meta data, with the processed digital video signals. For example, as the video data, data of a video having a resolution of 4K image quality at 24 fps or higher is generated.

Note that the video signal processor 146 includes the three elements of the front lower heat generating element 136, the front upper heat generating element 137, and the rear heat generating element 138. Further, the video data generated by the video signal processor 146 is sent to the display section 104 and displayed as a video. At this time, the operating status of the image capturing apparatus 100 is displayed as on-screen display information, on an as-needed basis. Further, in a case where recording of the video data is selected by a photographer, the video data generated by the video signal processor 146 is converted to a predetermined format, such as RAW or WP4, by performing predetermined processing thereon.

The video data thus converted to the predetermined format is sent to the card circuit board 125 and stored in one of the card recording media 139 attached to the card circuit board 125. Further, in a case where a predetermined cable is connected to the connector of the connection terminal section 108, the video data can be transmitted from the video signal processor 146 to an external apparatus via the connection terminal section 108 and the cable. Further, in the image capturing apparatus 100, it is possible to cause video data stored in the card recording medium 139 to be read by the video signal processor 146 for reproduction and display on the display section 104, or for outputting to the connection terminal section 108.

Figure 13:
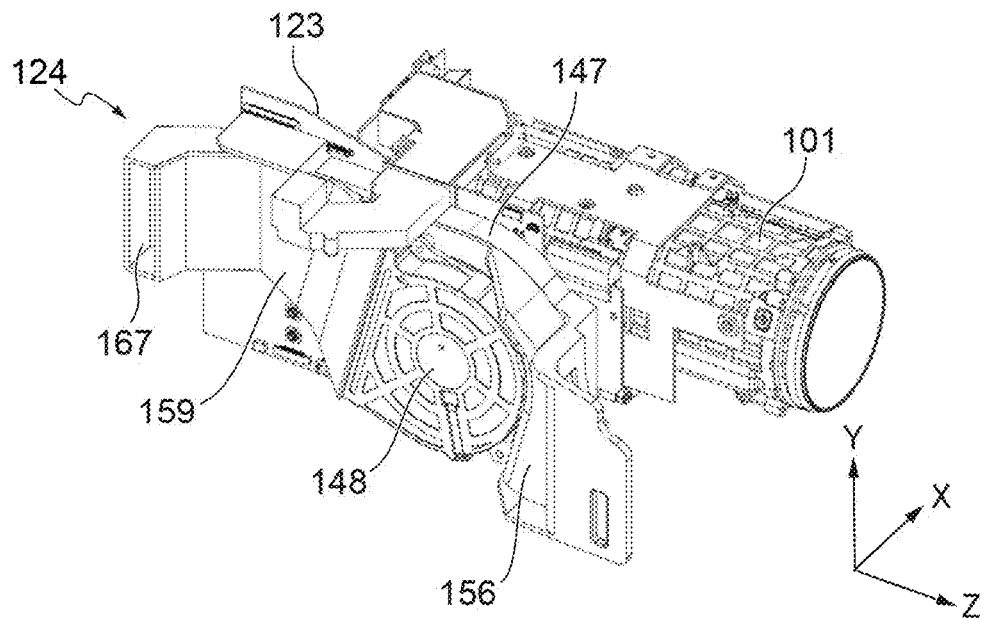
FIG. 13 is a perspective view showing a structure of a main duct and components therearound, included in the image capturing apparatus.
Figure 14:
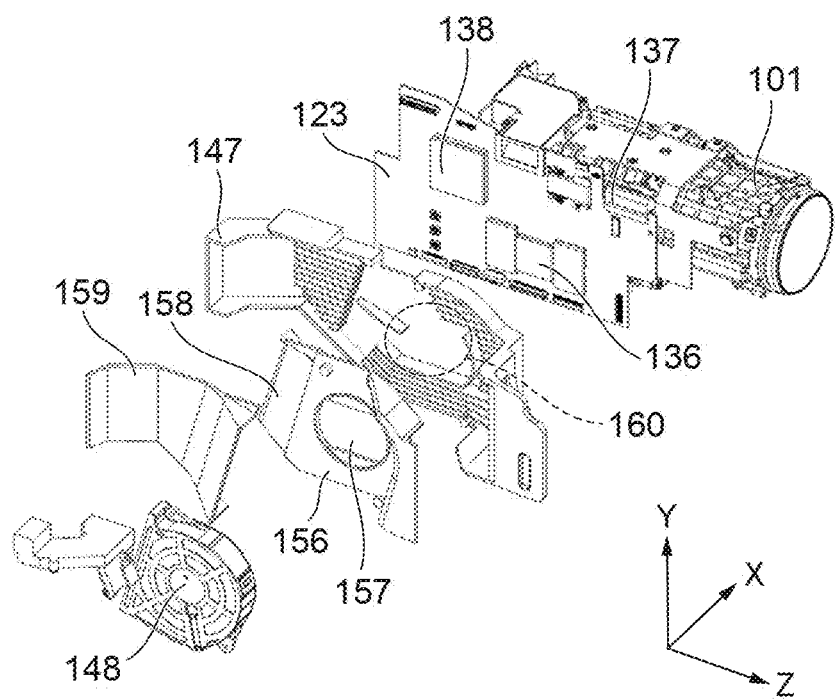
FIG. 14 is an exploded perspective view showing the structure of the main duct and components therearound.

FIG. 13 is a perspective view showing a structure of the main duct 124 and components therearound. FIG. 14 is an exploded perspective view showing the structure of the main duct 124 and components therearound. The main duct 124 includes a duct base 147, the rotary fan 148, a front duct cover 156, and a rear duct cover 159. The main duct 124 is arranged on the left side (−X side) of the image capturing lens 101 inside the image capturing apparatus 100 such that it is in contact with the main control circuit board 123.

The duct base 147 is formed of a material having high thermal conductivity, such as a die-cast aluminum material. Heat dissipation rubbers, not shown, are sandwiched between the duct base 147 and the main control circuit board 123 in a compressed state. For the heat dissipation rubbers, a material obtained by kneading e.g. metal filler in a material which is soft and has a high elasticity, such as a silicone rubber, is preferably used, and this makes it possible to smoothly transfer heat between components without generating a large reaction force.

More specifically, the front lower heat generating element 136, the front upper heat generating element 137, and the rear heat generating element 138 are mounted on the same surface of the main control circuit board 123 toward the duct base 147, and the heat dissipation rubbers are arranged between these three heat generating elements and the duct base 147. That is, the heat generating elements mounted on the main control circuit board 123 are in close contact with the duct base 147 via the heat dissipation rubbers. Thus, it is possible to efficiently dissipate heat generated in the main control circuit board 123 to the duct base 147.

Figure 15:
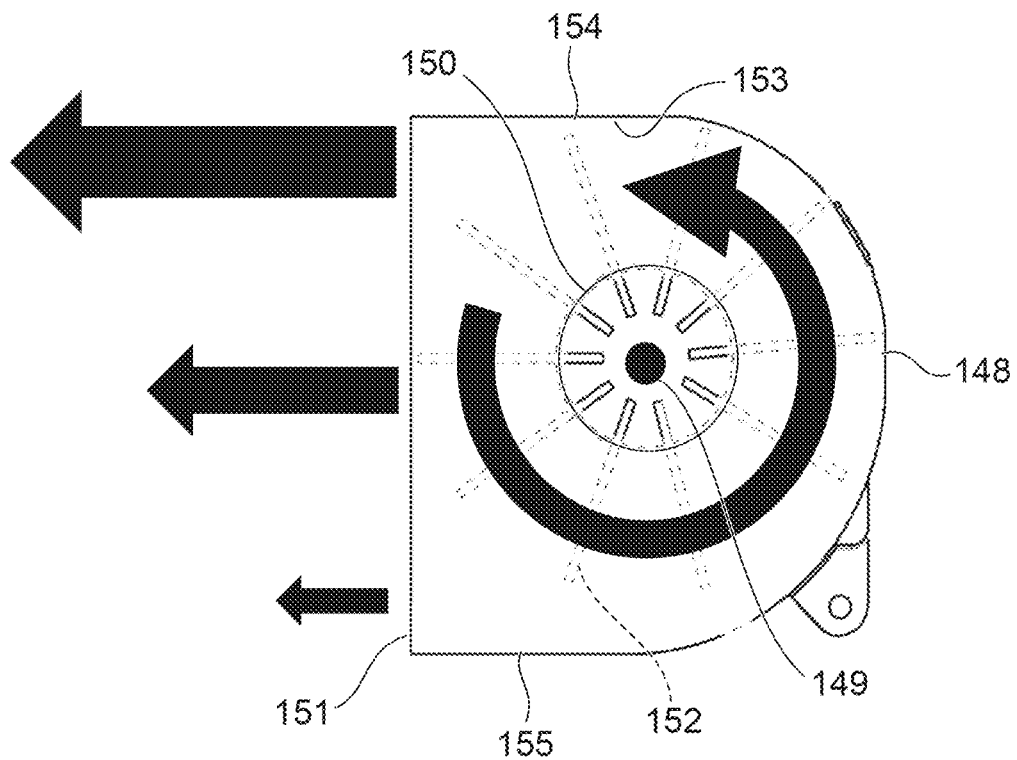
FIG. 15 is a view useful in explaining a rotary fan as a component of the forced cooling structure.

FIG. 15 is a view useful in explaining the rotary fan 148. In FIG. 15, rough air flow rate distribution of exhaust wind generated when driving the rotary fan 148 is expressed by arrows having different sizes (as the arrow is larger, the flow rate of exhaust wind air is larger).

The rotary fan 148 is a centrifugal fan, and has a structure in which an impeller 152 having a plurality of blades arranged radially around a fan rotational axis 149 can be rotated about the fan rotational axis 149 by a drive force of a motor, not shown. One surface of a casing of the rotary fan 148 is formed with a suction port 150 having a substantially circular shape, and the center of the suction port 150 substantially coincides with the fan rotational axis 149. Further, a side wall of the rotary fan 148 is formed with a discharge port 151.

In the rotary fan 148, when the impeller 152 is rotated, a negative pressure is generated in the center of the impeller 152, and air around the rotary fan 148 is drawn from the suction port 150 into the rotary fan 148. Then, the air drawn into the rotary fan 148 is pushed outward from a central side toward a peripheral side by a centrifugal force of the rotating impeller 152, flows along a fan inner wall 153, and is then discharged from the discharge port 151 as exhaust wind. Inside the rotary fan 148, air is conveyed while being pushed outward from the central side toward the peripheral side, and hence the flow rate of exhaust wind air flowing out of the discharge port 151 shows a biased distribution in which the flow rate of air on a side toward the outer wall 154 of the discharge port 151 is larger and the flow rate of air on a side toward the other outer wall 155 is smaller.

The front duct cover 156 and the rear duct cover 159 are cover members of the duct base 147. The front duct cover 156 has a portion where the rotary fan 148 is attached and has a fan opening 157 (see FIG. 14) formed therethrough. Further, the front duct cover 156 is provided with an inclined wall 158 at a predetermined angle with respect to the surface to which the rotary fan 148 is attached.

At respective locations corresponding to the suction port 150 of the rotary fan 148, there are disposed the fan opening 157 of the front duct cover 156 and a fan intake area 160 of the duct base 147. This makes it possible to cause air to smoothly flow from the fan intake area 160 to the rotary fan 148.

Figure 16:
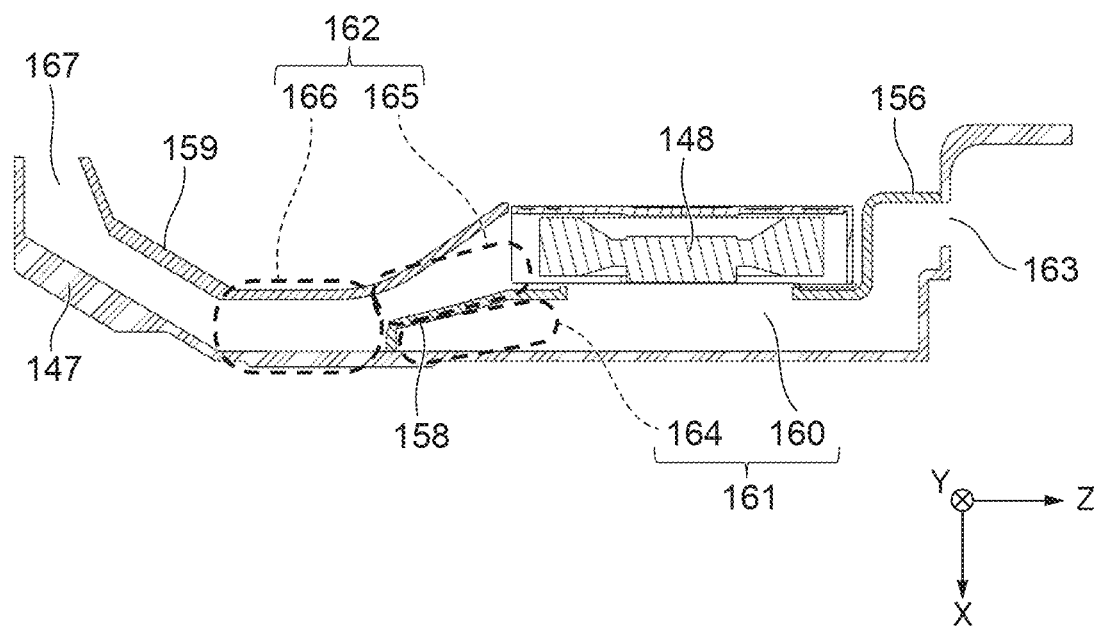
FIG. 16 is a cross-sectional view of a structure of the main duct.

FIG. 16 is a cross-sectional view of the main duct 124 taken along an X-Z plane. A plurality of continuous hollow portions are formed inside the main duct 124 by combining the above-mentioned components. An intake duct 161 is formed in front of the suction port 150 of the rotary fan 128 and an exhaust duct 162 is formed to communicate with the discharge port 151, whereby a flow passage into which air is drawn and from which air is exhausted is formed.

The intake duct 161 has the fan intake area 160 and a detour area 164. The fan intake area 160 is an area sandwiched between the duct base 147, and the front duct cover 156 and the rotary fan 148, and extends from a main duct intake opening 163 to the rotary fan 148. The detour area 164 is an area sandwiched between the inclined wall 158 formed on the front duct cover 156 and the duct base 147, and plays a role of causing air having passed through the fan intake area 160 to detour and return to the fan intake area 160, thereby guiding the air toward the suction port 150 of the rotary fan 148. Note that the main duct intake opening 163 and the first air inlet port 115 communicate with each other without any gap.

The exhaust duct 162 is so provided as to communicate with the discharge port 151 of the rotary fan 148 and has a slope portion 165 formed toward the discharge port 151 and an exhaust-side heat dissipation portion 166 formed toward a main duct exhaust opening 167. The slope portion 165 is an area sandwiched between the inclined wall 158 of the front duct cover 156 and the rear duct cover 159. The exhaust-side heat dissipation portion 166 is provided on a downstream side of the slope portion 165 and leads to the main duct exhaust opening 167. Note that the main duct exhaust opening 167 communicates with the air outlet port 121 without any gap.

Figure 17:
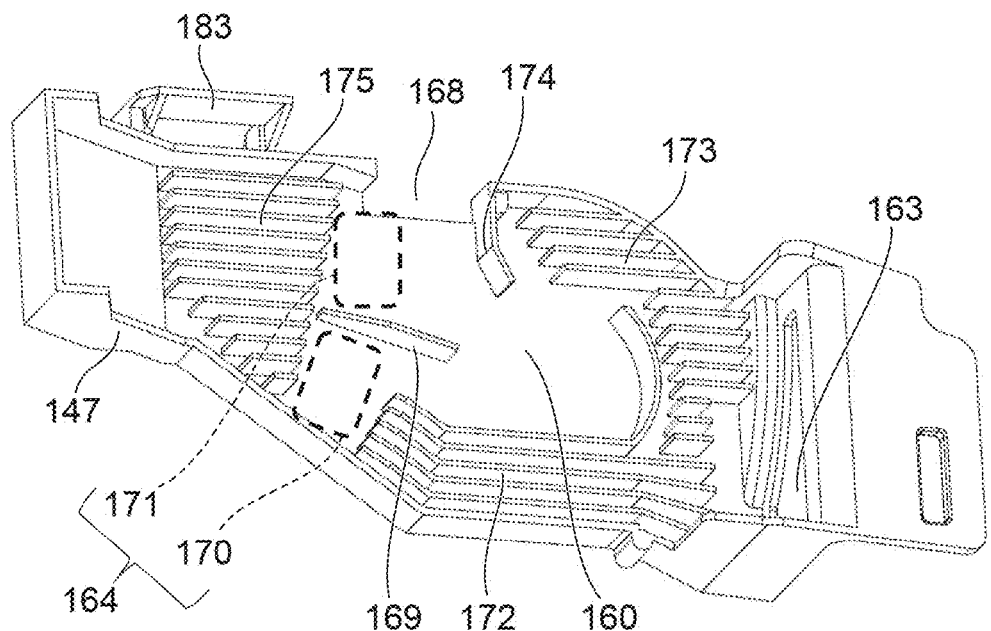
FIG. 17 is a perspective view of a duct base as a component of the main duct.

FIG. 17 is a perspective view of the duct base 147. The duct base 147 has the main duct intake opening 163 in the form of a through hole in an erected wall on the front side (+Z side (see FIG. 14)). Further, the fan intake area 160 is provided in a central portion of the duct base 147 in a longitudinal direction (Z direction), and a connection opening 168 formed by cutting part of the side wall (wall portion on the +Y side) and part of the bottom (wall portion on the +X side) is provided on an upper side (+Y side (see FIG. 14)) of the fan intake area 160. The connection opening 168 is connected to the first opening 142 of the sensor duct 126 without any gap when the main duct 124 is assembled.

A substantially central portion of the detour area 164 in the duct base 147 is provided with a first shield wall 169, and the first shield wall 169 forms a boundary wall for separating an upper detour area 171 and a lower detour area 170. The detour area 164 (see FIG. 16) is formed by the upper detour area 171 and the lower detour area 170, and therefore, the lower detour area 170 and the upper detour area 171 communicate with the fan intake area 160.

Lower heat dissipation fins 172 as a plurality of rib-shaped portions which are formed integrally with the duct base 147 and extend in the front-rear direction (Z direction) are provided on a lower side (−Y side) of the fan intake area 160. Further, upper heat dissipation fins 173 as a plurality of rib-shaped portions which are formed integrally with the duct base 147 and extend in the front-rear direction (Z direction) are provided on the upper side (+Y side) of the fan intake area 160. A second shield wall 174 is provided between the connection opening 168 and the upper heat dissipation fins 173. Exhaust-side heat dissipation fins 175 as a plurality of rib-shaped portions which are formed integrally with the duct base 147 and extend in the front-rear direction (Z direction) are provided on a rear side (−Z side) of the detour area 164.

Figure 18:
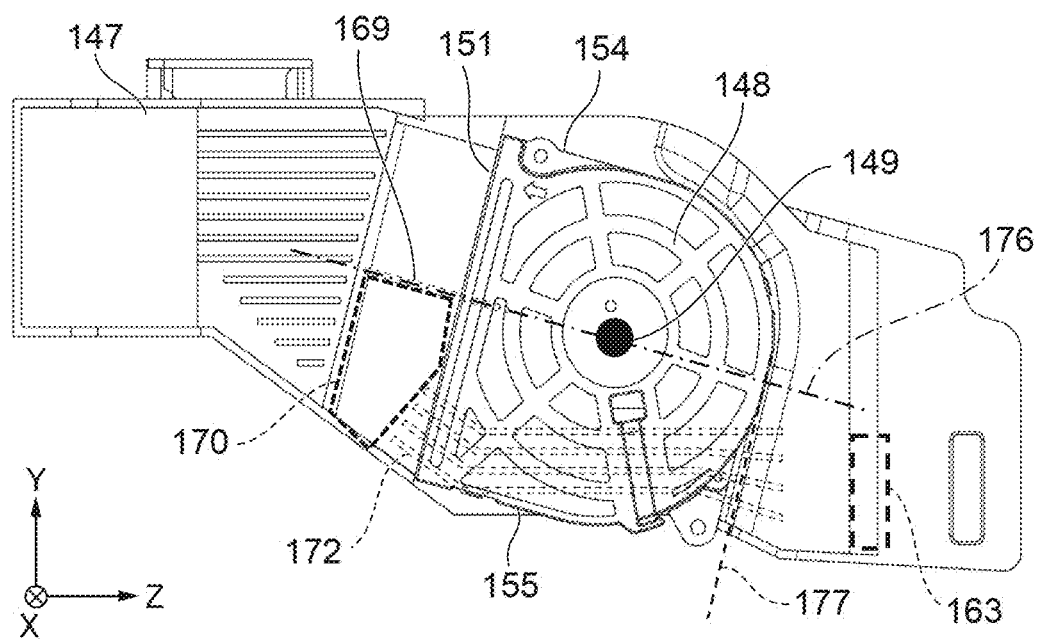
FIG. 18 is a view showing a positional relationship between the rotary fan and lower heat dissipation fins in the main duct.

FIG. 18 is a view showing a positional relationship between the rotary fan 148 and the lower heat dissipation fins 172, as viewed from the −X side to the +X side. The lower heat dissipation fins 172 are arranged closer to the outer wall 155 than a center line 176 is which passes the fan rotational axis 149 and is perpendicular to the discharge port 151 such that a shadow thereof projected in the X direction overlaps the rotary fan 148. Further, the lower heat dissipation fins 172 each have one end (+Z side) disposed at a location closer to the main duct intake opening 163 than a casing front end 177 of the rotary fan 148 is, and the other end (−Z side) extending to the lower detour area 170 which is closer to the exhaust-side heat dissipation fins 175 than the discharge port 151 of the rotary fan 148 is.

Figure 19:
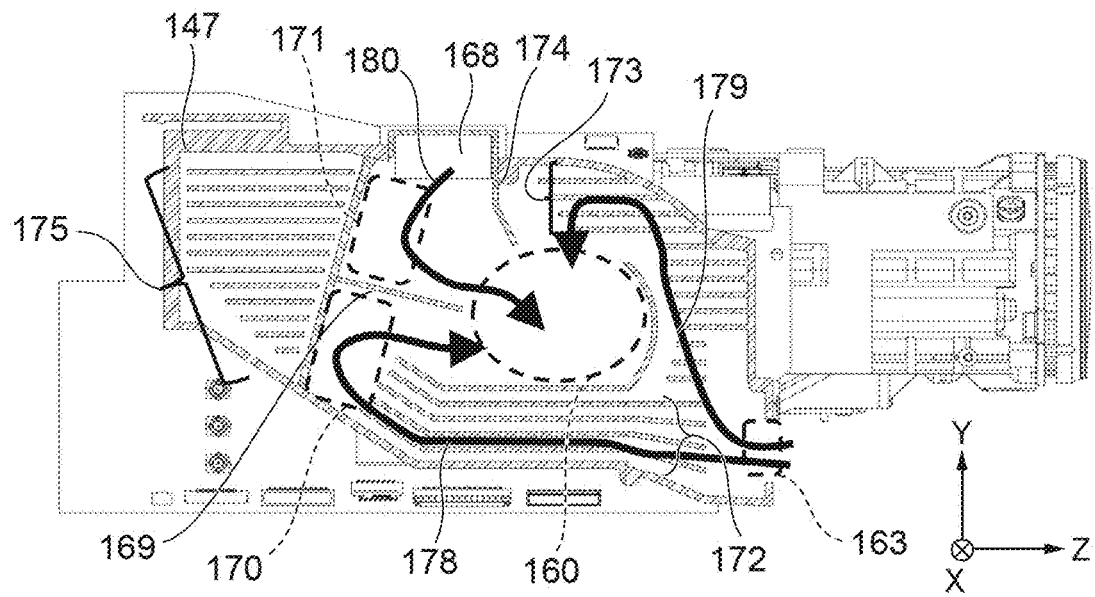
FIG. 19 is a view illustrating flows of air in the main duct.

Here, flows of air in the main duct 124 will be described. FIG. 19 is a view illustrating the flows of air in the main duct 124, as viewed from the −X side to the +X side. In the main duct 124, a first intake air flow 178, a second intake air flow 179, and a third intake air flow 180 are generated.

The first intake air flow 178 is a flow of air that is drawn in from the main duct intake opening 163, flows through the lower side of the fan intake area 160 via the lower heat dissipation fins 172, and flows into the fan intake area 160 via the lower detour area 170. The lower detour area 170 is arranged rearward (on the −Z side) of the fan intake area 160, and hence the passage of the first intake air flow 178 reaches the fan intake area 160 after making a U-turn. The second intake air flow 179 is a flow of air that is drawn in from the main duct intake opening 163, and flows into the fan intake area 160 from the upper side of the fan intake area 160 after flowing between the upper heat dissipation fins 173. The third intake air flow 180 is a flow of air that flows into the fan intake area 160 from the connection opening 168.

A rear portion of the duct base 147, corresponding to the exhaust-side heat dissipation portion 166, is provided with the exhaust-side heat dissipation fins 175 as the plurality of rib-shaped portions which are formed integrally with the duct base 147 and extend in the front-rear direction (Z direction). Exhaust wind discharged from the rotary fan 148 necessarily passes the area where the exhaust-side heat dissipation fins 175 are provided.

Figure 20:
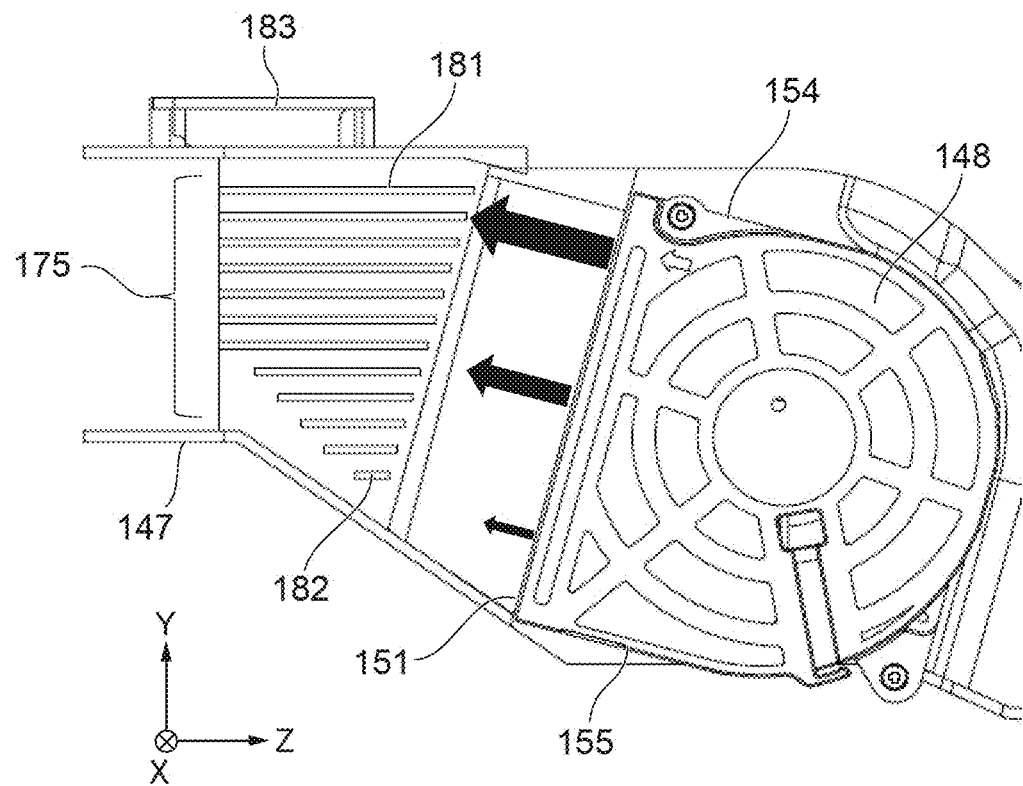
FIG. 20 is a view showing a relationship between exhaust-side heat dissipation fins and the rotary fan in the main duct.

FIG. 20 is a view showing a relationship between exhaust-side heat dissipation fins 175 and the rotary fan 148, and the size of each arrow schematically represents the magnitude of a flow rate of exhaust wind air (as the arrow is larger, the flow rate of exhaust wind air is larger). The exhaust-side heat dissipation fins 175 are provided in plurality in the exhaust duct 162, but are not uniform in length. More specifically, out of the exhaust-side heat dissipation fins 175, ones arranged on the upper side (+Y side) toward the outer wall 154, where the flow rate of exhaust wind air discharged from the rotary fan 148 is larger, are exhaust-side heat dissipation fins 181 which are each long in entire length. On the other hand, ones arranged on the lower side (−Y side) toward the outer wall 155, where the flow rate of exhaust wind air discharged from the rotary fan 148 is smaller, are exhaust-side heat dissipation fins 182 which are each shorter in entire length than the exhaust-side heat dissipation fins 181. The exhaust-side heat dissipation fins 175 are thus formed such that ventilation resistance is small in an area where the air flow rate is small, whereby it is possible to increase the heat dissipation efficiency.

Further, in the vicinity of the exhaust-side heat dissipation fins 181 arranged toward the upper side (+Y side) of the exhaust-side heat dissipation portion 166 of the duct base 147, a USB connection wall portion 183 is formed integrally with the duct base 147. The USB connection wall portion 183 has a flat shape and is substantially parallel to the exhaust-side heat dissipation fins 175.

Figure 21:
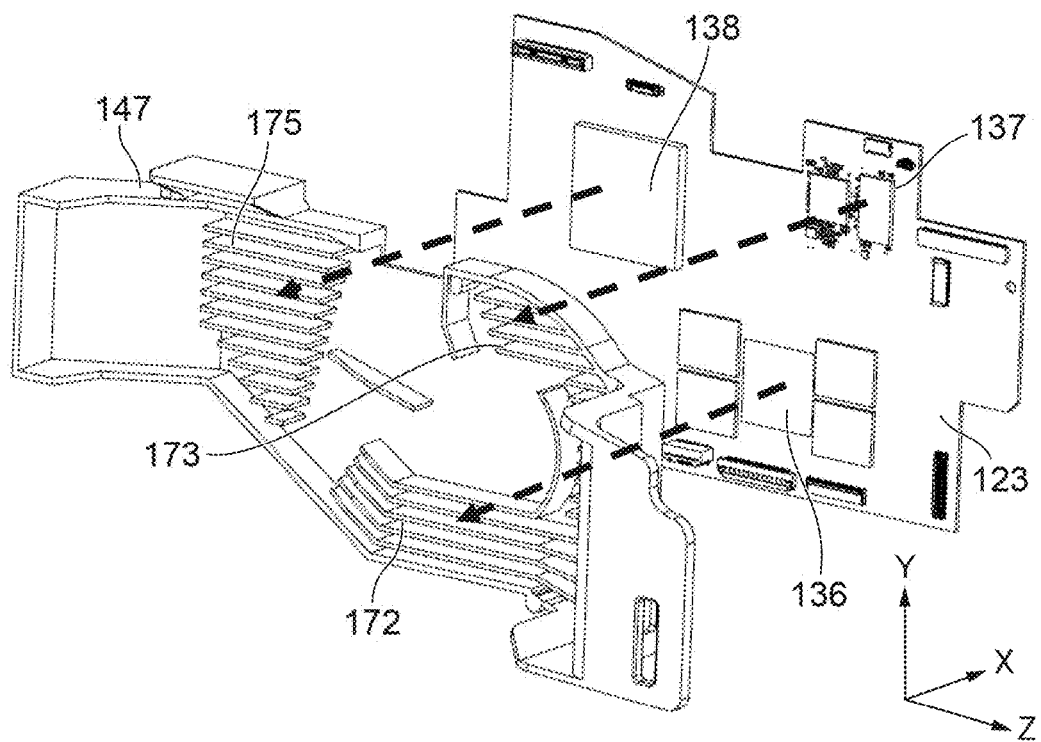
FIG. 21 is a view showing a positional relationship between sections of rib-shaped portions (sections of dissipation fins) of the main duct and heat generating elements.

Here, a positional relationship between the rib-shaped portions (fins) and the heat generating elements will be described. FIG. 21 is a view showing the positional relationship between the rib-shaped portions of the duct base 147 and the heat generating elements on the main control circuit board 123. The front lower heat generating element 136 as one of the heat generating elements mounted on the main control circuit board 123 is arranged such that a shadow thereof projected in the X direction overlaps the lower heat dissipation fins 172. Further, the front upper heat generating element 137 is arranged such that a shadow thereof projected in the X direction overlaps the upper heat dissipation fins 173, and the rear heat generating element 138 is arranged such that a shadow thereof projected in the X direction overlaps the exhaust-side heat dissipation fins 175. This makes it possible to efficiently transfer heat generated in each heat generating element to associated ones of the fins, and hence it is possible to efficiently discharge heat by driving the rotary fan 148.

As shown in FIG. 16, a portion of the main duct 124 on the −Z side of the rotary fan 148 forms a two-layer structure formed by partitioning between the intake duct 161 and the exhaust duct 162 in the X direction (direction of a thickness of the main duct 124), with the inclined wall 158. With this, it is possible to arrange the detour area 164 at a location rearward (−Z side) of the rotary fan 148, whereby the first intake air flow 178 is formed as a flow of air along a path which extends to the rear side of the rotary fan 148 and then returns to the rotary fan 148 after making a U-turn, causing air to be drawn into the rotary fan 148. Thus, the lower heat dissipation fins 172 extending to the lower detour area 170 can be made sufficiently long, whereby it is possible to sufficiently dissipate heat from the front lower heat generating element 136.

Figure 22:
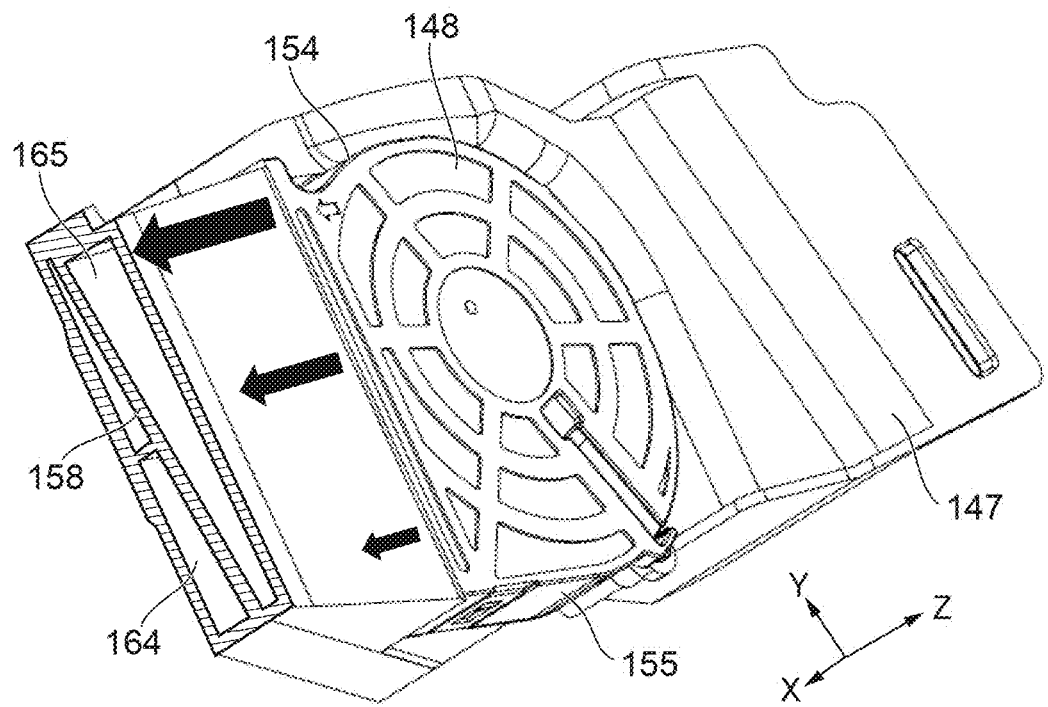
FIG. 22 is a perspective view of the rotary fan and associated members therearound, also illustrating a cross-section of an inclined wall of the main duct.

FIG. 22 is a perspective view of the rotary fan 148 and associated members thereround, also illustrating a cross-section of the inclined wall 158. Similar to FIG. 15, the size of each arrow appearing in FIG. 22 represents the magnitude of a flow rate of exhaust wind air discharged from the rotary fan 148. The inclined wall 158 is formed as a three-dimensional inclined wall having a predetermined inclination with respect to the vertical direction (Y direction) and further having a predetermined inclination with respect to the front-rear direction (Z direction). Therefore, in an area where the inclined wall 158 is provided, the respective cross-sectional areas of the air flow passages in the slope portion 165 and the detour area 164 smoothly change in the vertical direction (Y direction).

More specifically, on the side toward the outer wall 154 where the flow rate of exhaust wind air discharged from the rotary fan 148 is large, the cross-sectional area of the air flow passage in the slope portion 165 is larger than that in the detour area 164. Inversely, on the side toward the outer wall 155 where the flow rate of exhaust wind air discharged from the rotary fan 148 is small, the cross-sectional area of the air flow passage in the detour area 164 is larger than that in the slope portion 165. Therefore, by setting the cross-sectional area of the air flow passage in the exhaust duct 162 large so as to reduce the ventilation resistance on the side toward the outer wall 154 where the flow rate of exhaust wind air discharged from the rotary fan 148 is large, it is possible to efficiently discharge air. Further, by setting the cross-sectional area of the air flow passage in the lower detour area 170 large so as to reduce the ventilation resistance, it is possible to efficiently draw in air. In other words, on the immediately downstream side (-Z side) of the rotary fan 148, by setting the cross-sectional area of the air flow passage according to the flow rate of exhaust wind air discharged from the rotary fan 148, it is possible to efficiently draw in and discharge air while maintaining constant the total thickness of the slope portion 165 and the detour area 164.

As described hereinabove, on the immediately downstream side (-Z side) of the rotary fan 148, the inclined wall 158 partitions between the intake duct 161 and the exhaust duct 162, thereby forming two-layered air flow passages overlapping each other in the thickness direction (X direction). Therefore, the third intake air flow 180 is formed by a flow of air which enters the main duct 124, and is then guided to the suction port 150 of the rotary fan 148 by a short distance via the upper detour area 171. Thus, it is possible to efficiently guide air drawn in from the sensor duct 126 to the suction port 150.

Figure 23:
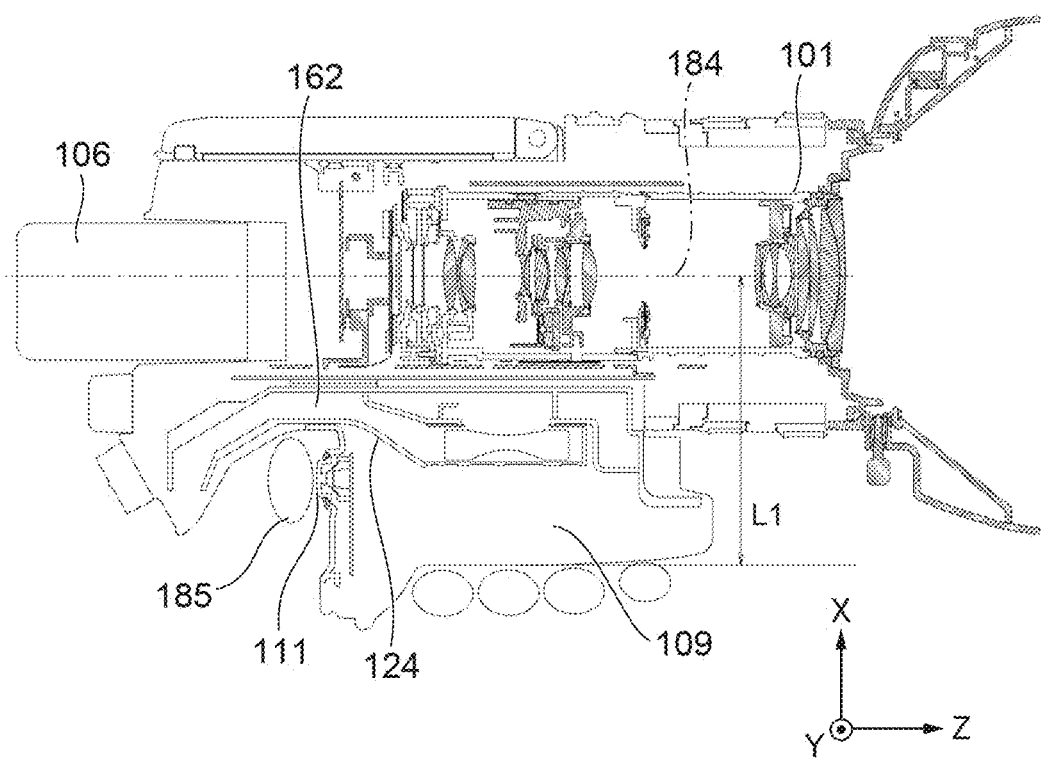
FIG. 23 is a cross-sectional view of the main duct taken along a Z-X plane.

FIG. 23 is a cross-sectional view of the main duct 124 taken along a Z-X plane, which shows a cross section at the image capturing optical axis, denoted by reference numeral 184. In the exhaust duct 162, air flows along the slope portion 165, as shown in FIG. 16, and hence the exhaust heat dissipation portion 166 and the detour area 164 are at substantially the same position in the X direction. When this is viewed in FIG. 23, the air flow passage in the exhaust duct 162 is a curved passage which goes toward the image capturing optical axis 184 of the image capturing lens 101 and then goes away from the same.

The rear surface of the gripping portion 109 (surface on the -Z side) has a shape that does not interfere with an operation of a photographer who operates the shooting start button 111 provided on the rear surface of the gripping portion 109 by a right-hand thumb 185 of a right hand holding the gripping portion 109. Further, the shape of the gripping portion 109 is designed such that the right-hand thumb 185 would come to a position of the main duct 124, recessed most deeply toward the +X side. Further, the exhaust duct 162 of the main duct 124 is made close to the image capturing optical axis 184, and part of the main duct 124 is arranged inside the gripping portion 109 to reduce a distance L1 from the image capturing optical axis 184 to a holding portion (held with the four fingers, i.e. a forefinger to a fifth finger). Further, the lower heat dissipation fins 172 are arranged such that a shadow thereof projected in the X direction overlaps the rotary fan 148, whereby the size of the main duct 124 in the vertical direction (Y direction) is made substantially the same as the size of the rotary fan 148 (see e.g. FIG. 18).

With this, it is possible to realize the gripping portion 109, compact in size, which can be gripped to hold the main duct 124 therein together, and as a result, the gripping portion 109 is made easy to be gripped by a photographer. Further, the moment of a force applied to the right hand holding the gripping portion 109 due to the weight of the image capturing lens 101 and the battery 106 becomes small, and hence it is possible to increase the stability of the image capturing apparatus 100 when the gripping portion 109 is gripped.

Figure 24:
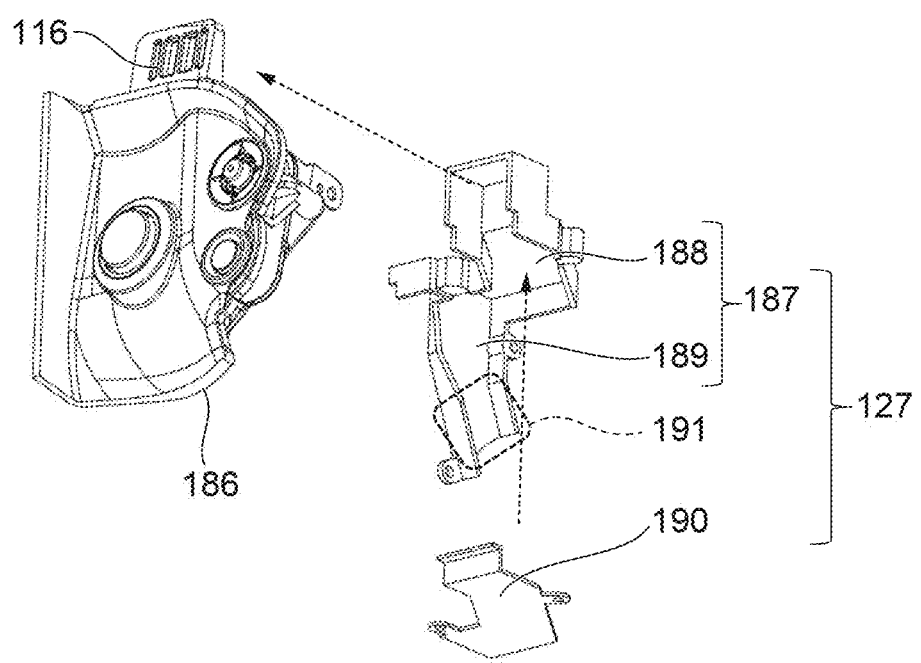
FIG. 24 is an exploded perspective view of a rear portion of the gripping portion and a gripping portion intake duct.

FIG. 24 is an exploded perspective view of the rear portion (portion on the -Z side) of the gripping portion 109 and the gripping portion intake duct 127. As described hereinabove, the gripping portion intake duct 127 is arranged inside the gripping portion 109. The rear side of the gripping portion 109 is covered with a grip cover 186, and the grip cover 186 (specifically, the air inlet port arrangement surface 118 thereof) is provided with the second air inlet port 116.

The gripping portion intake duct 127 has a grip duct base 187 and a grip duct sheet metal 190. The grip duct base 187 is formed of a material which is low in thermal conductivity, such as a resin material (plastic), and this makes heat exchange difficult to occur between the inside and the outside of the grip duct base 187.

The grip duct base 187 is formed by a grip duct-forming portion 188 and a grip duct-extending portion 189. The grip duct-forming portion 188 is formed into a substantially U-shape and an internal cavity is formed by covering the open side with the grip duct sheet metal 190. An opening of the internal cavity formed by the grip duct-forming portion 188 and the grip duct sheet metal 190 is connected to the inside (+Z side) of the second air inlet port 116 without any gap.

One end of the grip duct-extending portion 189 communicates with the internal cavity formed by the grip duct-forming portion 188 and the grip duct sheet metal 190 without any gap, and the other end of the grip duct-extending portion 189 is formed with a duct opening portion 191 having a substantially U-shape. The duct opening portion 191 is connected to the main duct 124 without any gap. Therefore, air flowing in from the second air inlet port 116 flows through the internal cavity formed by the grip duct-forming portion 188 and the grip duct sheet metal 190, and then through the inside of the grip duct-extending portion 189, thereafter flowing from the duct opening portion 191 into the main duct 124. Note that the flow of air in the gripping portion intake duct 127 will be described hereinafter.

Figure 25A:
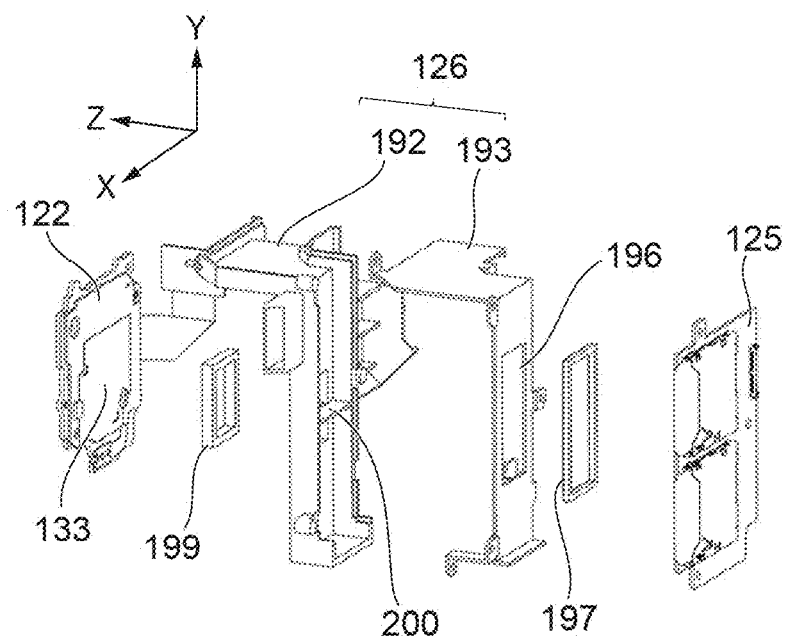
FIGS. 25A and 25B are exploded perspective views of the sensor duct and components therearound.
Figure 25B:
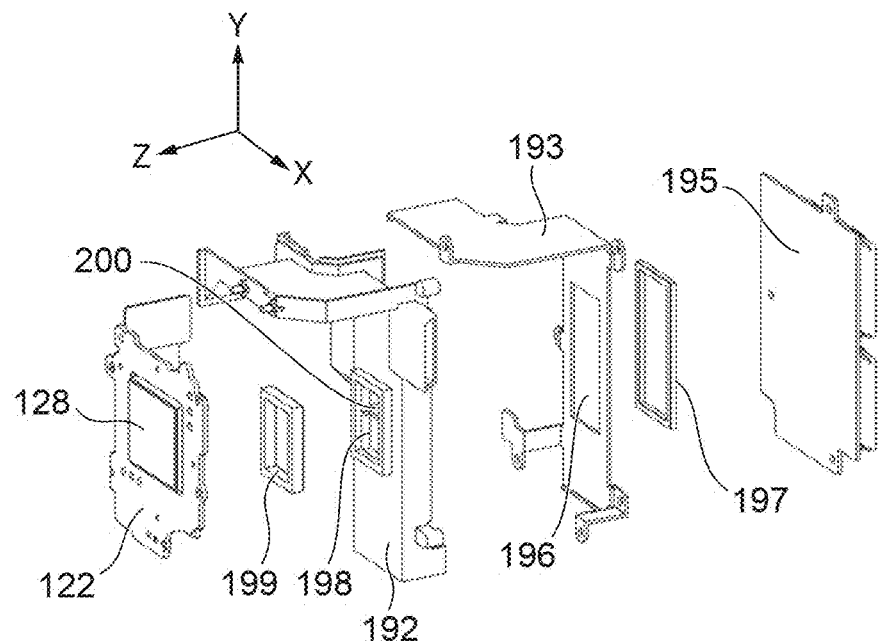
Figure 26:
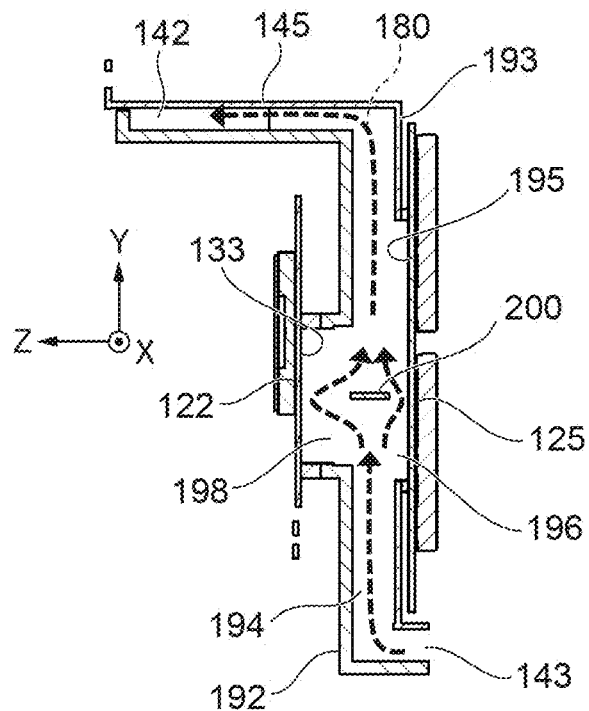
FIG. 26 is a cross-sectional view useful in explaining a cooling mechanism using the sensor duct.

FIGS. 25A and 25B are exploded perspective views of the sensor duct 126 and components therearound, and the viewing direction is different between FIGS. 25A and 25B, as indicated by coordinate axes therein. FIG. 26 is a cross-sectional view useful in explaining a mechanism for cooling the sensor circuit board 122 and the card circuit board 125 using the sensor duct 126.

The sensor duct 126 has a sensor duct base 192 and a card circuit board-fixing sheet metal 193, and an internal cavity 194 which forms an air flow passage is formed by assembling these components. The card circuit board 125 is fixed to the card circuit board-fixing sheet metal 193 such that a card slot non-mounting surface 195 of the card circuit board 125 is opposed to the card circuit board-fixing sheet metal 193. The card circuit board-fixing sheet metal 193 is formed with a sheet metal opening 196, and a card-side cushion member 197 having a rectangular frame shape is arranged between the card circuit board-fixing sheet metal 193 and the card slot non-mounting surface 195 such that the card-side cushion member 197 surrounds the sheet metal opening 196. With this, part of the card slot non-mounting surface 195 is exposed from the sheet metal opening 196 into the internal cavity 194 in a state shielded from surrounding outer space by the card-side cushion member 197. Thus, by exposing the part of the card slot non-mounting surface 195 into the internal cavity 194, it is possible to efficiently cool the card circuit board 125.

The sensor circuit board 122 is arranged such that the sensor heat dissipation surface 133 is opposed to the sensor duct base 192. The sensor duct base 192 is formed with a sensor duct opening 198 at a location substantially opposed to the sheet metal opening 196 of the card circuit board-fixing sheet metal 193 in the Z direction. A sensor-side cushion member 199 having a rectangular frame shape is arranged between the sensor duct base 192 and the sensor circuit board 122 such that the sensor-side cushion member 199 surrounds the sensor duct opening 198. With this, part of the sensor heat dissipation surface 133 is exposed from the sensor duct opening 198 into the internal cavity 194 in a state shielded from surrounding outer space by the sensor-side cushion member 199.

Thus, by exposing the part of the sensor heat dissipation surface 133 into the internal cavity 194, it is possible to efficiently cool the sensor circuit board 122. Further, it is possible to absorb variation in position and inclination of the sensor circuit board 122, caused by individuality variation of the image capturing lens 101, using the sensor-side cushion member 199, and also place the image capturing device 128 in a state isolated from the internal cavity 194.

The sensor duct base 192 is provided with a plate-shaped portion 200 at a substantially intermediate location between the sheet metal opening 196 and the sensor duct opening 198. As shown in FIG. 26, a main surface of the plate-shaped portion 200 is orthogonal to an air flow from the second opening 143 toward the first opening 142. As a result, air flowing in the sensor duct 126 detours around the plate-shaped portion 200, passes between the plate-shaped portion 200 and the sensor heat dissipation surface 133, and between the plate-shaped portion 200 and the card slot non-mounting surface 195, and flows toward the first opening 142.

Figure 27:
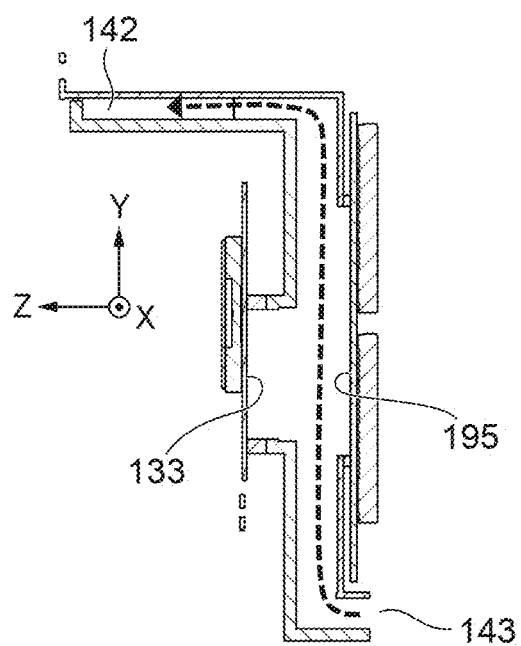
FIG. 27 is a cross-sectional view useful in explaining a cooling mechanism using a sensor duct according to a comparative example.

Here, FIG. 27 shows a cross-sectional view useful in explaining an air flow in a case where the plate-shaped portion 200 is not provided. In this case, air does not flow near the sensor heat dissipation surface 133 and the card slot non-mounting surface 195, and hence the cooling efficiency is lower.

On the other hand, in the present embodiment, as shown in FIG. 26, air flows near the sensor circuit board 122 and the card circuit board 125 and receives heat. The thus warmed air flows directly under the sensor duct flat portion 145 formed by the card circuit board-fixing sheet metal 193 and flows from the first opening 142 into the main duct 124. The first opening 142 is connected to the connection opening 168 formed in the duct base 147 without any gap. Therefore, the air used for cooling the sensor circuit board 122 and the card circuit board 125 flows into the main duct 124 through the inside of the sensor duct 126, the first opening 142, and the connection opening 168, to form the third intake air flow 180.

Air of the third intake air flow 180 drawn in from the sensor duct 126, flows into the upper detour area 171, and air of the first intake air flow 178 drawn in from the first air inlet 115 flows into the lower detour area 170. Since the lower detour area 170 and the upper detour area 171 are separated (partitioned) by the first shield wall 169, the two flows are separated by the first shield wall 169 up to immediately before the air of both the flows is drawn into the suction port 150 of the rotary fan 148. This is because the third intake air flow 180 extends along a long air flow passage including the inside of the sensor duct 126, and the air flow passage has many curved portions, and hence it is considered that the air of the third intake air flow 180 is more difficult to flow than that of the first intake air flow 178.

More specifically, by causing the third intake air flow 180 and the first intake air flow 178 to merge immediately before the air of both the flows is drawn into the suction port 150 of the rotary fan 148, drawing of the air from the third intake air flow 180 into the suction port 150 is prevented from being obstructed due to the influence of the first intake air flow 178. Similarly, the second intake air flow 179 and the third intake air flow 180 are shielded from each other by the second shield wall 174 up to immediately before air of the two flows is drawn into the suction port 150 of the rotary fan 148. This makes it possible to prevent drawing of the air of the third intake air flow 180 into the suction port 150 of the rotary fan 148 from being obstructed due to the influence of the second intake air flow 179.

Figure 28A:
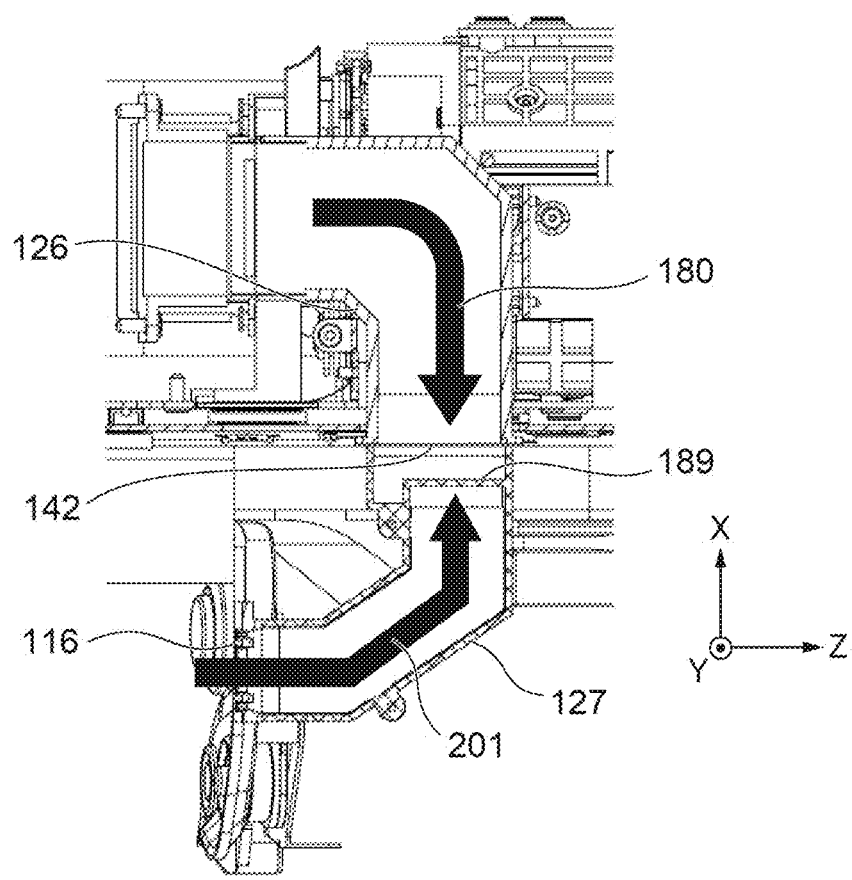
FIGS. 28A and 28B are cross-sectional views each showing flows of air in the sensor duct and the gripping portion intake duct.
Figure 28B:
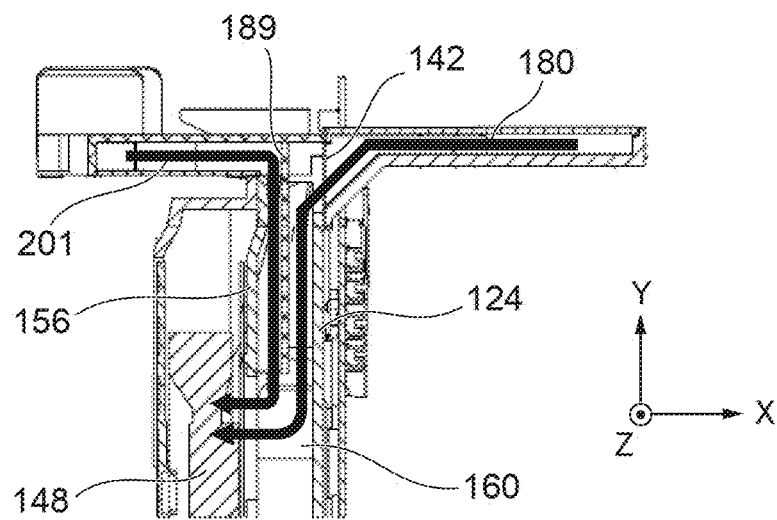

FIGS. 28A and 28B are cross-sectional views each showing flows of air in the sensor duct 126 and the gripping portion intake duct. 127. FIG. 28A is a cross-sectional view of where the third intake air flow 180 and a fourth intake air flow 201 merge, taken along a Z-X plane, and FIG. 28B is a cross-sectional view where the third intake air flow 180 and the fourth intake air flow 201 merge, taken along an X-Y plane. The fourth intake air flow 201 is a flow of intake air that is drawn in from the second air inlet port 116, and flows through the inside of the gripping portion intake duct 127, thereby flowing into the fan intake area 160 of the main duct 124 via the grip duct-extending portion 189.

The grip duct-extending portion 189 as a component of the gripping portion intake duct 127 is arranged such that a portion thereof meeting the main duct 124 is opposed to the first opening 142 of the sensor duct 126. The grip duct-forming portion 188 as a component of the gripping portion intake duct 127 is exposed to the outside of the main duct 124 and the grip duct-extending portion 189 is accommodated inside the main duct 124. The grip duct-extending portion 189 is combined with the front duct cover 156 to form a hollow duct-shaped portion inside the main duct 124. With this, the fourth intake air flow 201 has its periphery (whole circumference) enclosed by a resin member which is low in thermal conductivity, and reaches the fan intake area 160 in a state in which heat exchange with the surrounding is suppressed.

An outlet of the hollow duct-shaped portion formed by the grip duct-extending portion 189 and the front duct cover 156 is arranged directly under the suction port 150 of the rotary fan 148. For this reason, air of the fourth intake air flow 201 drawn in from the second air inlet port 116 is not brought into contact with air in the main duct 124 and air of the third intake air flow 180, already subjected to heat exchange, until just before the air is drawn into the rotary fan 148. Therefore, the air of the fourth intake air flow 201 is guided to the suction port 150 of the rotary fan 148 without being subjected to heat exchange.

The fourth intake air flow 201 is mixed with the first intake air flow 178, the second intake air flow 179, and the third intake air flow 180, in the fan intake area 160, and the resulting mixed air is drawn into the rotary fan 148 and then discharged to the exhaust duct 162. At this time, the air of the fourth intake air flow 201 reaches the rotary fan 148 in a state maintained at the outside air temperature. Therefore, by mixing the fourth intake air flow 201, which is relatively low in temperature compared with the other air flows, with the other air flows, it is possible to lower the temperature of exhaust wind air discharged from the rotary fan 148, and hence it is possible to increase the cooling efficiency in the exhaust duct 162.

Figure 29:
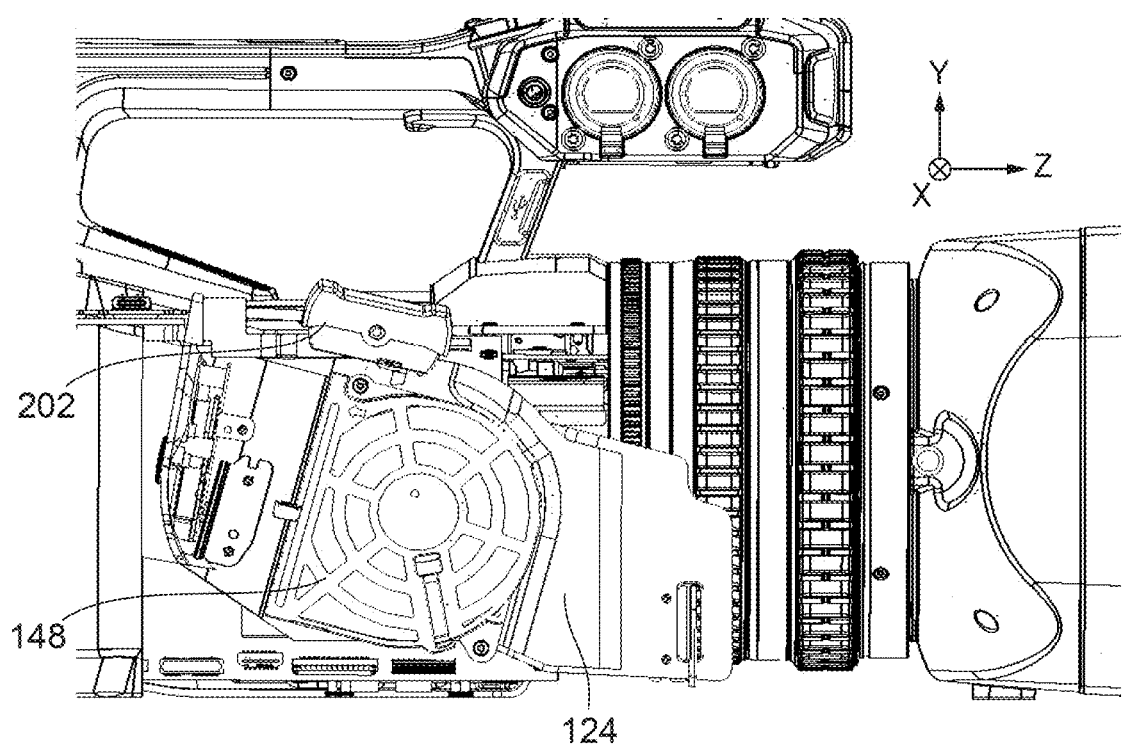
FIG. 29 is a side view of the image capturing apparatus in a state in which the gripping portion is removed.
Figure 30:
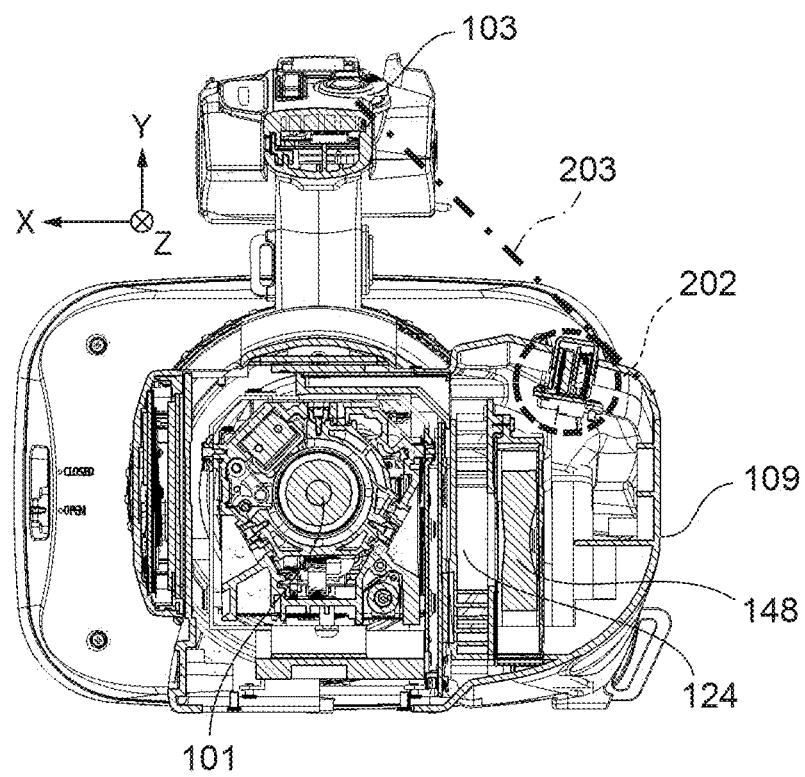
FIG. 30 is a cross-sectional view of a portion, where a zoom unit is arranged, of the image capturing apparatus.

FIG. 29 is a side view of the image capturing apparatus 100 in a state in which the gripping portion 109 is removed (as viewed from the −X side). FIG. 30 is a cross-sectional view of a portion, where a zoom unit 202 is arranged, of the image capturing apparatus 100, taken along an X-Y plane (as viewed from the −Z side). The zoom unit 202 is arranged at a location closer to the image capturing lens 101 than a line 203 connecting between vertexes of the outer shapes of the handle portion 103 and the gripping portion 109 is. Therefore, even when an external force is applied e.g. from a floor to the image capturing apparatus 100 e.g. due to an accidental drop thereof, the impact is not directly applied to the zoom unit 202. Further, the zoom unit 202 is arranged at a location avoiding the main duct 124 and the rotary fan 148, and hence the zoom unit 202 does not interfere with heat dissipation in the image capturing apparatus 100.

Figure 31A:
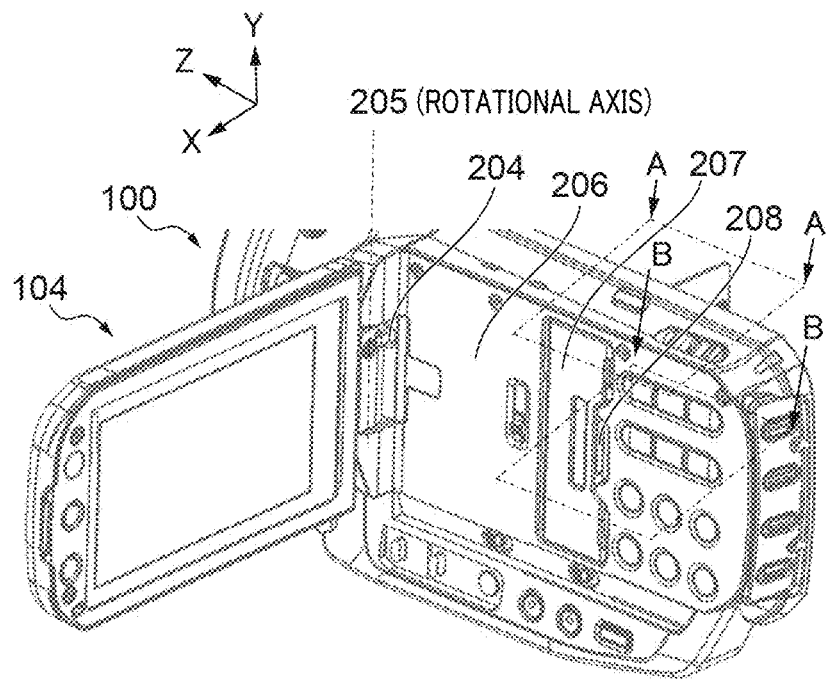
FIGS. 31A and 31B are perspective views of a right side of the image capturing apparatus, as viewed from the rear right side.
Figure 31B:
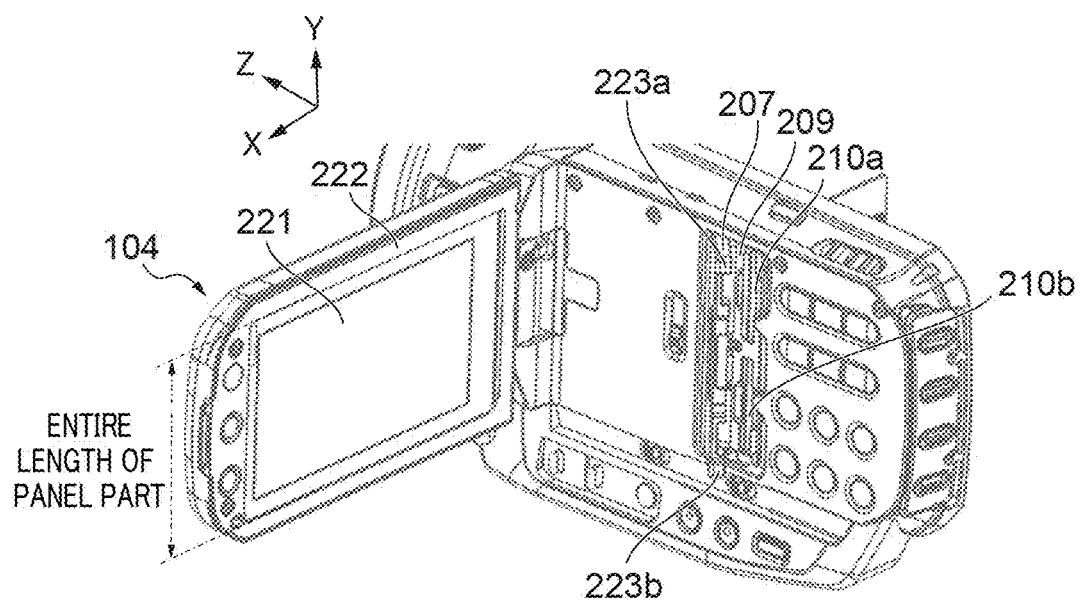

Here, the construction of the right side of the image capturing apparatus 100 where the display section 104 is arranged will be described. FIGS. 31A and 31B are views of the right side of the image capturing apparatus 100, as viewed from the rear right side. FIG. 31A shows the right side of the image capturing apparatus 100 in a state in which a card cover 207 is closed, and FIG. 31B shows the same in a state in which the card cover 207 is open.

The display section 104 is disposed such that it can be opened and closed by rotation about a hinge rotational axis 205 of a hinge unit 204 disposed on the right side of the image capturing apparatus 100. An R cover 206 is attached to the right side of the image capturing apparatus body, which is exposed to the outside when the display section 104 is opened, and the card cover 207 is provided at a predetermined location on a surface of the R cover 206. A photographer can shift the card cover 207 from the closed state to the open state by performing an operation of hooking a finger on a finger hooking portion 208 of the card cover 207 and pulling out the card cover 207. When the card cover 207 is opened, card openings 210a and 210b of a holder 209 are exposed, whereby the card recording media 139 can be attached/removed.

Figure 32:
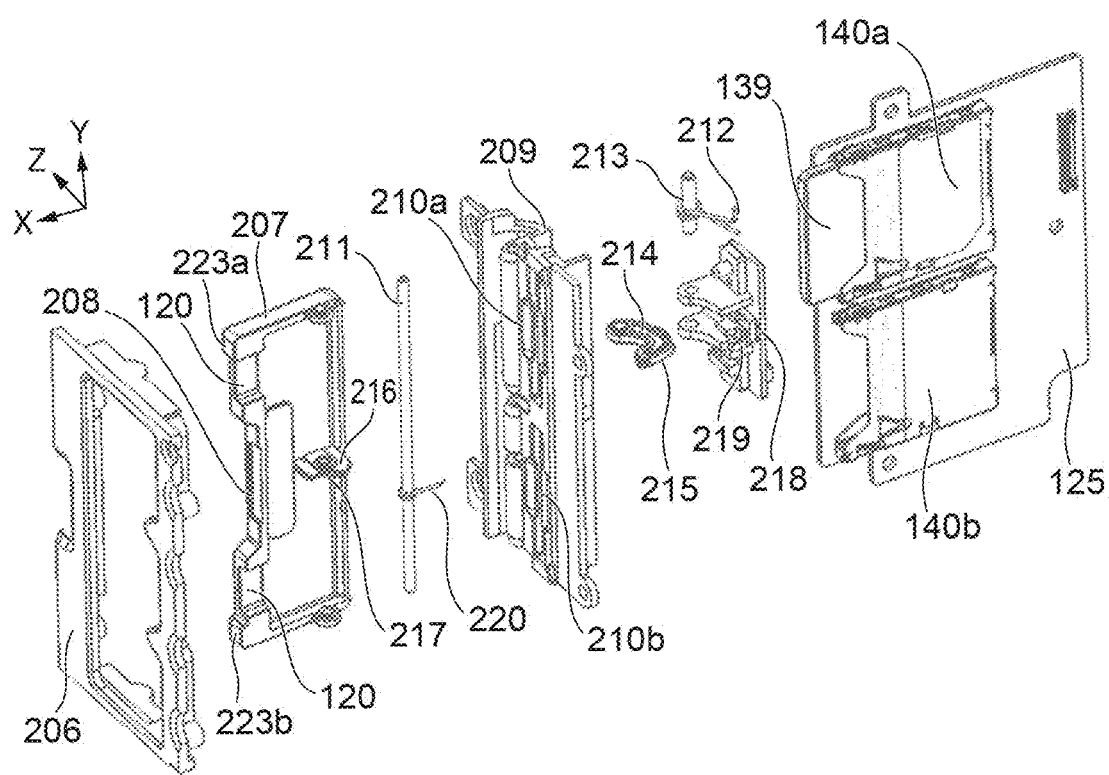
FIG. 32 is an exploded perspective view of a card cover and members therearound on the right side of the image capturing apparatus.

FIG. 32 is an exploded perspective view of the card cover 207 and members therearound on the right side of the image capturing apparatus 100. Inside the card openings 210a and 210b, the two card holders 140a and 140b, into which the card recording media 139 can be removably inserted, are mounted on the card circuit board 125, respectively. The card cover 207 is rotatable about a card cover rotational shaft 211 provided substantially parallel to the hinge rotational axis 205, between a closed position for protecting the card openings 210a and 210b and an open position for exposing the card openings 210a and 210b.

Figure 33A:
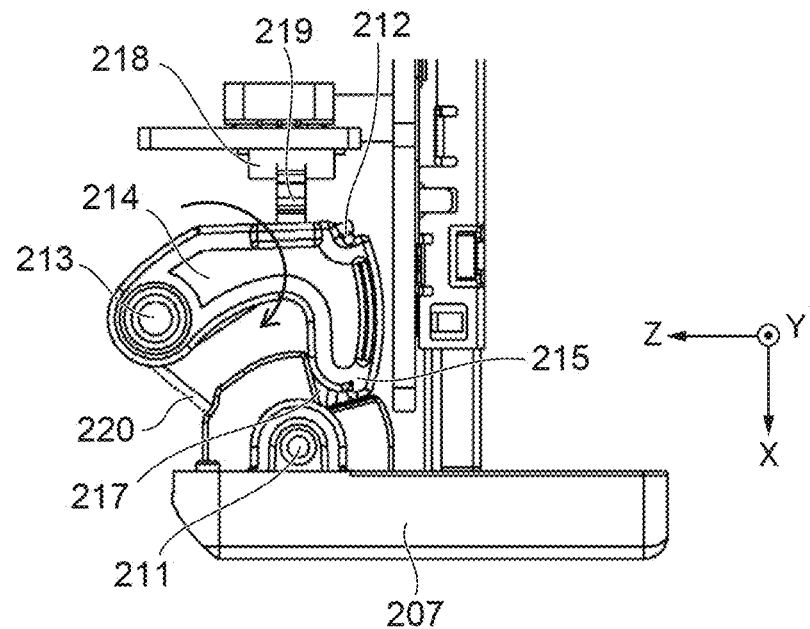
FIGS. 33A to 33C are views showing a structure of the card cover and members therearound.
Figure 33B:
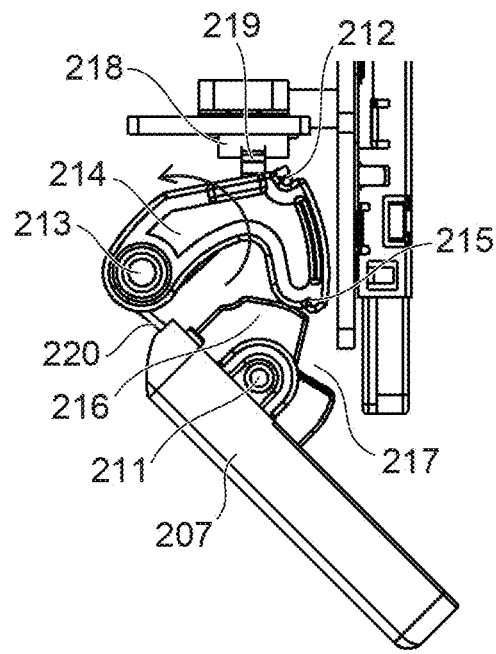
Figure 33C:
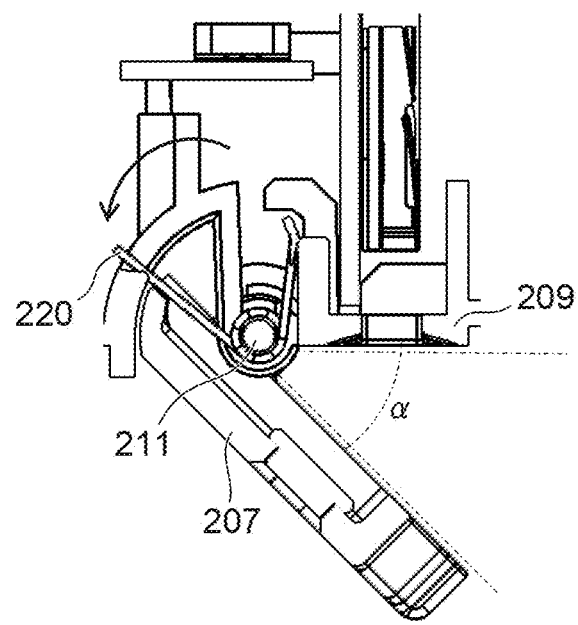

A locking member 214 that maintains the card cover 207 in the closed position is provided such that it is rotatable about a locking member rotational shaft 213. FIGS. 33A to 33C are views showing a structure of the card cover 207 and components therearound. FIG. 33A illustrates a closed state of the card cover 207, as viewed from the +Y side. A torsion coil spring 212 urges the locking member 214 in a clockwise direction, as viewed from the +Y side. A card lock tip end 215 of the locking member 214 urged by the torsion coil spring 212 urges a cutout 217 of the card cover 207, whereby the card cover 207 is maintained in the closed position.

FIG. 33B illustrates an open state of the card cover 207, as viewed from the +Y side. A sector-shaped portion 216 of the card cover 207 urges the locking member 214 in an anticlockwise direction about the locking member rotational shaft 213, as viewed from the +Y side. The locking member 214 urged by the sector-shaped portion 216 presses a detection lever piece 219 of a detection switch 218 for detecting the open state of the card cover 207, toward the −Z side, whereby it is possible to detect that the card cover 207 is shifted to the open state. Inversely, when the card cover 207 is in a closed state, the detection lever piece 219 is not pressed toward the −Z side by the locking member 214, and hence it is possible to detect that the card cover 207 is in the closed state.

The card lock tip end 215 of the locking member 214 being urged presses the sector-shaped portion 216 toward the +Z side with a reaction force, whereby the card cover 207 is maintained in an open position. FIG. 33C is a cross-sectional view taken along B-B in FIG. 31A. When an opening angle α of the card cover 207 becomes larger than a threshold value (which is set in this embodiment to 45 degrees by way of example), a torsion coil spring 220 urges the card cover 207 in the anticlockwise direction, as viewed from the +Y side. With this, even when the opening angle α of the card cover 207 is changed to an angle in a range of 46 to 90 degrees, it is a temporal change and the opening angle is caused to be maintained at 45 degrees.

As shown in FIG. 31B, the display section 104 includes a display panel 221 and a panel cover 222 which covers the periphery of the display panel 221 and has a shape protruding forward from the panel surface of the display panel 221. An upper tip end and a lower tip end in the Y direction of the card cover 207 are provided with contact portions 223a and 223b each having a chamfered shape, respectively. The entire length of the card cover 207 in the Y direction is longer than the entire length of the display panel 221 in the Y direction (panel part entire length) as shown in FIG. 31B.

Assuming that the display section 104 is closed when the display section 104 is in the open state and when the card cover 207 is in the open state, the panel cover 222 is brought into contact with the contact portions 223a and 223b of the card cover 207, and then urges the card cover 207 in a closing direction. Thus, not only the display section 104 but also the card cover 207 is closed. When the display section 104 is closed, the card cover 207 is prevented from being brought into contact with the display panel 221 and damaging the display panel 221. Further, the card cover 207 is prevented from being sandwiched between the image capturing apparatus body and the display section 104 and interfering with the closing operation of the display section 104.

Figure 34:
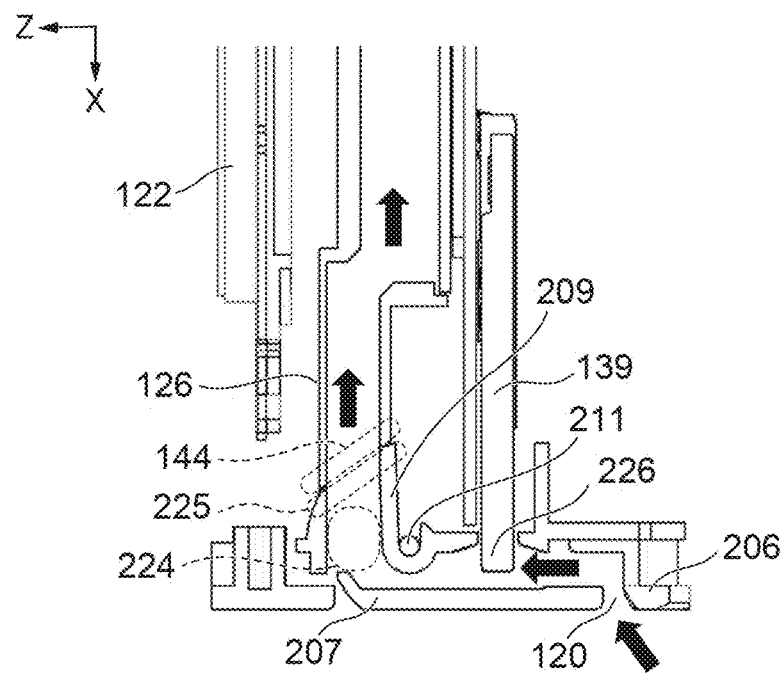
FIG. 34 is a cross-sectional view taken along A-A in FIG. 31A.

FIG. 34 is a cross-sectional view taken along A-A in FIG. 31A, which is useful in explaining the heat dissipation structure around the card recording medium 139. Arrows appearing in FIG. 34 indicate air flows generated by the rotary fan 148.

As mentioned hereinabove, when the card cover 207 is opened, the card openings 210a and 210b of the holder 209 are exposed. The holder 209 is provided with a cover retreating area 224 (space) for prevention of interference with the card cover 207 in the open state. The cover retreating area 224 is provided with a card-side opening 225 so as to be connected to the third opening 144 of the sensor duct 126.

The fourth air inlet ports 120 are provided near the upper tip end and the lower tip end in the Y direction (the contact portions 223a and 223b) of the card cover 207 (see FIGS. 4 and 32). Further, the sensor duct 126, the holder 209, and the card cover 207 form an air flow passage so as to prevent air from leaking into the other areas. This air flow passage is formed such that the sensor circuit board 122, the sensor duct 126, the card cover rotational shaft 211, the card recording media 139, and the fourth air inlet ports 120 are positioned in the mentioned order, as viewed from the +Z side.

With this, air drawn in from the fourth air inlet ports 120 by the rotary fan 148 can efficiently dissipate heat from a pinching portion 226 of the card recording medium 139, which is positioned in part of the air flow passage formed between the holder 209 and the card cover 207. Further, by making effective use of the cover retreating area 224 which is a dead space for the ventilation passage, it is possible to prevent increase in the size of the image capturing apparatus 100.

Figure 35:
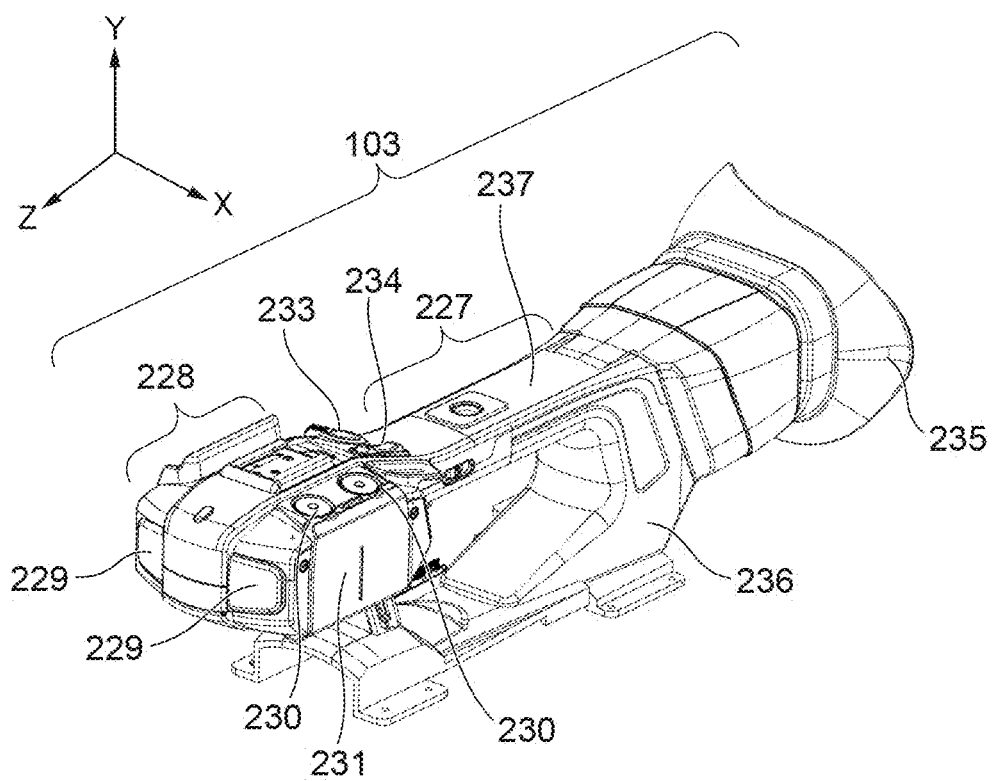
FIG. 35 is a first appearance perspective view of a handle portion.
Figure 36:
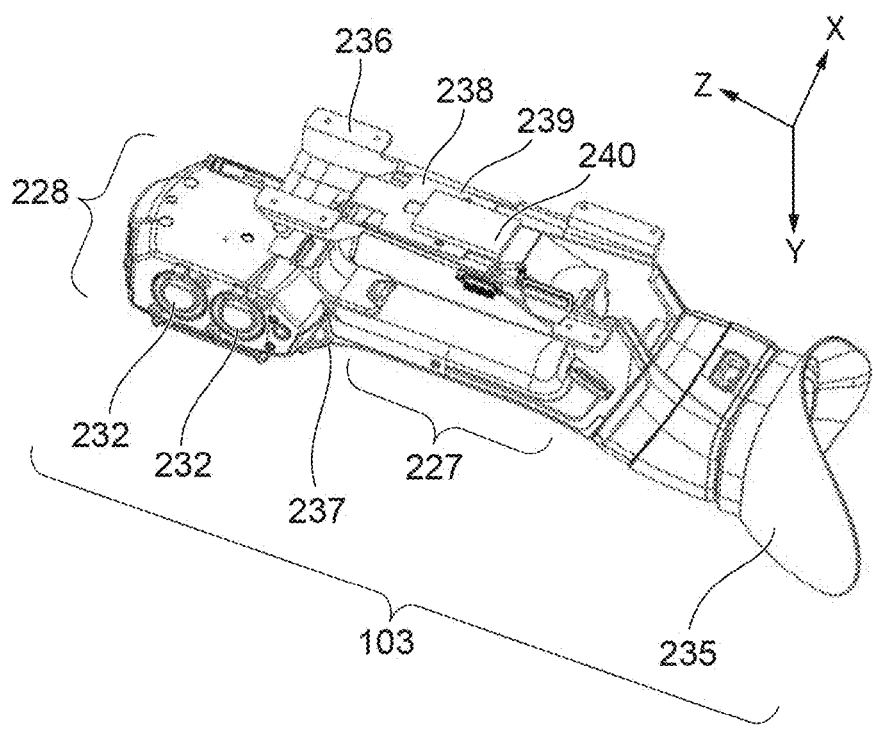
FIG. 36 is a second appearance perspective view of the handle portion.

FIGS. 35 and 36 are first and second appearance perspective views of the handle portion 103, as viewed from different directions, respectively. As described hereinabove, the handle portion 103 is formed integrally with the upper portion of the image capturing apparatus body, and by gripping a handle gripping portion 227, a photographer is enabled to perform shooting and conveyance in various styles to which the state of the image capturing apparatus 100 is adjusted.

An audio section 228 is provided on a front side (+Z side) of the handle gripping portion 227. In the audio section 228, there are arranged built-in microphones 229, adjustment knobs 230 for adjusting a recording level, an audio cover 231, external microphone terminals 232, a start/stop button 233, a zoom switching lever 234, etc. Inside the audio cover 231, there are arranged a switch for switching external microphones connected to the external microphone terminals 232, etc.

A finder section 235, which is pivotally movable, is arranged on a rear side (−Z side) of the handle gripping portion 227, and the photographer can check a shot image and various information using this finder section 235. The handle gripping portion 227 has a handle lower cover 236 and a handle upper cover 237, and the handle lower cover 236 forms part of the exterior of the image capturing apparatus body.

Inside the handle lower cover 236, a handle plate 238 made of metal is fixed. The handle plate 238 includes a handle flat portion 239, as a lower (−Y side) portion thereof, on which a handle heat conduction sheet 240 made of a heat conductive material is arranged.

Figure 37:
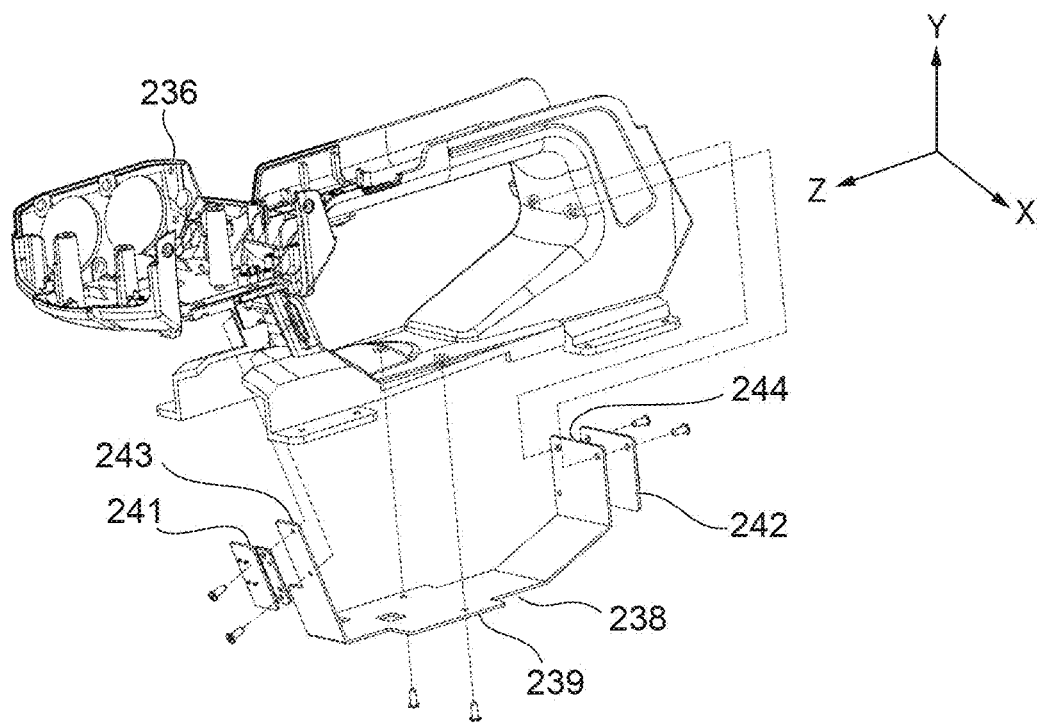
FIG. 37 is an exploded perspective view useful in explaining how a handle plate is attached to the handle portion.

FIG. 37 is an exploded perspective view useful in explaining attachment of the handle plate 238, and components of which omission of illustration does not hamper the explanation are omitted from illustration. The handle plate 238 has the handle flat portion 239 on a side toward the image capturing apparatus body (−Y side), and is shaped to extend upward from opposite ends of the handle flat portion 239 in the front-rear direction (Z direction) along the handle lower cover 236, while forming a plurality of bent portions. A front side (+Z side) of the handle plate 238 is referred to as a front side end 243, and a rear side (−Z side) of the same is referred to as a rear side end 244. The handle plate 238 is fixed, together with a jack circuit board 241 and a handle circuit board 242, to the handle lower cover 236 with screws, whereby the handle plate 238 and the handle lower cover 236 are formed into an integral unit, thereby playing a role of maintaining the rigidity of the handle portion 103.

Figure 38:
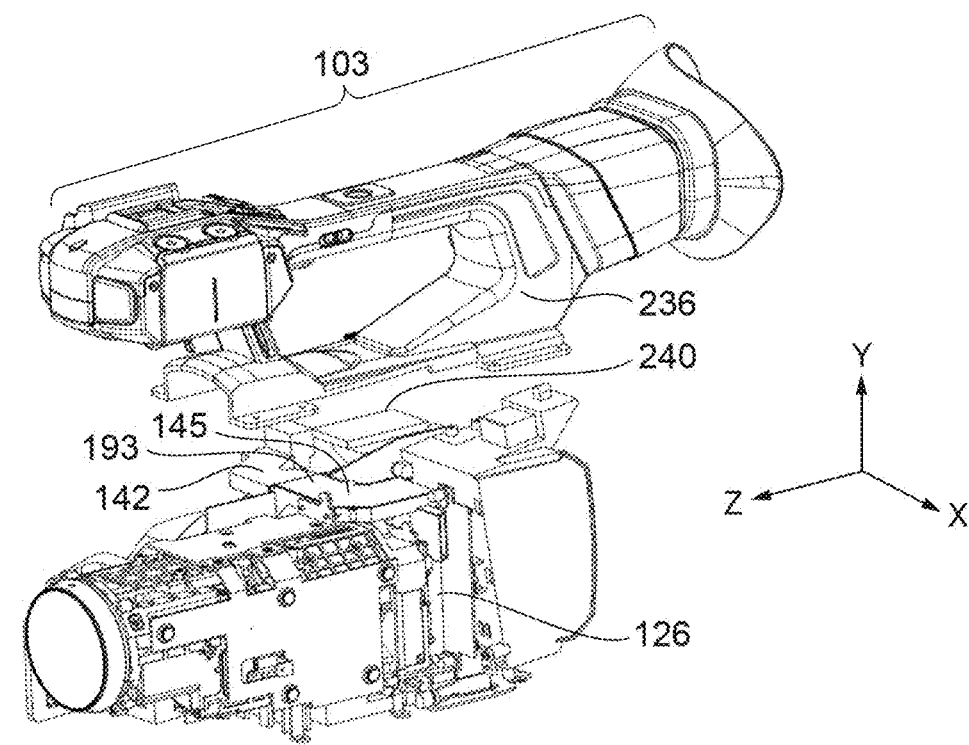
FIG. 38 is a view useful in explaining a coupling arrangement between an image capturing apparatus body and the handle portion.

FIG. 38 is a view useful in explaining a coupling arrangement between the image capturing apparatus body and the handle portion 103, and components of which omission of illustration does not hamper the explanation are omitted from illustration. The handle portion 103 is fixed to the image capturing apparatus body by the handle lower cover 236. At this time, the handle heat conduction sheet 240 is sandwiched and held between the sensor duct flat portion 145 of the card circuit board-fixing sheet metal 193 and the handle flat portion 239 (see FIG. 36) of the handle plate 238.

Next, the sensor duct 126 will be described with reference to FIG. 38. As described above, the image capturing apparatus 100 has a structure in which air flowing through the ducts receives heat from a plurality of heat generating elements to thereby cool the heat generating elements. Further, in the sensor duct 126, air having received heat from the sensor circuit board 122 and the card circuit board 125 flows directly under the sensor duct flat portion 145 of the card circuit board-fixing sheet metal 193, and then flows from the first opening 142 toward the main duct 124, to form the third intake air flow 180.

The third intake air flow 180 joins the first intake air flow 178 and the second intake air flow 179, and the air is drawn into the rotary fan 148 and then discharged from the exhaust duct 162. At this time, the exhaust wind passes through the exhaust-side heat dissipation portion 166 and receives heat from the rear heat generating element 138.

To increase the heat dissipation efficiency of the main control circuit board 123, it is desirable to suppress increase in the temperature of air, caused by heat from the sensor circuit board 122 and the card circuit board 125, as much as possible. In the image capturing apparatus 100, air having received heat from the sensor circuit board 122 and the card circuit board 125 transfers the heat from the sensor duct flat portion 145 of the card circuit board-fixing sheet metal 193 to the handle flat portion 239 of the handle plate 238 via the handle heat conduction sheet 240. For this reason, it is possible to lower the temperature of air, increased by the heat received from the sensor circuit board 122 and the card circuit board 125, before the air flows into the main duct 124.

Figure 39:
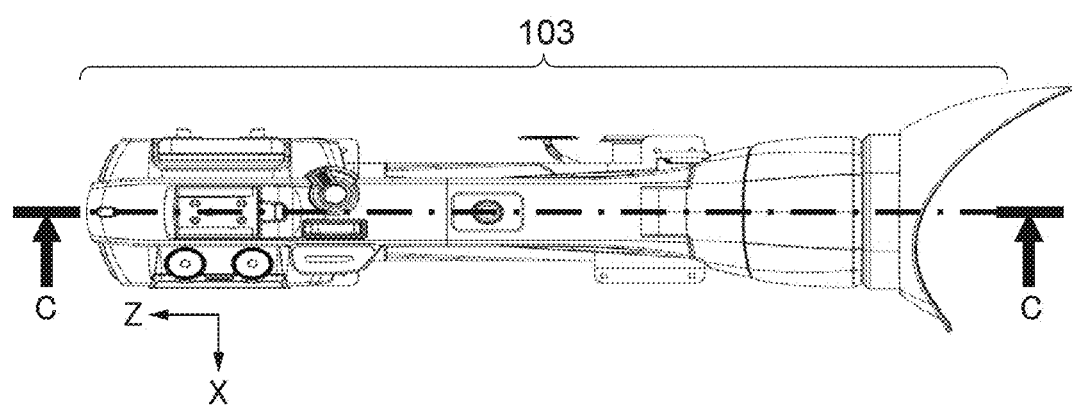
FIG. 39 is a top view of the handle portion.
Figure 40:
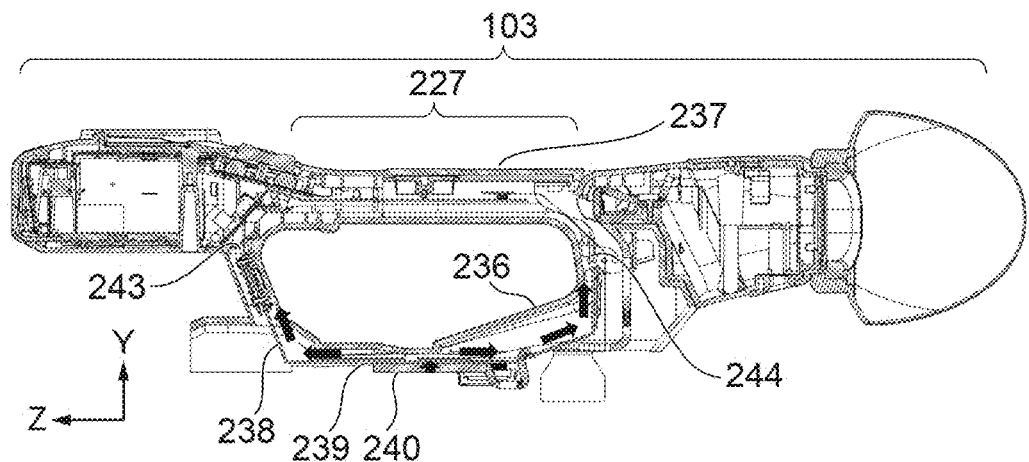
FIG. 40 is a cross-sectional view of the handle portion taken along C-C in FIG. 39.

Next, heat transferred from the sensor duct flat portion 145 to the handle portion 103 will be described. FIG. 39 is a top view of the handle portion 103 (as viewed from the +Y side). FIG. 40 is a cross-sectional view taken along C-C in FIG. 39, and components of which omission of illustration does not hamper the explanation are omitted from illustration. Further, arrows appearing in FIG. 40 schematically represent how the heat is transferred.

Heat, which is transferred from the image capturing apparatus body to the handle portion 103, is transferred to the handle flat portion 239 of the handle plate 238 via the handle heat conduction sheet 240, and this heat is transferred to the front side end 243 and the rear side end 244 of the handle plate 238. After that, the heat is transferred to the handle lower cover 236 and the handle upper cover 237 via screw fixing portions and air inside the handle portion 103, and is eventually diffused to the outside air. In the image capturing apparatus 100, the heat is efficiently transferred to the inside of the handle portion 103 via the handle plate 238 made of metal, and is then diffused to the outside air. At this time, since the front side end 243 and the rear side end 244 of the handle plate 238 are arranged such that neither of them reaches the handle gripping portion 227 of the handle portion 103, it is possible to suppress increase in the temperature of the handle gripping portion 227.

Thus, in the image capturing apparatus 100 configured to cool a plurality of heat generating elements (heat sources) by causing air to flow through ducts, heat received by air passing a heat source is transferred to the handle portion 103 before the air flows to the next heat source, thereby making it possible to increase the efficiency of cooling the next heat source. Further, while it is possible to efficiently diffuse heat transferred to the handle portion 103 to the inside of the handle portion 103, it is possible to suppress transfer of heat to the handle gripping portion 227, and hence it is possible to prevent a photographer from feeling uncomfortable when the photographer grips the handle portion 103. Note that in the present embodiment, the ends of the handle plate 238 are not extended to the handle gripping portion 227 so as to suppress increase in the temperature of the handle gripping portion 227. However, the handle plate 238 may be extended to the handle gripping portion 227 depending a manner of heat transfer and a situation of temperature increase.

Figure 41:
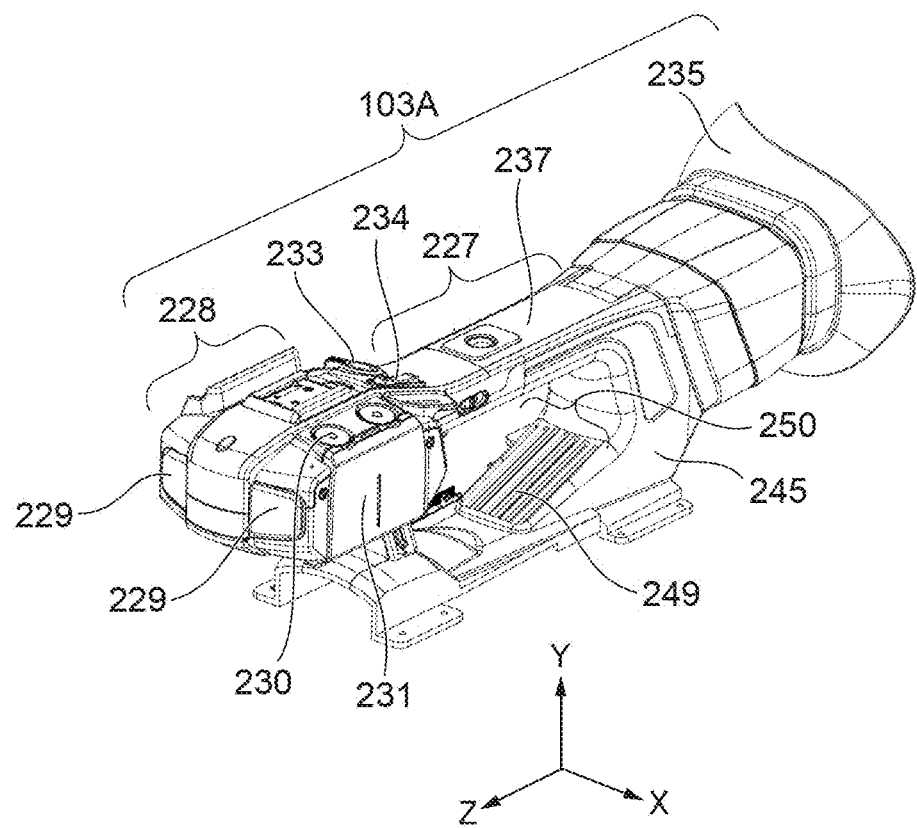
FIG. 41 is an appearance perspective view of a variation of the handle portion, as viewed obliquely from above.
Figure 42:
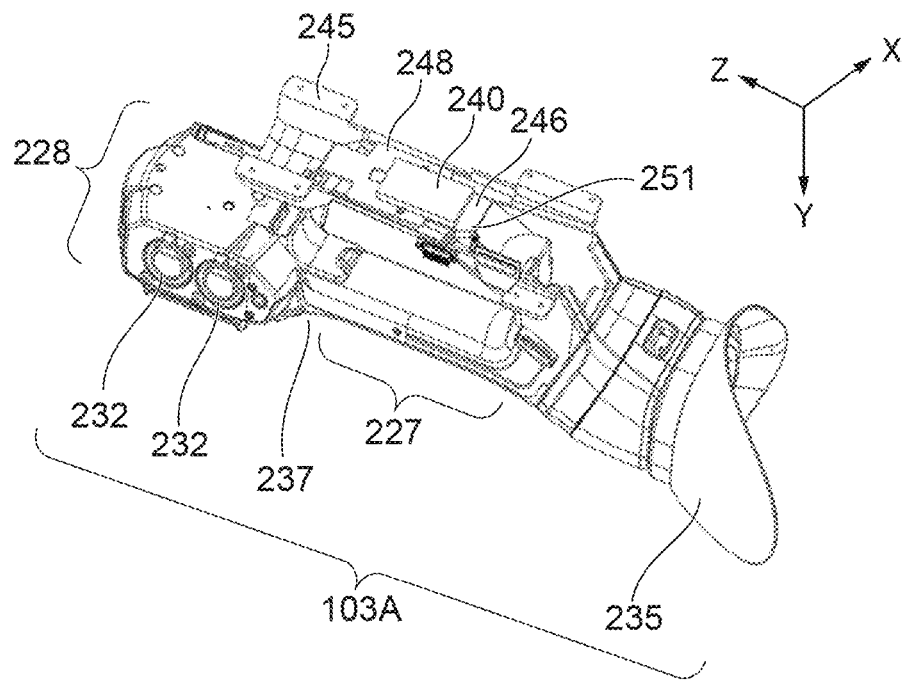
FIG. 42 is an appearance perspective view of the variation of the handle portion, as viewed obliquely from below.

FIGS. 41 and 42 are appearance perspective views of a handle portion 103A as a variation of the above-described handle portion 103. Note that out of the components of the handle portion 103A, the same components as those of the handle portion 103 are denoted by the same reference numerals, and redundant description thereof is omitted. Further, there is no change in the construction of the image capturing apparatus body.

A handle lower cover 245 is provided with a handle heat dissipation port 250 formed by a plurality of slit-shaped portions 249 which are through holes each having a long narrow shape, at a location below (−Y side of) the handle gripping portion 227. Further, inside the handle lower cover 245, a handle plate 248 made of metal and a heat sink portion 246 made of metal are fixed. Further, a handle lower flat portion 251 is provided under (−Y side of) the heat sink portion 246, and the handle heat conduction sheet 240 is disposed on the handle lower flat portion 251.

Figure 43:
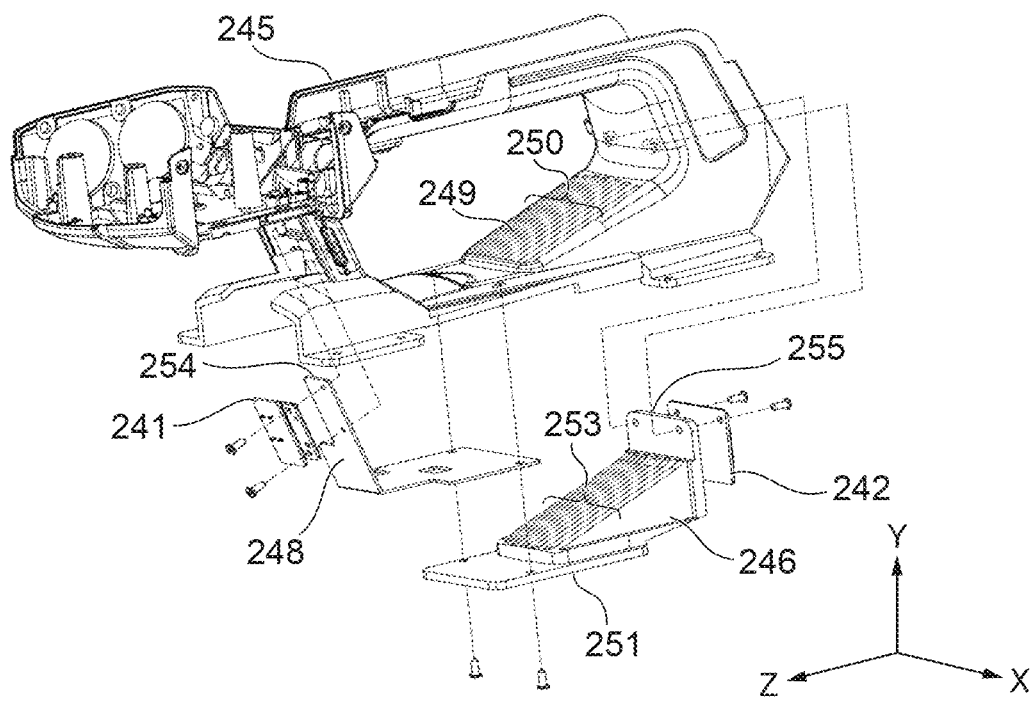
FIG. 43 is a view useful in explaining how a handle plate and a heat sink portion are attached to a handle lower cover.

FIG. 43 is a view useful in explaining attachment of the handle plate 248 and the heat sink portion 246 to the handle lower cover 245, and components of which omission of illustration does not hamper the explanation are omitted from illustration. The heat sink portion 246 is provided with a handle heat dissipation portion 253 formed by a plurality of fins so as to increase the surface area. The handle heat dissipation portion 253 is opposed to the handle heat dissipation port 250 of the handle lower cover 245. The handle plate 248 and the heat sink portion 246 are both fixed, together with the jack circuit board 241 and the handle circuit board 242, to the handle lower cover 245 with screws, whereby the handle plate 248, the heat sink portion 246, and the handle lower cover 245 are formed into an integral unit, thereby playing a role of maintaining the rigidity of the handle portion 103A. Further, the heat sink portion 246 and the handle plate 248 are thermally connected to each other.

Figure 44:
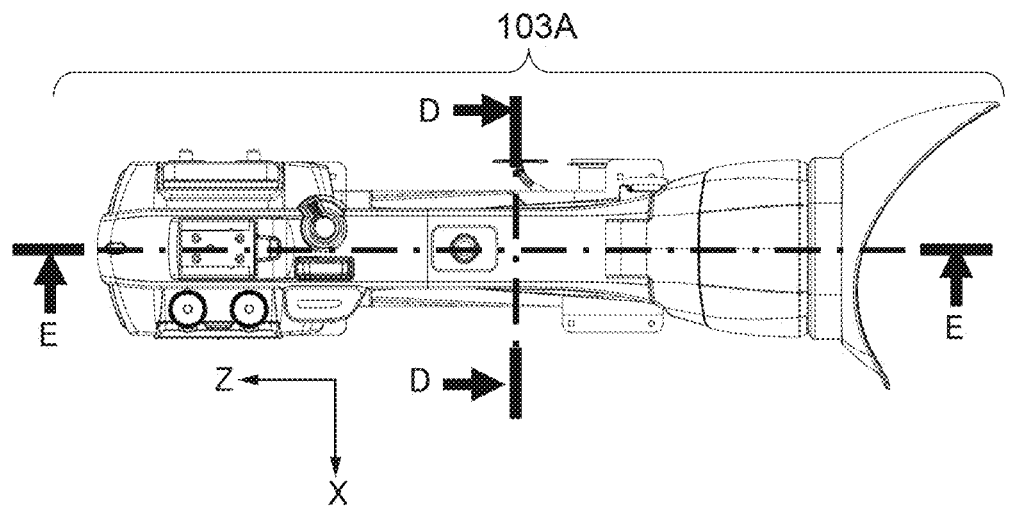
FIG. 44 is a top view of the handle portion shown in FIG. 42.
Figure 45:
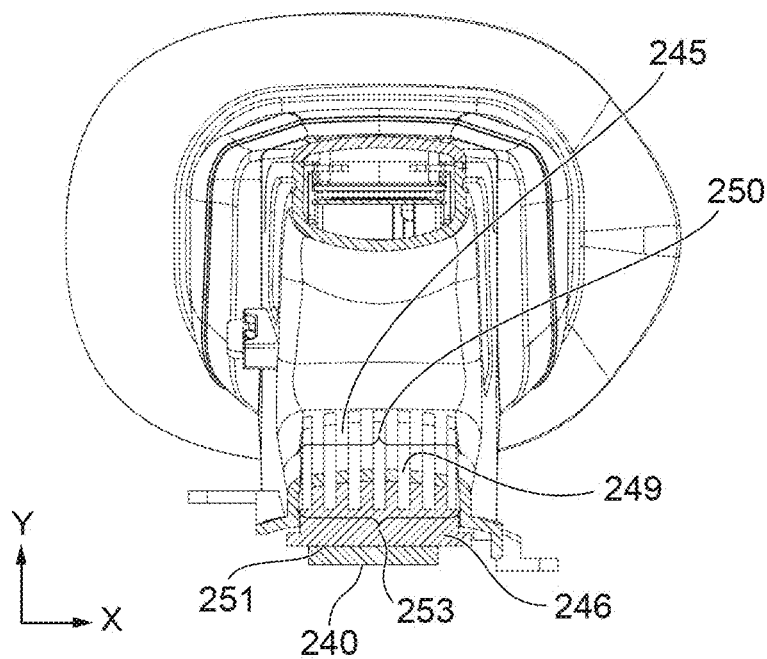
FIG. 45 is a cross-sectional view of the handle portion, taken along D-D in FIG. 44.
Figure 46:
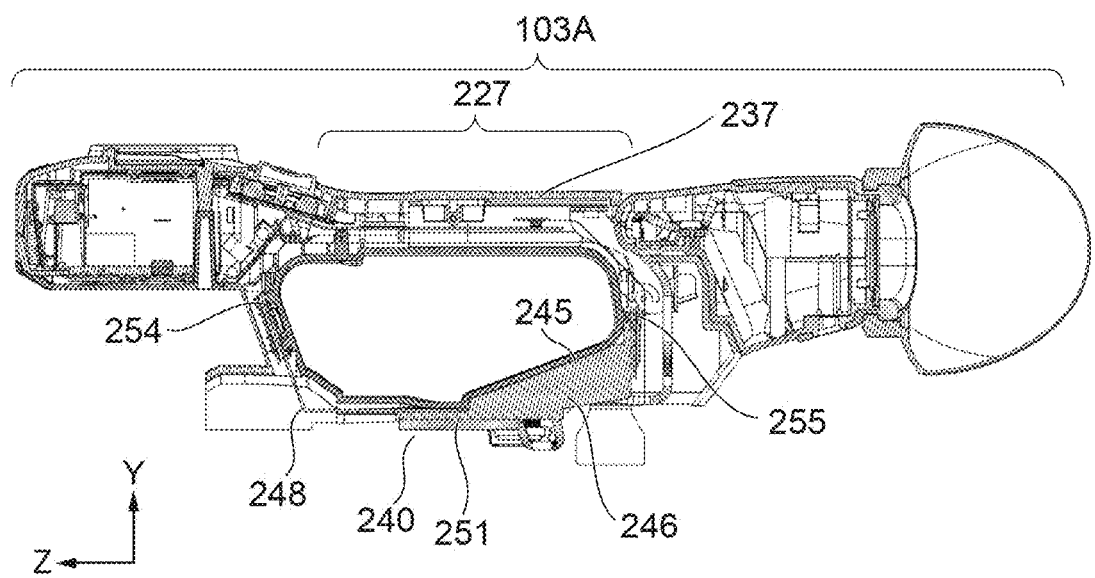
FIG. 46 is a cross-sectional view of the handle portion, taken along E-E in FIG. 44.

FIG. 44 is a top view of the handle portion 103A. FIG. 45 is a cross-sectional view taken along D-D in FIG. 44. FIG. 46 is a cross-sectional view taken along E-E in FIG. 44. Note that in FIGS. 45 and 46, components of which omission of illustration does not hamper the explanation are omitted from illustration.

Heat generated in the image capturing apparatus body is mainly transferred to the handle lower flat portion 251 of the heat sink portion 246 via the handle heat conduction sheet 240, and is then transferred to the heat sink portion 246. Since the handle lower cover 245 is provided with the slit-shaped portions 249 formed in association with recess portions between the plurality of fins forming the heat sink portion 246, the plurality of fins are brought into direct contact with the outside air. Therefore, it is possible to efficiently dissipate heat to the outside through the handle heat dissipation port 250 formed by the plurality of slit-shaped portions 249.

Note that it is desirable that the handle heat dissipation port 250 is disposed at a location where it is difficult for a photographer to touch the same. As shown in FIG. 41, the handle portion 103A has the handle heat dissipation port 250 disposed at a location below (−Y side of) the handle gripping portion 227, which corresponds to a shadow of the handle gripping portion 227 projected in the Y direction, thereby forming a structure which makes it difficult for the photographer to touch the handle heat dissipation port 250.

Further, in the handle portion 103A, the handle heat dissipation port 250 of the handle lower cover 245 is disposed above the heat sink portion 246, as the appearance surface, thereby preventing a user from directly touching the handle heat dissipation portion 253 while bringing the handle heat dissipation portion 253 into direct contact with the outside air. On the other hand, depending on a temperature situation, the handle portion 103A may be configured such that the slit-shaped portions 249 of the handle lower cover 245 are formed as an opening to cause the heat sink portion 246 to directly appear in the appearance.

Further, in the handle portion 103A, a handle front-side end 254 of the handle plate 248 and a handle rear-side end 255 of the heat sink portion 246 are not extended to the handle gripping portion 227 so as to suppress increase in the temperature of the handle gripping portion 227. However, the handle plate 248 and the heat sink portion 246 may be extended to the handle gripping portion 227 depending on a manner of heat transfer and a situation of temperature increase.

Figure 47:
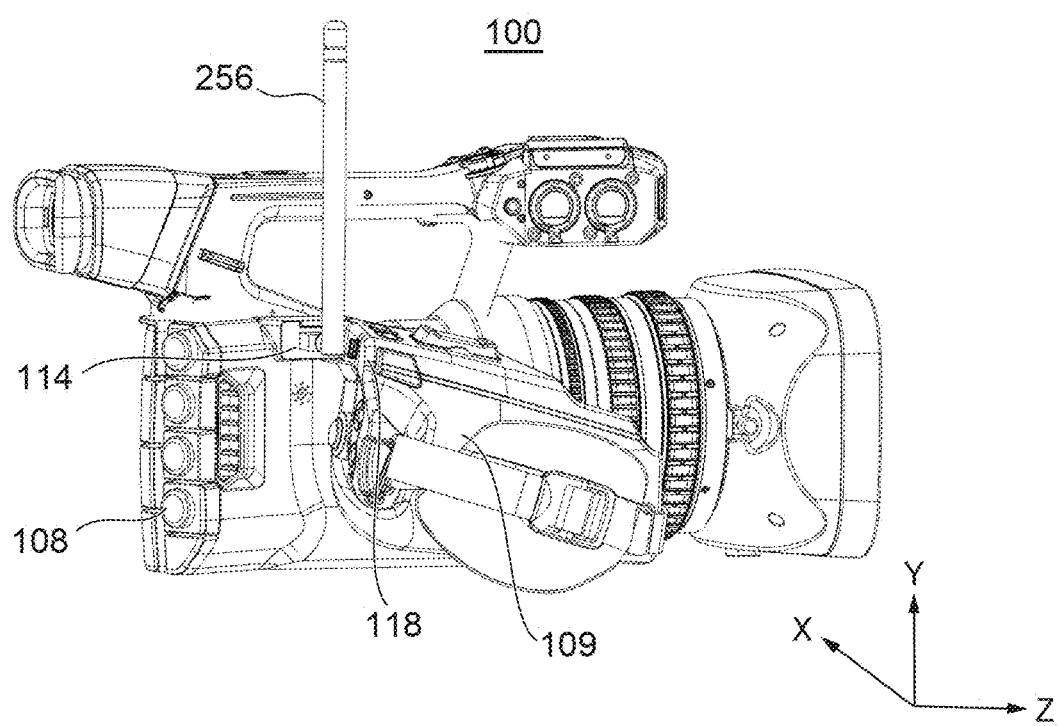
FIG. 47 is a perspective view of the image capturing apparatus in a state in which a mobile communication device is connected to a USB connector.
Figure 48:
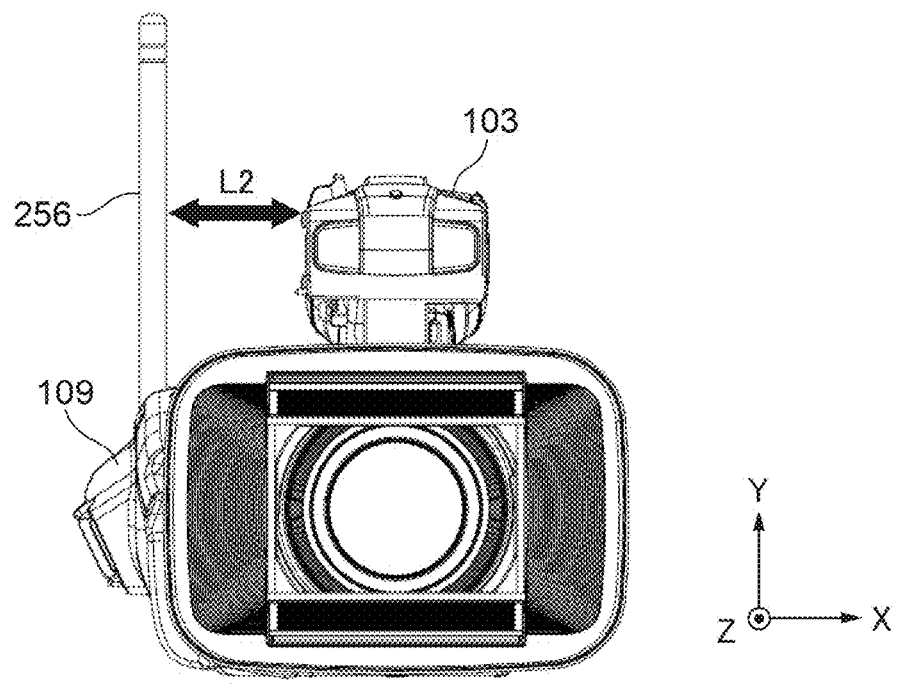
FIG. 48 is a front view of the image capturing apparatus in the state in which the mobile communication device is connected to the USB connector.

FIG. 47 is a perspective view of the image capturing apparatus 100 in a state in which a mobile communication device 256 is connected to the USB connector 114, as viewed from the rear left side. FIG. 48 is a front view of the image capturing apparatus 100 in the state in which the mobile communication device 256 is connected to the USB connector 114. The mobile communication device 256 is an example of an external device that can be connected (attached) to the USB connector 114.

The mobile communication device 256 is e.g. a dongle capable of performing 5G high-speed data communication. When the mobile communication device 256 is connected, the image capturing apparatus 100 is capable of transferring a video recorded in the card recording medium 139 or a video being shot to an external apparatus, such as a PC, via a public communication network. In FIGS. 47 and 48, the mobile communication device 256 is illustrated in a state in which the angle of an antenna of the mobile communication device 256 has been adjusted such that it extends upward. However, the angle can be adjusted to a desired angle, and for example, the antenna may be set to extend straight to the left side (−X direction) of the image capturing apparatus 100.

As shown in FIGS. 3, 6, and 47, the USB connector 114 is arranged in a recessed area between the gripping portion 109 and the connection terminal section 108, at a location adjacent to the rear side (−Z side) of the air inlet port arrangement surface 118, in a state in which its opening faces toward the left side. As described above, the right-hand thumb is prevented from reaching the air inlet port arrangement surface 118 when operating the image capturing apparatus 100, and similarly, the right-hand thumb is also prevented from reaching the mobile communication device 256, and hence even when the mobile communication device 256 is attached, the operability of the image capturing apparatus 100 is not spoiled.

Further, although the USB connector 114 is in the recessed area between the gripping portion 109 and the connection terminal section 108, i.e. close to the optical axis of the image capturing apparatus 100, it is away from the handle portion 103 leftward. Therefore, the mobile communication device 256 connected to the USB connector 114 extends at a location away from the handle portion 103 by a predetermined distance L2 (see FIG. 48). As a result, when the photographer grips the handle portion 103, a space is formed between the hand gripping the handle portion 103 and the mobile communication device 256. Therefore, even when the photographer grips the handle portion 103 while using the mobile communication device 256, the hand gripping the handle portion 103 does not bump against the mobile communication device 256, providing excellent usability.

Figure 49A:
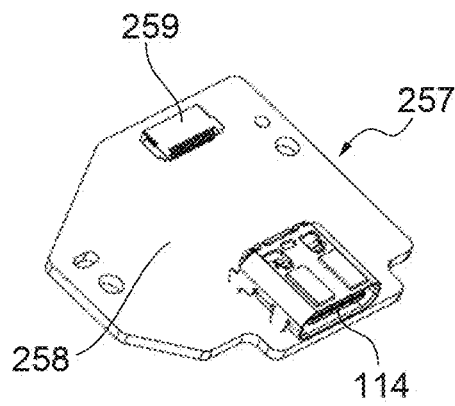
FIGS. 49A and 49B are respective perspective views of a front side and a rear side of a USB circuit board.
Figure 49B:
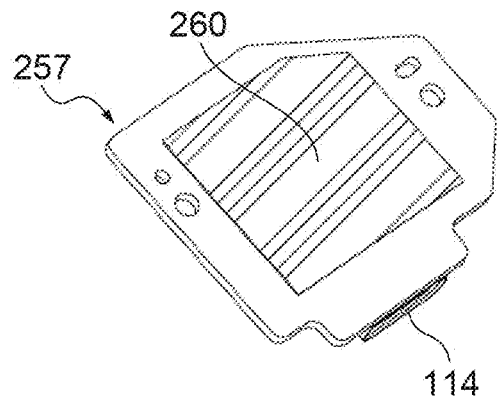

Next, the USB circuit board 257 will be described. FIGS. 49A and 49B are perspective views of the USB circuit board 257. FIG. 49A shows a front surface (mounting surface) and FIG. 49B shows a reverse surface. The USB circuit board 257 includes a base 258, and the USB connector 114 and a connection connector 259 both mounted on the front surface of the base 258. To the connection connector 259, wires, not shown, for enabling transmission and reception of signals to and from the main control circuit board 123 are connected. The reverse surface of the USB circuit board 257 has no electrical components mounted thereon, but is provided with a conductor exposed portion 260 from which internal conductors are exposed by removing an insulating protective film, not shown, from the base 258.

Figure 50:
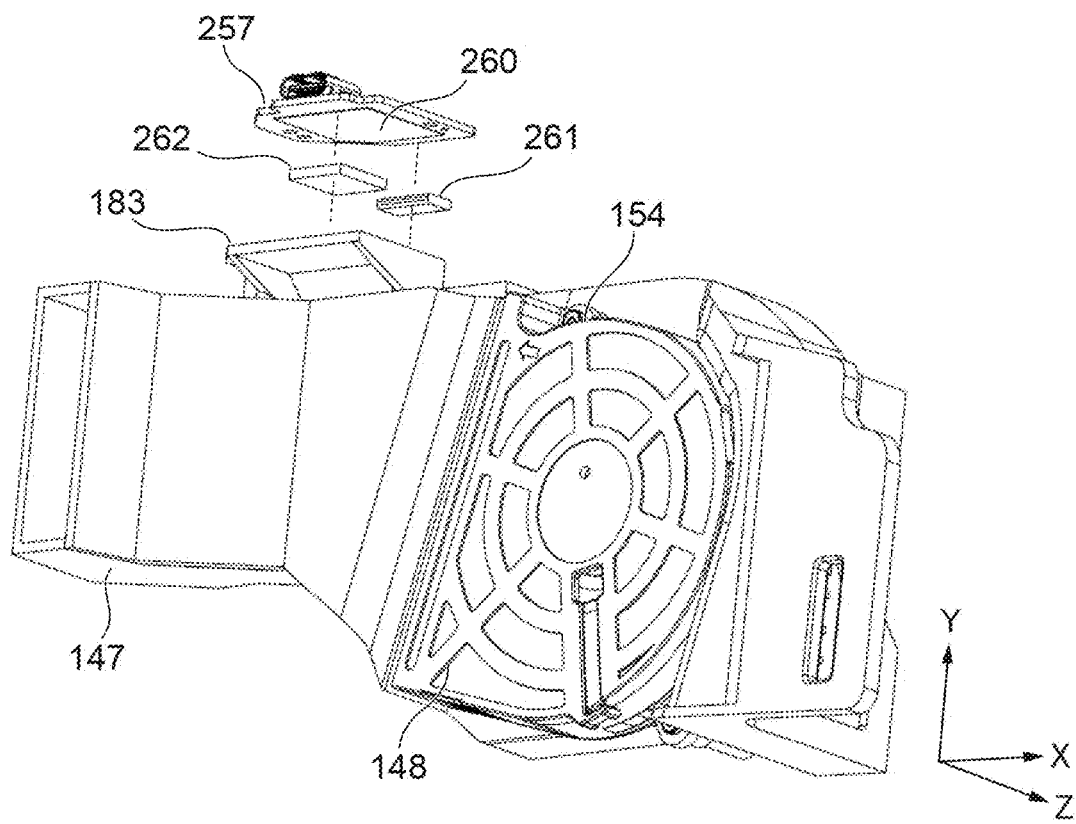
FIG. 50 is a view useful in explaining electrical and thermal connection between the USB circuit board and the main duct.

FIG. 50 is a view useful in explaining electrical and thermal connection between the USB circuit board 257 and the main duct 124. Inside the image capturing apparatus 100, the USB circuit board 257 is arranged such that it is opposed to the USB connection wall portion 183 which is part of the main duct 124 (duct base 147). An electrically conductive elastic member 261 and a thermally conductive elastic member 262 are sandwiched and held in a compressed state between the USB circuit board 257 and the USB connection wall portion 183.

The electrically conductive elastic member 261 is a member which is configured such that a core is made of a material which is soft and highly elastic, such as an expanded EPDM, and conductive fibers enclose the periphery of the core, and is capable of electrically connecting between components without generating a large reaction force. The thermally conductive elastic member 262 is a member having elasticity, which is made of substantially the same material as the above-mentioned heat dissipation rubbers and is capable of efficiently transferring heat. The electrically conductive elastic member 261 and the thermally conductive elastic member 262 are in close contact with the conductor exposed portion 260 provided on the reverse surface of the USB circuit board 257, and electrically and thermally connect the USB circuit board 257 to the main duct 124.

Incidentally, a circuit board which transmits and receives signals at high speed is generally liable to output strong undesired radiation to the outside of the image capturing apparatus 100. In a case where a path from a circuit board as an undesired radiation-generating source to a main electrical ground is longer and a looped route is formed, more undesired radiation is generated according to the theoretical characteristics of a dipole antenna. To cope with this problem, in the image capturing apparatus 100, undesired radiation is reduced by connecting the USB circuit board 257 to the main duct 124 which is the main electrical ground by a shortest distance.

Further, as shown in FIGS. 20 and 50, the USB connection wall portion 183 is provided on the upper side (+Y side) of the exhaust-side heat dissipation portion 166, i.e. on a side of the outer wall 154 along which the exhaust wind is discharged from the rotary fan 148 at a high air flow rate. That is, the USB connection wall portion 183 is arranged in an area where the heat dissipation efficiency is highest in the exhaust-side heat dissipation portion 166, which makes it possible to efficiently cool the USB circuit board 257.

Figure 61:
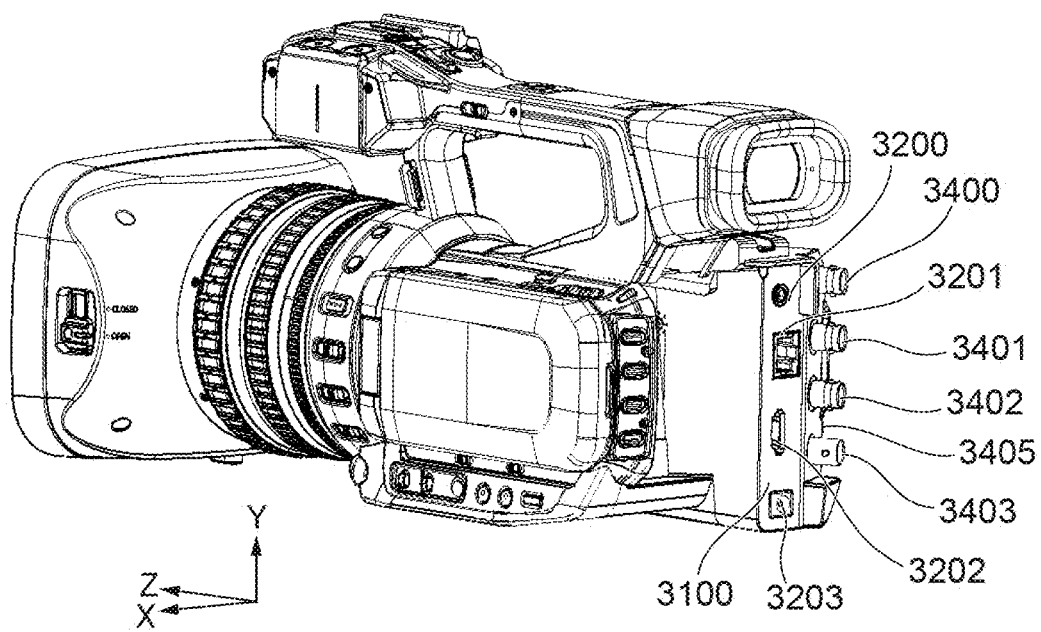
FIG. 61 is a perspective view of the conventional image capturing apparatus, as viewed from the rear right side.
Figure 62A:
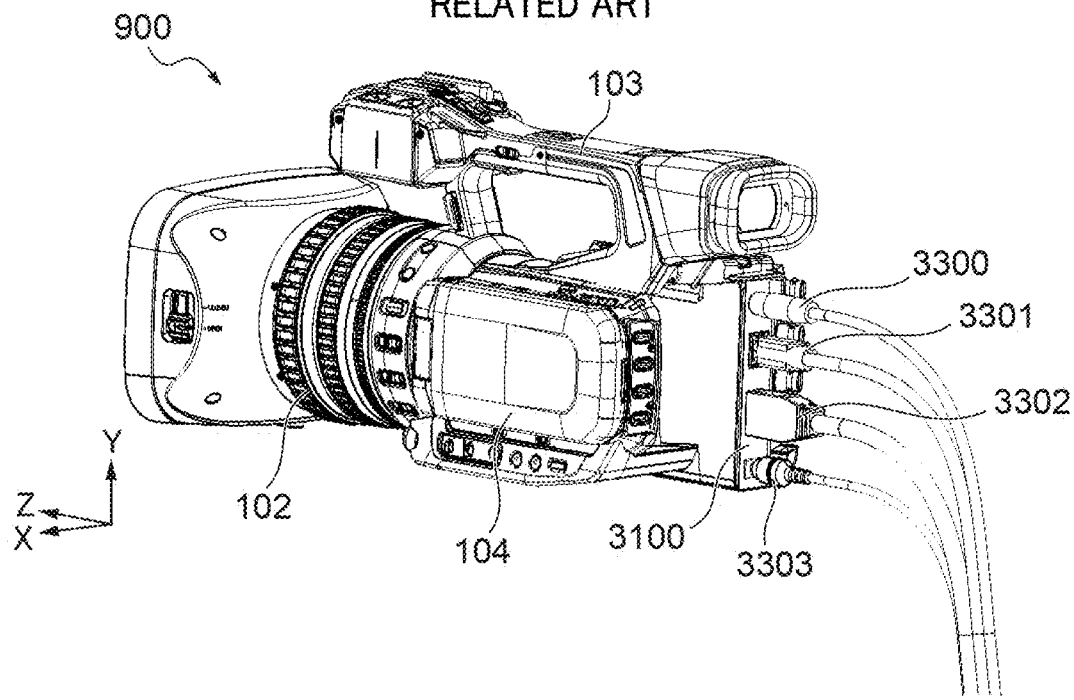
FIGS. 62A and 62B are views of the conventional image capturing apparatus shown in FIG. 61, illustrating cables connected thereto.
Figure 62B:
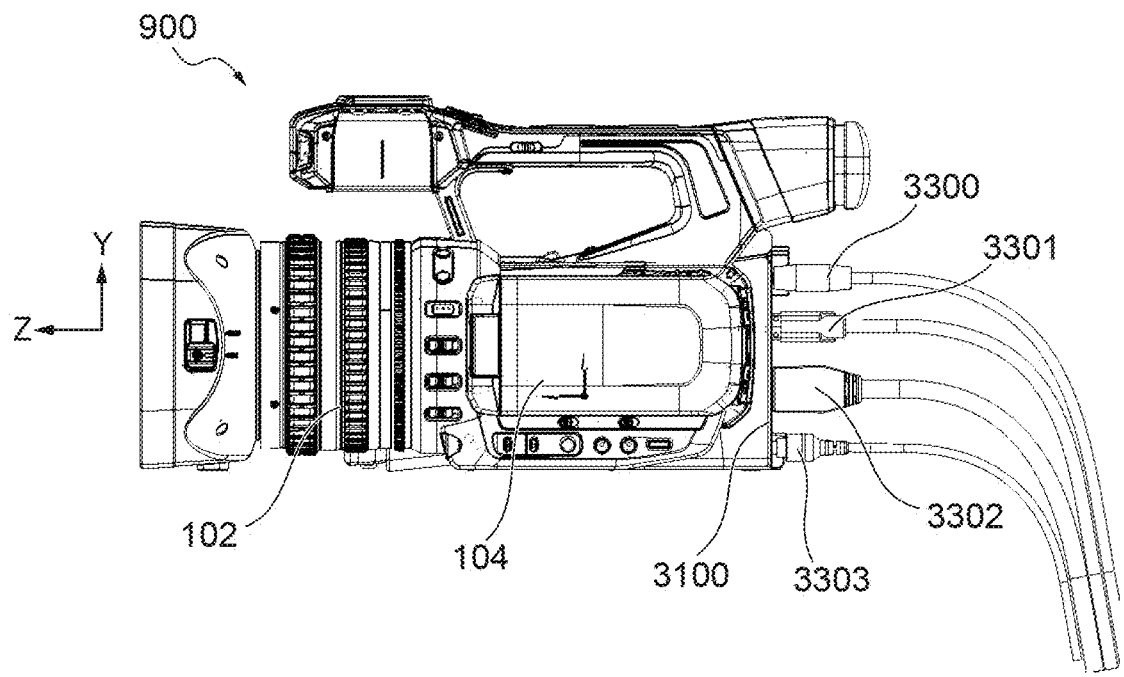

A description will be given of a connection terminal section of a conventional image capturing apparatus before describing the connection terminal section 108 of the image capturing apparatus 100. FIG. 61 is a perspective view of the conventional image capturing apparatus, denoted by reference numeral 900, illustrating the arrangement of connectors on the connection terminal section. FIGS. 62A and 62B are views of the image capturing apparatus 900, illustrating connection cables connected to the connectors of the connection terminal section. FIG. 62A is a perspective view, as viewed from the rear right side, while FIG. 62B is a side view, as viewed from the right side. Note that the same components of the image capturing apparatus 900 as those of the image capturing apparatus 100 are denoted by the same reference numerals.

The rear side of the image capturing apparatus 900 is provided with a first connector arrangement surface 3100 which is parallel to an X-Y plane, and a plurality of connectors are arranged on the first connector arrangement surface 3100. More specifically, on the first connector arrangement surface 3100, there are arranged an audio input-output stereo connector 3200, a wired LAN cable connector 3201, an HDMI cable connector 3202, and a power supply connector 3203.

Further, the rear side of the image capturing apparatus 900 is provided with a second connector arrangement surface 3405, and a plurality of connectors are arranged on the second connector arrangement surface 3405. More specifically, the second connector arrangement surface 3405 is so formed as to be substantially parallel to the Y-axis and face rearward and leftward, and has SDI connectors 3400 to 3403 provided thereon such that they each protrude rearward and leftward in parallel with a Z-X plane.

When the image capturing apparatus 900 is used, image capturing is performed by connecting the cables to the plurality of connectors, in a state in which the image capturing apparatus 900 is placed on a shoulder of a photographer, or in a state in which the photographer is moving while holding the image capturing apparatus 900 with his/her hand, or in a state in which the image capturing apparatus 900 is placed on a tripod, and hence it is desirable that the handling size of the image capturing apparatus 900 is small. As shown in FIGS. 62A and 62B, in a state in which the cables are connected to the connectors, the cables largely protrude rearward owing to the stiffness of the cables themselves before the cables hang down by gravity, which increases the handling size. The image capturing apparatus according to the present embodiment gives a solution to this problem as described hereafter.

Figure 51:
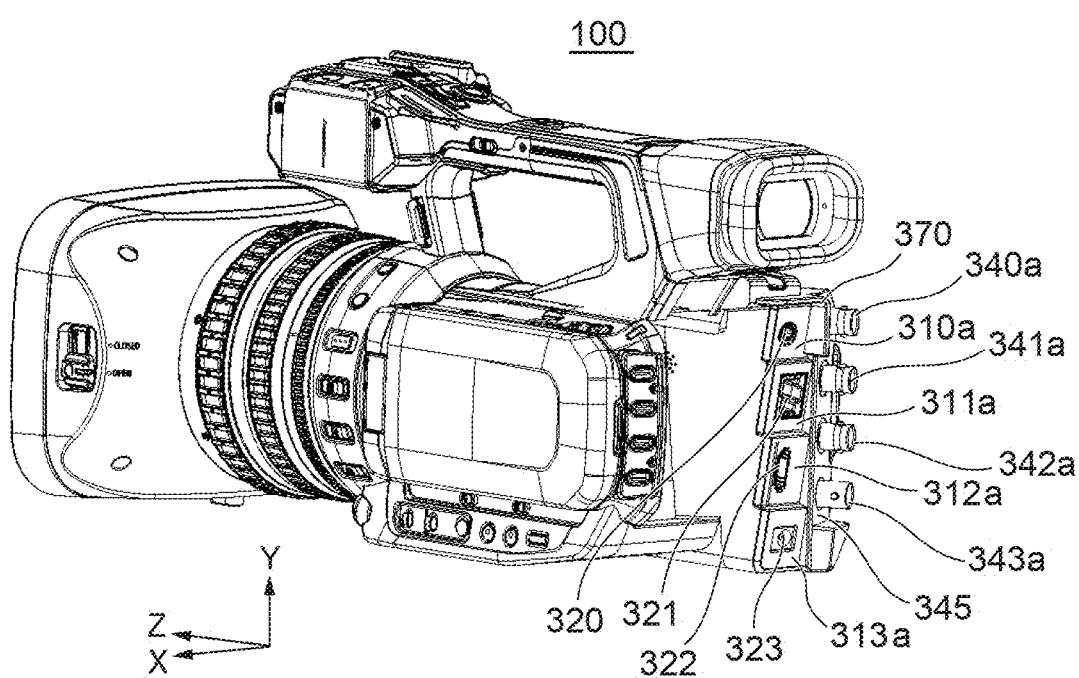
FIG. 51 is a perspective view of the image capturing apparatus, illustrating an example of the arrangement of connectors in a connection terminal section.
Figure 52A:
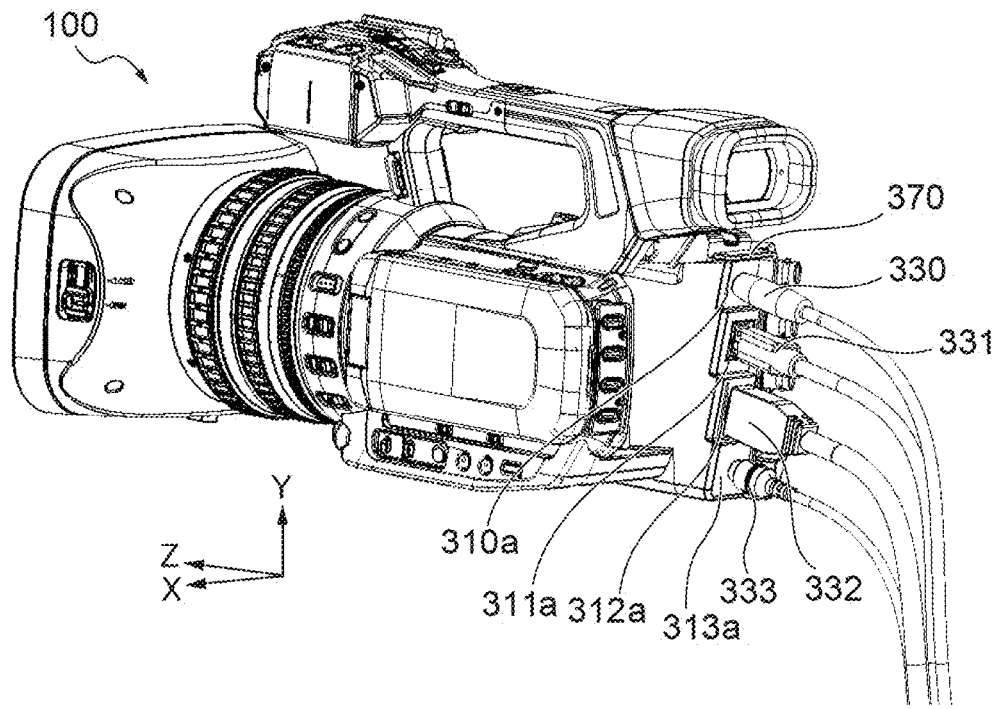
FIGS. 52A and 52B are views of the image capturing apparatus, illustrating cables connected to the connectors of the connection terminal section.
Figure 52B:
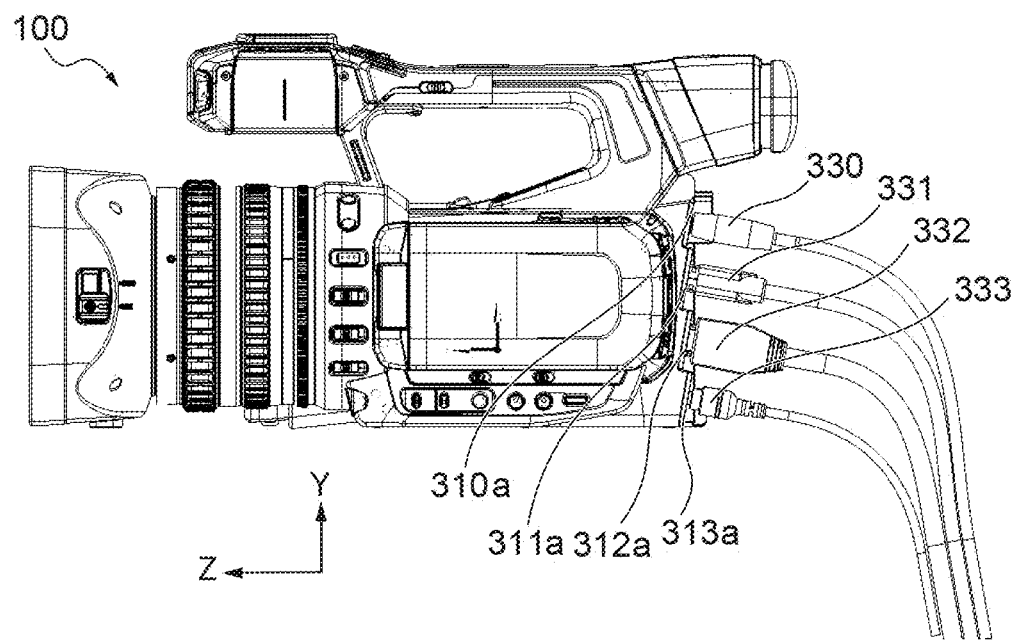

FIG. 51 is a perspective view of the image capturing apparatus 100 according to the present embodiment, illustrating an example of the arrangement of the connectors on the connection terminal section 108. FIGS. 52A and 52B are views of the image capturing apparatus 100, illustrating connection cables connected to the connectors of the connection terminal section 108. FIG. 52A is a perspective view, as viewed from the rear right side, and FIG. 52B is a side view, as viewed from the right side.

The connection terminal section 108 of the image capturing apparatus 100 has first connector arrangement surfaces 310a to 313a. The first connector arrangement surfaces 310a to 313a face rearward and obliquely downward, respectively. In other words, the first connector arrangement surfaces 310a to 313a are arranged substantially parallel to each other such that perpendicular lines to the first connector arrangement surfaces 310a to 313a extend rearward and obliquely downward at a predetermined inclined angle with respect to the image capturing optical axis 184 (Z-axis). Further, the first connector arrangement surfaces 310a to 313a are arranged at respective locations aligned in the Y direction (at respective locations overlapping each other as viewed from the vertical direction of the image capturing apparatus body) and do not overlap each other as viewed from the Z direction (as viewed from the front-rear direction of the image capturing apparatus body). On the first connector arrangement surfaces 310a to 313a, there are arranged an audio input-output stereo connector 320, a wired LAN cable connector 321, an HDMI cable connector 322, and a power supply connector 323, respectively. Note that the types and order of the connectors are arbitrary.

Further, the connection terminal section 108 of the image capturing apparatus 100 has a second connector arrangement surface 345 facing rearward and leftward. On the second connector arrangement surface 345, there are arranged SDI connectors 340a to 343a as an example of the plurality of connectors. Details of the second connector arrangement surface 345 will be described hereinafter.

Figure 53:
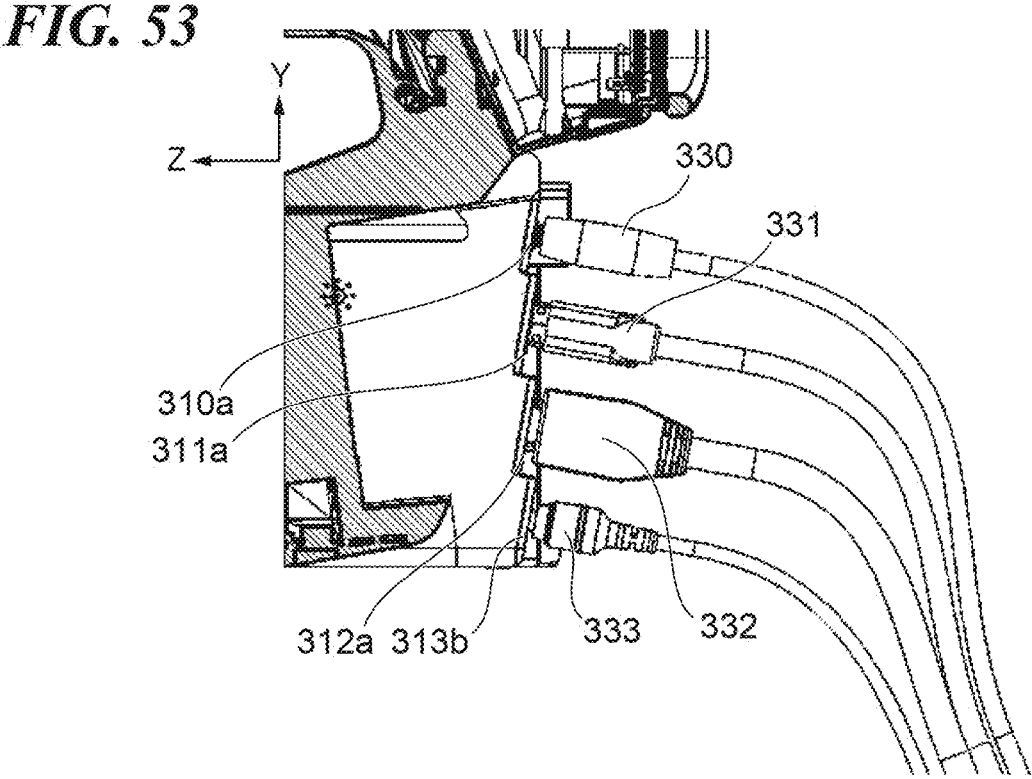
FIG. 53 is a partial cross-sectional view of the rear of the image capturing apparatus, illustrating first connector arrangement surfaces of the connection terminal section.

FIG. 53 is a partial cross-sectional view of the rear of the image capturing apparatus 100, taken along a Y-Z plane, illustrating the first connector arrangement surfaces 310a to 313a of the connection terminal section 108. Similar to the conventional image capturing apparatus 900, the image capturing apparatus 100 is often used e.g. in a state in which cables are connected to the connectors and the image capturing apparatus 100 is placed on a shoulder of a photographer. The first connector arrangement surfaces 310a to 313a are each at locations rotated about an axis parallel to the X-axis through a predetermined angle in the clockwise direction, as viewed from the +X direction, such that they face rearward and obliquely downward. Further, the connectors arranged on the first connector arrangement surfaces 310a to 313a, respectively, protrude in a direction in which the perpendicular lines to the first connector arrangement surfaces 310a to 313a extend, i.e. rearward and obliquely downward. Therefore, connection cables 330 to 333 connected to the connectors each have a shape that protrudes rearward and obliquely downward and then hangs down by gravity.

Figure 54:
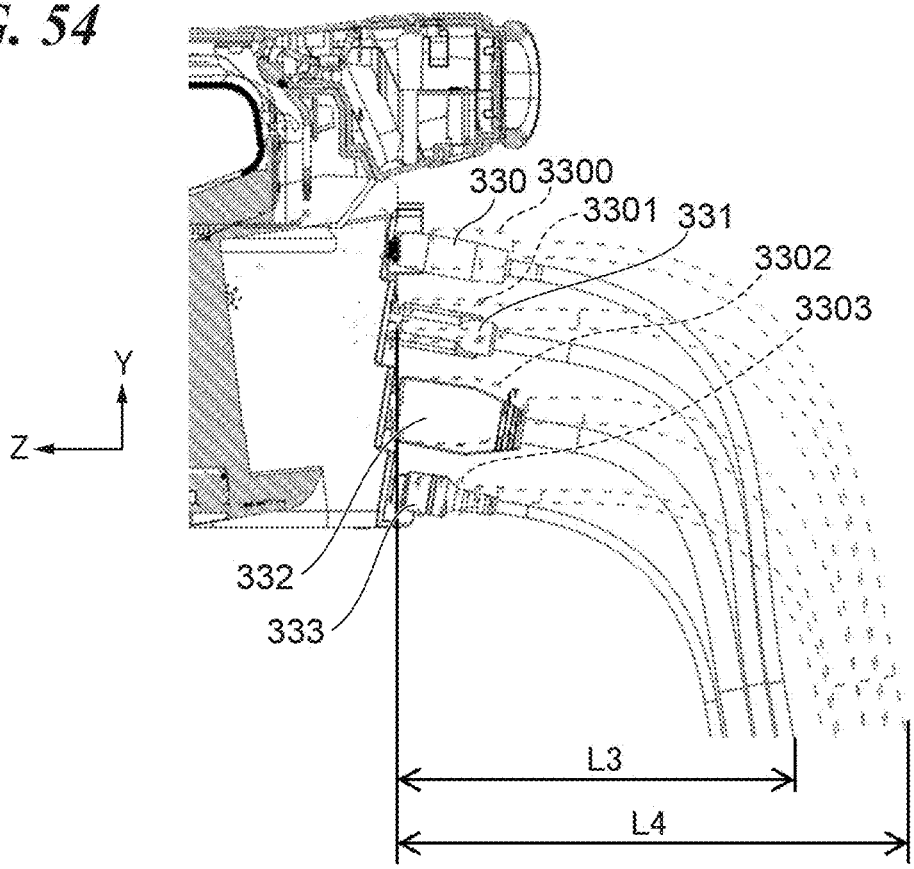
FIG. 54 is a partial cross-sectional view of the rear of the image capturing apparatus, additionally illustrating cables connected to a conventional image capturing apparatus, in a superimposed state.

FIG. 54 is a partial cross-sectional view of the rear of the image capturing apparatus 100, additionally illustrating the cables connected to the conventional image capturing apparatus 900, in a superimposed state. Assuming that a protruding amount of the connection cables 330 to 333 from the rear surface of the image capturing apparatus 100 at a certain height is represented by L3', and a protruding amount of connection cables 3300 to 3303 from the rear surface of the conventional image capturing apparatus 900 at the certain height is represented by 'L4', a relationship represented by L3<L4 holds. This indicates that compared with the conventional image capturing apparatus 900, the image capturing apparatus 100 according to the present embodiment is small in the handling size when using the image capturing apparatus 100, which provides excellent usability.

Note that as is clear from FIGS. 23 and 52B, the connectors provided on the first connector arrangement surfaces 310a to 313a are arranged so as not to form outermost shape portions of the image capturing apparatus 100. In other words, when considering a minimum rectangular parallelepiped shape containing the image capturing apparatus 100, the connectors are not in contact with the surfaces of the rectangular parallelepiped shape. This arrangement of the connectors also makes it possible to reduce the handling size when using the image ring apparatus 100, thereby providing more excellent usability.

Further, the image capturing apparatus 100 is provided with a terminal peripheral rib 370 protruding toward the rear (−Z side) of the image capturing apparatus body, on an upper side (+Y side) of the first connector arrangement surface 310a, and has a structure in which the terminal peripheral rib 370 protects the connectors from impact caused by falling and invasion of rainwater. Further, since the first connector arrangement surfaces 310a to 313a face rearward and obliquely downward, when the image capturing apparatus 100 is used e.g. under rainy conditions, even if raindrops fall on the image capturing apparatus 100, the raindrops fall downward along the cables, and hence it is possible to prevent the raindrops from entering the inside of the image capturing apparatus 100.

Figure 55:
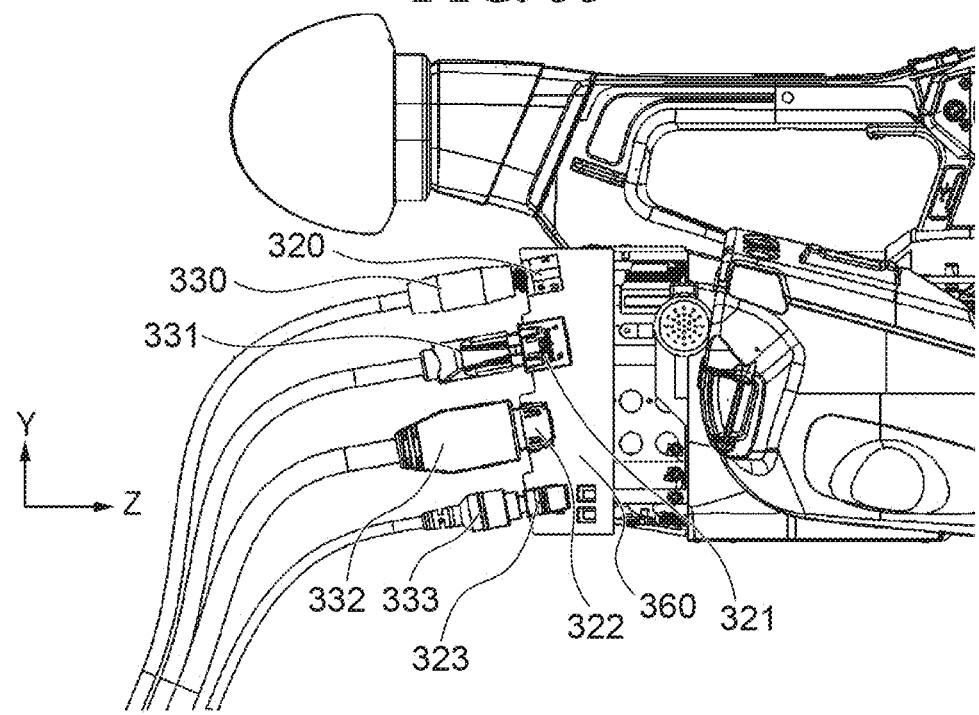
FIG. 55 is a side view, partly in cross-section, of the rear of the image capturing apparatus including a connector circuit board on which the connectors of the connection terminal section are mounted.

FIG. 55 is a side view, partly in cross-section, of the rear of the image capturing apparatus 100 including a connector circuit board 360 on which the connectors provided on the first connector arrangement surfaces 310a to 313a are mounted. The audio input-output stereo connector 320, the wired LAN cable connector 321, the HDMI cable connector 322, and the power supply connector 323 are mounted on the same connector circuit board 360. This makes it possible to reduce the handling size when using the image capturing apparatus 100 without increasing the costs.

Figure 56:
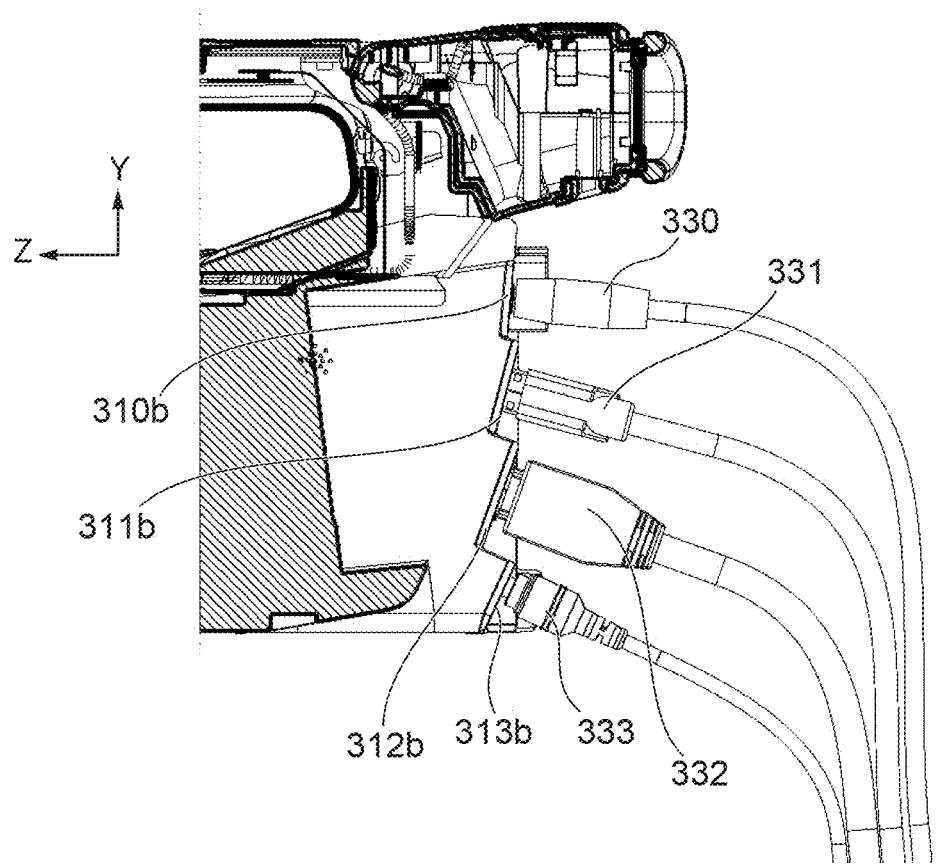
FIG. 56 is a side view, partly in cross-section, of the rear of the image capturing apparatus including a variation of the first connector arrangement surfaces.

FIG. 56 is a side view, partly in cross-section, of the rear of the image capturing apparatus 100, illustrating first connector arrangement surfaces 310b to 313b as a variation of the first connector arrangement surfaces 310a to 313a, which is useful in explaining inclination of the first connector arrangement surfaces 310b to 313b. The first connector arrangement surfaces 310b to 313b are not uniform in inclination angle, and are formed such that an angle formed with the vertical direction (Y direction) becomes larger progressively (stepwise) from the top side toward the bottom side (from the +Y side toward the −Y side) of the image capturing apparatus body. In other words, the first connector arrangement surfaces 310b to 313b are arranged such that the angles formed between the respective perpendicular lines to the first connector arrangement surfaces 310b to 313b and the image capturing optical axis 184 become larger progressively from the top side toward the bottom side of the image capturing apparatus body. This makes it possible to easily attach and detach the connection cables 330 to 333.

Figure 57:
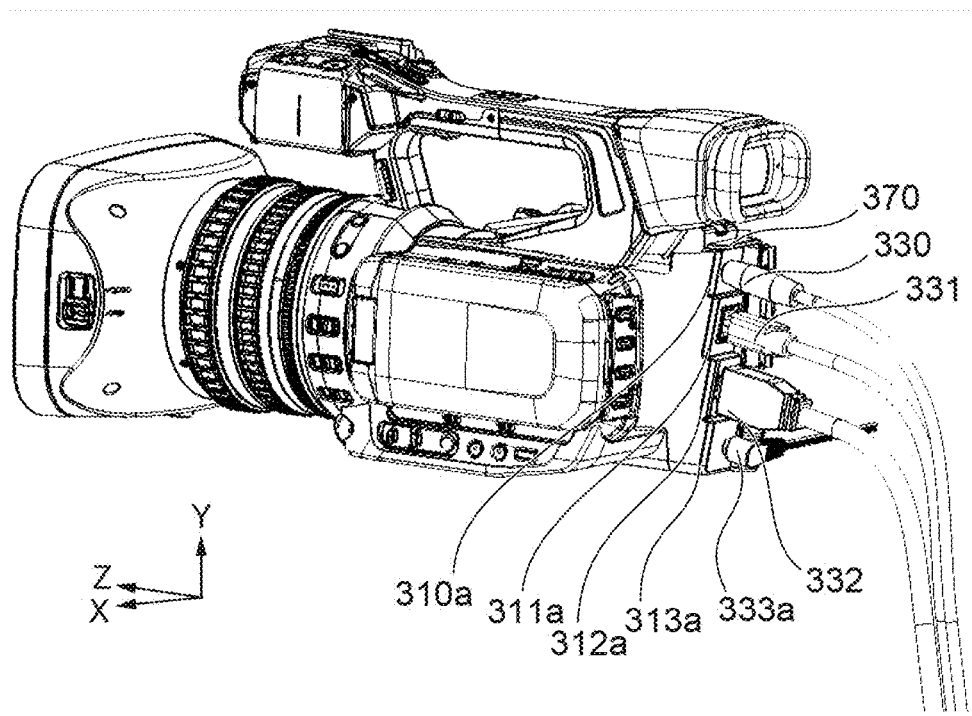
FIG. 57 is a perspective view of the image capturing apparatus, particularly illustrating a variation of a cable connected to one of the first connector arrangement surfaces.

FIG. 57 is a perspective view of the image capturing apparatus 1000, particularly illustrating a variation of the cable connected to the first connector arrangement surface 313a. To the first connector arrangement surface 313a on the bottommost side, a connection cable 333a having an L-type insertion portion, which is easy to be handled even when the image capturing apparatus 100 is placed e.g. on a table, may be connected. Note that an L-type connector may be employed as the connector provided on the first connector arrangement surface 313a.

Figure 58A:
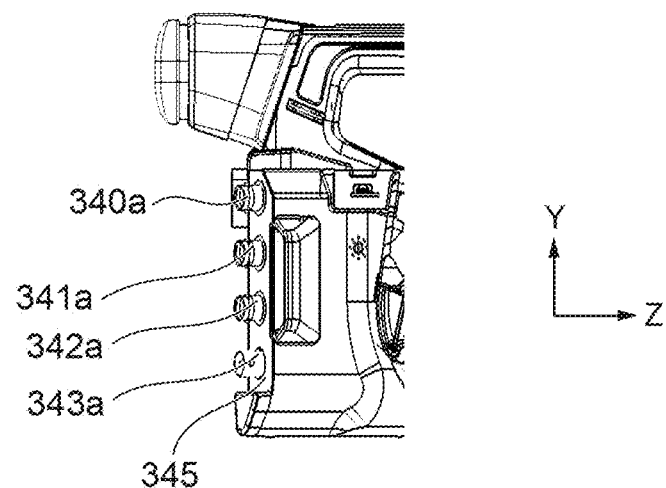
FIGS. 58A and 58B are a side view of the rear of the image capturing apparatus, illustrating a second connector arrangement surface, and a side view of the same, illustrating SDI connection cables connected thereto.
Figure 58B:
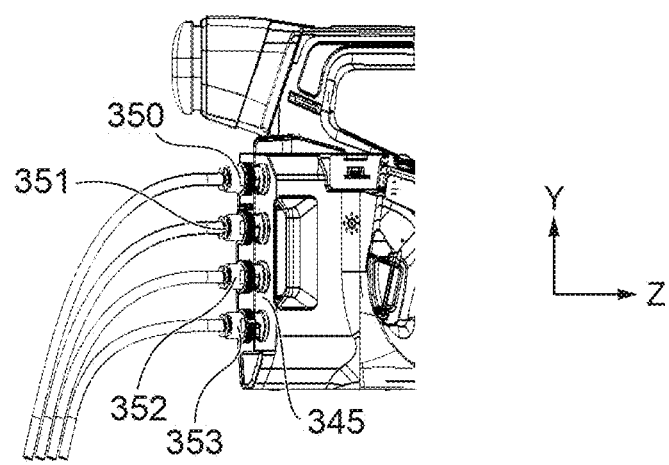

Next, the second connector arrangement surface 345 of the image capturing apparatus 100 according to the present embodiment, shown in FIG. 51, will be described. FIG. 58A is a side view of the rear of the image capturing apparatus 100, illustrating the second connector arrangement surface 345 and components therearound. FIG. 58B is a side view of the rear of the image capturing apparatus 100, illustrating SDI connection cables 350 to 353 connected to the SDI connectors 340a to 343a arranged on the second connector arrangement surface 345. The second connector arrangement surface 345 is equivalent to the second connector arrangement surface 3405 of the conventional image capturing apparatus 900, shown in FIG. 61, and is arranged substantially parallel to the Y-axis, and therefore, the SDI connectors 340a to 343a each protrude rearward and leftward in an associated Z-X plane. Therefore, in a state in which the SDI connection cables 350 to 353 are connected to the SDI connectors 340a to 343a, the cables are liable to protrude to outer space because of the stiffness of the cables before the cables hang down by gravity.

Here, in the image capturing apparatus 100, as described above, it is possible to reduce the handling size by providing the first connector arrangement surfaces 310a to 313a. In view of this, it is desirable that the handling size is further reduced by changing the second connector arrangement surface 345 such that it has the same configuration as that of the first connector arrangement surfaces 310a to 313a.

Figure 59A:
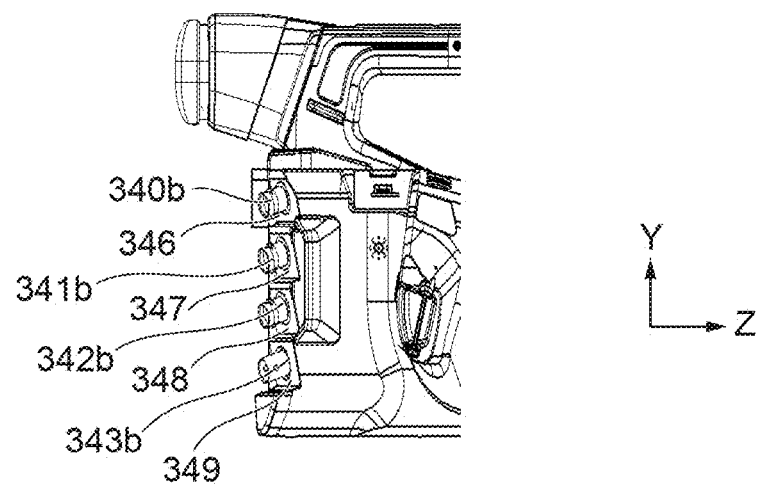
FIGS. 59A and 59B are a side view of the rear of the image capturing apparatus, illustrating a variation of the second connector arrangement surface, and a side view of the same, illustrating the SDI connection cables connected thereto.
Figure 59B:
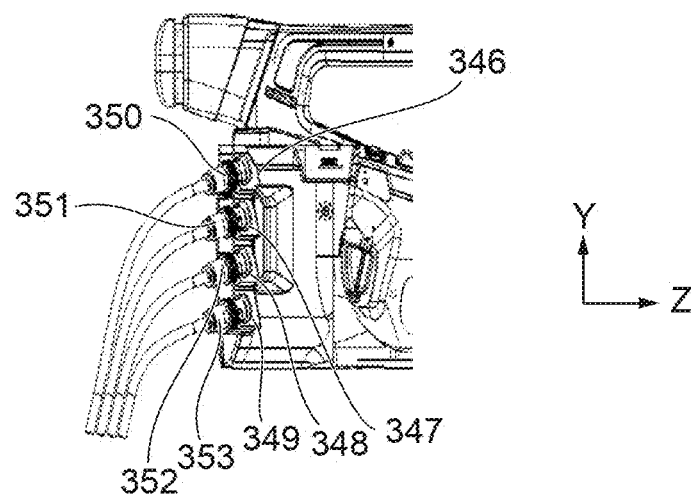

FIG. 59A is a side view of the rear of the image capturing apparatus 100, illustrating second connector arrangement surfaces 346 to 349 as a variation of the second connector arrangement surface 345. FIG. 59B is a side view of the same, illustrating the SDI connection cables 350 to 353 connected to SDI connectors 340b to 343b arranged on the second connector arrangement surfaces 346 to 349, respectively. The second connector arrangement surfaces 346 to 349 are arranged substantially parallel to each other at respective locations which are aligned in the Y direction (at respective locations overlapping each other as viewed from the vertical direction of the image capturing apparatus body) and do not overlap each other as viewed from the Z direction (as viewed from the rear side of the image capturing apparatus body).

Further, the second connector arrangement surfaces 346 to 349 face rearward and obliquely downward, and toward a leftward lateral direction. In other words, the second connector arrangement surfaces 346 to 349 are arranged in a direction in which perpendicular lines to these surfaces extend rearward on the left side at a predetermined angle with respect to the image capturing optical axis 184 and extend obliquely downward at a predetermined angle. Further, the direction in which the SDI connectors 340b to 343b protrude is the direction in which the respective perpendicular lines to the second connector arrangement surfaces 346 to 349 extend. Therefore, the SDI connection cables 350 to 353 each come to have a shape that protrudes rearward and leftward, and obliquely downward, and then hangs down due to the gravity.

Figure 60:
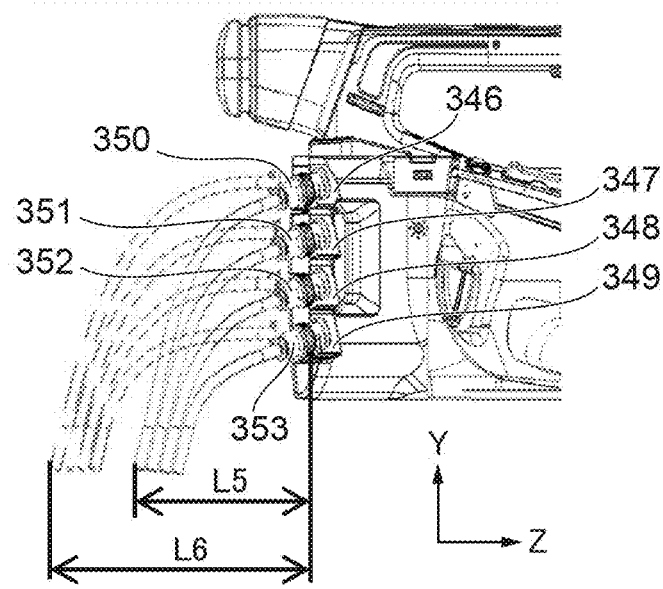
FIG. 60 is a side view of the rear of the image capturing apparatus, illustrating the connected SDI connection cables in FIG. 59B and the connected SDI connection cables in FIG. 58B, depicted in broken lines, in a superimposed state.

FIG. 60 is a side view of the rear of the image capturing apparatus 100, illustrating the connected SDI connection cables 350 to 353 in FIG. 59B and the connected SDI connection cables 350 to 353 in FIG. 58B, depicted in broken lines, in a superimposed state. A protruding amount of the SDI connection cables 350 to 353 from the rear surface of the image capturing apparatus body, which are connected to the SDI connectors 340b to 343b on the second connector arrangement surfaces 346 to 349, is represented by 'L5'. Further, a protruding amount of the SDI connection cables 350 to 353 from the rear surface of the image capturing apparatus body, which are connected to the SDI connectors 340a to 343a on the second connector arrangement surface 345, is represented by 'L6'. Then, it is found that a relationship represented by L5<L6 holds. That is, by providing the second connector arrangement surfaces 346 to 349 and arranging the SDI connectors 340b to 343b thereon, it is possible to reduce the handling size when using the image capturing apparatus 100, providing excellent usability.

Although not shown, by configuring the whole second connector arrangement surface 345 such that it faces obliquely downward only at a predetermined angle, it is also possible to cause each of the SDI connection cables 350 to 353 to come to have a shape that protrudes rearward and obliquely downward and then hangs down by gravity. In this case as well, compared with the case where the second connector arrangement surface 345 is arranged in parallel to the Y-axis, it is also possible to reduce the handling size when using the image capturing apparatus 100. Further, similar to the first connector arrangement surfaces 310b to 313b, the second connector arrangement surfaces 346 to 349 may be arranged such that the inclination angles progressively (stepwise) become larger so as to cause the second connector arrangement surfaces 346 to 349 to face more largely downward, progressively from the top side toward the bottom side of the image capturing apparatus body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-213304 filed Nov. 26, 2019, which is hereby incorporated by reference herein in its entirety.

What is claimed is:

1. An image capturing apparatus that is provided with a connection terminal section on a rear side of an image capturing apparatus body, wherein the connection terminal section comprises:

a plurality of first connector arrangement surfaces; and first external connection terminals provided on the plurality of first connector arrangement surfaces, respectively, and wherein the plurality of first connector arrangement surfaces are arranged at respective locations not overlapping each other as viewed from a front-rear direction of the image capturing apparatus body and overlapping each other as viewed from a vertical direction of the image capturing apparatus body, and are arranged such that the plurality of first connector arrangement surfaces face obliquely downward toward the rear of the image capturing apparatus body.

2. The image capturing apparatus according to claim 1, wherein the first external connection terminals each protrude from an associated one of the plurality of first connector arrangement surfaces in a direction parallel to a perpendicular line to the associated one of the first connector arrangement surfaces.

3. The image capturing apparatus according to claim 1, wherein the plurality of first connector arrangement surfaces are substantially parallel to each other.

4. The image capturing apparatus according to claim 1, wherein the plurality of first connector arrangement surfaces are arranged such that an angle formed with the vertical direction of the image capturing apparatus body becomes larger stepwise from a top side toward a bottom side of the image capturing apparatus body.

5. The image capturing apparatus according to claim 1, wherein the first external connection terminals are mounted on the same circuit board.

6. The image capturing apparatus according to claim 1, wherein the connection terminal section includes:
- a plurality of second connector arrangement surfaces, and second external connection terminals provided on the plurality of second connector arrangement surfaces, respectively, and
- wherein the plurality of second connector arrangement surfaces are arranged at respective locations not overlapping each other as viewed from the front-rear direction of the image capturing apparatus body and overlapping each other as viewed from the vertical direction of the image capturing apparatus body, and are arranged such that the plurality of second connector arrangement surfaces face obliquely downward toward the rear of the image capturing apparatus body and toward a lateral direction.

7. The image capturing apparatus according to claim 6, wherein the second external connection terminals each protrude from an associated one of the plurality of second connector arrangement surfaces in a direction parallel to a perpendicular line to the associated one of the second connector arrangement surfaces.

8. The image capturing apparatus according to claim 6, wherein the plurality of second connector arrangement surfaces are substantially parallel to each other.

9. The image capturing apparatus according to claim 6, wherein the plurality of second connector arrangement surfaces are arranged such that an angle formed with the vertical direction of the image capturing apparatus body becomes larger stepwise from a top side toward a bottom side of the image capturing apparatus body.

10. The image capturing apparatus according to claim 6, wherein the plurality of second connector arrangement surfaces are arranged on a left side of the plurality of first connector arrangement surfaces as viewed from a front side of the image capturing apparatus body, and
- wherein the plurality of second connector arrangement surfaces are arranged such that the plurality of second connector arrangement surfaces face obliquely downward toward the rear of the image capturing apparatus body, and toward a leftward lateral direction, as viewed from the front side of the image capturing apparatus body.

11. The image capturing apparatus according to claim 1, wherein the plurality of first external connection terminals do not form outermost shape portions of the image capturing apparatus.

12. The image capturing apparatus according to claim 1, wherein the image capturing apparatus body is provided with a rib that protrudes toward the rear of the image capturing apparatus body at a location on an upper side of one of the first connector arrangement surfaces, which is positioned on the topmost side of the image capturing apparatus body.

* * * * *